United States Patent
Pittman

(10) Patent No.: US 9,473,591 B1
(45) Date of Patent: Oct. 18, 2016

(54) RELIABLE SERVER TRANSPORT OVER FIBRE CHANNEL USING A BLOCK DEVICE ACCESS MODEL

(71) Applicant: EMC Corporation, Hopkinton, MA (US)

(72) Inventor: Joseph C. Pittman, Apex, NC (US)

(73) Assignee: EMC Corporation, Hopkinton, MA (US)

( * ) Notice: Subject to any disclaimer, the term of this patent is extended or adjusted under 35 U.S.C. 154(b) by 438 days.

(21) Appl. No.: 13/725,845

(22) Filed: Dec. 21, 2012

(51) Int. Cl.
| | |
|---|---|
| *H04L 29/06* | (2006.01) |
| *G06F 3/00* | (2006.01) |
| *G06F 3/06* | (2006.01) |
| *H04L 29/08* | (2006.01) |

(52) U.S. Cl.
CPC ............... *H04L 67/42* (2013.01); *G06F 3/00* (2013.01); *G06F 3/061* (2013.01); *G06F 3/0613* (2013.01); *H04L 67/1097* (2013.01); *H04L 69/14* (2013.01)

(58) Field of Classification Search
CPC ....... H04L 9/32; H04L 9/321; H04L 9/3236; H04L 9/3268; H04L 67/1097; H04L 69/14; G06F 21/31; G06F 21/30; G06F 3/00; G06F 3/061; G06F 3/0613
See application file for complete search history.

(56) References Cited

U.S. PATENT DOCUMENTS

| | | | |
|---|---|---|---|
| 4,482,956 A | 11/1984 | Tallman | |
| 5,959,994 A | 9/1999 | Boggs et al. | |
| 5,996,024 A | 11/1999 | Blumenau | |
| 6,252,876 B1 | 6/2001 | Brueckheimer et al. | |
| 6,269,401 B1 | 7/2001 | Fletcher et al. | |
| 6,321,264 B1 | 11/2001 | Fletcher et al. | |
| 6,353,869 B1 | 3/2002 | Ofer et al. | |
| 6,400,687 B1 | 6/2002 | Davison et al. | |
| 6,421,753 B1 | 7/2002 | Hoese et al. | |
| 6,609,161 B1 | 8/2003 | Young | |
| 6,609,165 B1 | 8/2003 | Frazier | |
| 6,658,459 B1 | 12/2003 | Kwan et al. | |
| 6,671,259 B1 | 12/2003 | He et al. | |
| 6,684,209 B1 | 1/2004 | Ito et al. | |
| 6,687,766 B1 | 2/2004 | Casper et al. | |
| 6,690,678 B1 | 2/2004 | Basso et al. | |
| 6,898,650 B1 | 5/2005 | Gao et al. | |
| 7,012,914 B2 | 3/2006 | Berman | |
| 7,165,258 B1 | 1/2007 | Kuik et al. | |
| 7,200,641 B1 | 4/2007 | Throop | |

(Continued)

OTHER PUBLICATIONS

Final Office Action, U.S. Appl. No. 13/725,748, dated Jan. 22, 2015, 15 pages.

(Continued)

*Primary Examiner* — Chirag R Patel
*Assistant Examiner* — Rachel J Hackenberg
(74) *Attorney, Agent, or Firm* — Blakely, Sokoloff, Taylor & Zafman LLP

(57) ABSTRACT

A system and method for executed by a server for reliably communicating between the server and a client over a Fiber Channel (FC) network. The method includes receiving, from the client over the FC network, a first Small Computer System Interface (SCSI) request, including a virtual connection identifier in a logical block address field of a command descriptor block of the first SCSI request, validating the first SCSI request using the virtual connection identifier included in the first SCSI request, and responding to the first SCSI request by sending a first SCSI response, based on the validity of the first SCSI request, to the client over the FC network.

33 Claims, 31 Drawing Sheets

(56) References Cited

U.S. PATENT DOCUMENTS

| | | |
|---|---|---|
| 7,269,131 B2 | 9/2007 | Cashman et al. |
| 7,295,572 B1 | 11/2007 | Haapala |
| 7,397,764 B2 | 7/2008 | Cherian et al. |
| 7,421,519 B2 | 9/2008 | Benhase et al. |
| 7,526,527 B1 | 4/2009 | Woodruff |
| 7,599,293 B1 | 10/2009 | Bain et al. |
| 7,633,955 B1* | 12/2009 | Saraiya et al. ............ 370/401 |
| 7,657,727 B2 | 2/2010 | Ito et al. |
| 7,672,323 B2 | 3/2010 | Sundaram et al. |
| 7,716,645 B2 | 5/2010 | Dolby et al. |
| 7,742,418 B2 | 6/2010 | Westerberg et al. |
| 7,925,742 B2 | 4/2011 | Loboz et al. |
| 7,941,570 B2 | 5/2011 | Flanagan et al. |
| RE42,761 E | 9/2011 | Hoese et al. |
| 8,155,518 B2 | 4/2012 | Young |
| 8,364,853 B2 | 1/2013 | Bubb et al. |
| 8,438,264 B2 | 5/2013 | Moisan et al. |
| 8,521,868 B2 | 8/2013 | Ben-Yehuda et al. |
| 8,583,876 B2 | 11/2013 | Taguchi |
| 8,612,481 B2 | 12/2013 | Grier et al. |
| 8,626,910 B1 | 1/2014 | Lientz |
| 8,825,820 B2 | 9/2014 | Gerber et al. |
| 8,892,723 B2 | 11/2014 | Jibbe et al. |
| 9,021,155 B2 | 4/2015 | Bender et al. |
| 2002/0161852 A1 | 10/2002 | Allen et al. |
| 2003/0058870 A1 | 3/2003 | Mizrachi et al. |
| 2003/0076248 A1 | 4/2003 | Larson |
| 2003/0084209 A1 | 5/2003 | Chadalapaka |
| 2003/0182455 A1 | 9/2003 | Hetzler et al. |
| 2004/0093605 A1 | 5/2004 | Alverson et al. |
| 2004/0111523 A1 | 6/2004 | Hall et al. |
| 2004/0133634 A1 | 7/2004 | Luke et al. |
| 2005/0066095 A1 | 3/2005 | Mullick et al. |
| 2007/0011317 A1 | 1/2007 | Brandyburg et al. |
| 2007/0078961 A1 | 4/2007 | Kumano et al. |
| 2008/0133852 A1 | 6/2008 | Grier et al. |
| 2008/0155214 A1 | 6/2008 | Shitomi |
| 2010/0036940 A1 | 2/2010 | Carey et al. |
| 2010/0199040 A1* | 8/2010 | Schnapp ............ G06F 3/0605 711/114 |
| 2011/0154318 A1* | 6/2011 | Oshins et al. ............ 718/1 |
| 2011/0173608 A1* | 7/2011 | Buragohain ........ G06F 9/45558 718/1 |
| 2011/0246677 A1 | 10/2011 | Johnson et al. |
| 2012/0189009 A1 | 7/2012 | Shekhar et al. |
| 2012/0260121 A1 | 10/2012 | Yadav |
| 2013/0067469 A1 | 3/2013 | Das et al. |
| 2014/0143286 A1* | 5/2014 | Knight et al. ............ 707/827 |

OTHER PUBLICATIONS

Non-Final Office Action, U.S. Appl. No. 13/725,854, dated Feb. 3, 2015, 9 pages.
Non-Final Office Action, U.S. Appl. No. 13/725,748, dated Jun. 30, 2014, 11 pages.
Non-Final Office Action, U.S. Appl. No. 13/725,816, dated Dec. 12, 2014, 24 pages.
Non-Final Office Action, U.S. Appl. No. 13/725,823, dated May 5, 2015, 38 pages.
Non-Final Office Action, U.S. Appl. No. 13/725,696, dated May 5, 2015, 43 pages.
Non-Final Office Action, U.S. Appl. No. 13/725,737, dated May 14, 2015, 27 pages.
Non-Final Office Action, U.S. Appl. No. 13/725,652, dated May 14, 2015, 43 pages.
Non-Final Office Action, U.S. Appl. No. 13/725,748, dated May 19, 2015, 17 pages.
Non-Final Office Action, U.S. Appl. No. 13/725,819, dated May 21, 2015, 22 pages.
Non-Final Office Action, U.S. Appl. No. 13/725,850, dated Jun. 1, 2015, 25 pages.
Non-Final Office Action, U.S. Appl. No. 13/725,726, dated Mar. 9, 2015, 38 pages.
Non-Final Office Action, U.S. Appl. No. 13/725,860, dated Mar. 17, 2015, 10 pages.
Non-Final Office Action, U.S. Appl. No. 13/725,668, dated Apr. 2, 2015, (40 pages).
Final Office Action, U.S. Appl. No. 13/725,816, dated Apr. 8, 2015, (24 pages).
Non-Final Office Action, U.S. Appl. No. 13/725,765, dated Apr. 24, 2015, (41 pages).
Non-Final Office Action mailed Jul. 9, 2015 for U.S. Appl. No. 13/725,854, 11 pages.
Final Office Action mailed Jul. 13, 2015 for U.S. Appl. No. 13/725,726, 44 pages.
Final Office Action mailed Aug. 4, 2015 for U.S. Appl. No. 13/725,668, 45 pages.
Notice of Allowance mailed Sep. 21, 2015 for U.S. Appl. No. 13/725,860, 12 pages.

* cited by examiner

RELIABLE SERVER TRANSPORT OVER FIBRE CHANNEL USING A BLOCK DEVICE ACCESS MODEL

CROSS-REFERENCE TO RELATED APPLICATIONS

This application is related to a co-pending application of patent application Ser. No. 13/725,652, filed Dec. 21, 2012. This application is related to a co-pending application of patent application Ser. No. 13/725,668, filed Dec. 21, 2012. This application is related to a co-pending application of patent application Ser. No. 13/725,696, filed Dec. 21, 2012. This application is related to a co-pending application of patent application Ser. No. 13/725,816, filed Dec. 21, 2012. This application is related to a co-pending application of patent application Ser. No. 13/725,823, filed Dec. 21, 2012. This application is related to a co-pending application of patent application Ser. No. 13/725,850, filed Dec. 21, 2012. This application is related to a co-pending application of patent application Ser. No. 13/725,726, filed Dec. 21, 2012. This application is related to a co-pending application of patent application Ser. No. 13/725,737, filed Dec. 21, 2012. This application is related to a co-pending application of patent application Ser. No. 13/725,748, filed Dec. 21, 2012. This application is related to a co-pending application of patent application Ser. No. 13/725,765, filed Dec. 21, 2012. This application is related to a co-pending application of patent application Ser. No. 13/725,854, filed Dec. 21, 2012. This application is related to a co-pending application of patent application Ser. No. 13/725,860, filed Dec. 21, 2012. This application is related to a co-pending application of patent application Ser. No. 13/725,819, filed Dec. 21, 2012.

FIELD OF INVENTION

Embodiments of the present invention relate generally to data storage systems. More particularly, embodiments of the invention relate to data communicated across a Fibre Channel network.

BACKGROUND

In modern computer systems, a file system stores and organizes computer files to enable a user to efficiently locate and access requested files. File systems can utilize a storage device such as a hard disk drive to provide local access or provide access to data stored on a remote file server. A file system can also be characterized as a set of abstract data types that are implemented for the storage, hierarchical organization, manipulation, navigation, access, and retrieval of data. The file system software is responsible for organizing files and directories.

Many companies and individuals with large amounts of stored data employ a file system as a data storage system. These data storage systems can be located local to the data to be backed up or at a remote site. The data storage systems can be managed by the entity controlling the data storage devices or a data storage service company. Data can be added to the storage system at any frequency and at any amount.

Data storage systems may offer storage for backup and disaster recovery. Transfer to remote storage may require the transfer of data over a network. One network that allows transferring data across a data storage system is a Fibre Channel network. Fibre Channel allows a server and/or a storage unit to be located at a substantial distance from other components of the data storage system if optical fiber is used as the physical medium. However, optical fiber is not required for shorter distances, as a Fibre Channel network may also be implemented using coaxial cable and ordinary telephone twisted pair.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the Specification to "one embodiment" or "an embodiment" means that a particular feature, structure, or characteristic described in conjunction with the embodiment can be included in at least one embodiment of the invention. The appearances of the phrase "in one embodiment" in various places in the Specification do not necessarily all refer to the same embodiment.

Figure 1:
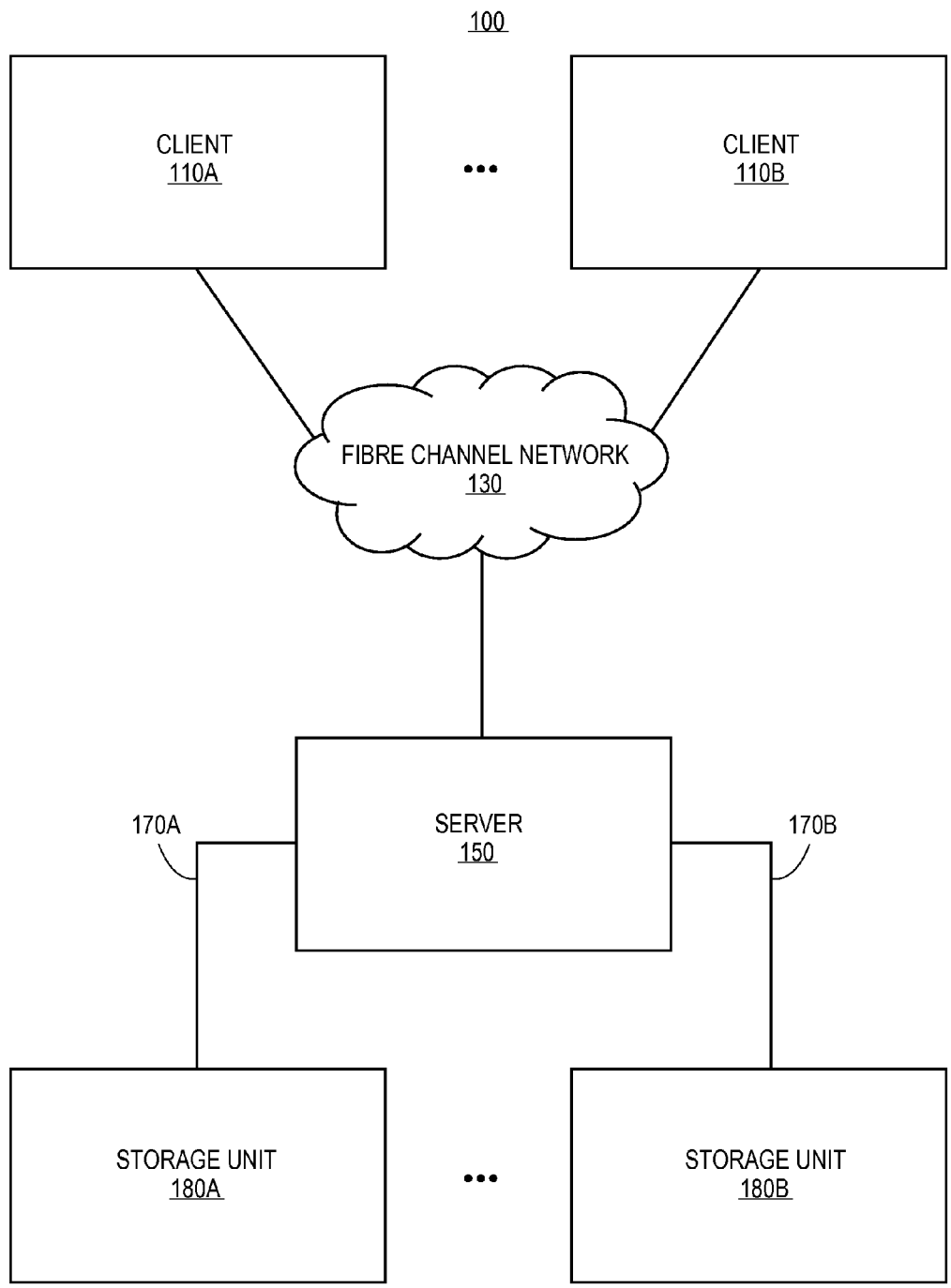
FIG. 1 is a block diagram of one embodiment of a data storage system.

FIG. 1 is a block diagram illustrating a data storage system 100 according to one embodiment of the invention. The data storage system 100 includes, but is not limited to, one or more client systems 110a-110b communicatively coupled by a Fibre Channel (FC) network 130 with a server 150 connected with one or more storage units 180a-180b.

To efficiently transfer data within a data storage system, a request in a data storage system can be sent using a Small Computer System Interface (SCSI) request. SCSI requests traditionally specify a logical block address to be written to or to be read. These requests may be sent over a Fibre Channel network by packaging the SCSI requests as Fibre Channel frames, and unpackaging the SCSI request at the recipient. Responses to SCSI requests may be likewise received over the Fibre Channel network.

A client 110 can be any type of client such as a personal computer (e.g., desktops, laptops, and tablets), a workstation, a handheld device, a Web-enabled appliance, a gaming device, a media player, or a mobile phone (e.g., Smartphone), or any computing system operable to communicate over a Fibre Channel network.

SCSI requests are sent from by clients 110a-110b and received at the server 150 across the FC network 130. FC network 130 can be any type of network using Fibre Channel. In one embodiment, the FC network 130 is a storage area network (SAN). The FC network 130 can feature any suitable network topology. Thus, the FC network 130 can be a point-to-point network. Alternatively, the FC network 130 can be an arbitrated loop network. In another embodiment, the FC network 130 can be a switched fabric network. In such embodiments, the FC network 130 can include one or more Fibre Channel switches (not shown) and visibility of the server 150 and/or clients 110a-110b can be controlled with Fibre Channel zoning.

The server 150 can include any type of server or cluster of servers. For example, the server 150 can be a storage server used for any of various different purposes, such as to provide multiple users with access to shared data and/or to back up mission-critical data. The server 150 can be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape or virtual tap backup device, or essentially any other type of data storage device or a combination thereof. The server 150 can have a distributed architecture, or all of its components can be integrated into a single unit. The server 150 can be implemented as part of an archive and/or backup system such as a deduplication storage system available from EMC® Corporation of Hopkinton, Mass. Additionally, the server 150 can be communicatively coupled with an auxiliary storage system (not shown) similar to the server 150. The auxiliary storage system can duplicate the functionality of the server 150. Alternatively or in addition to the server 150, the auxiliary storage system can provide some additional data warehousing or data manipulation.

As shown in FIG. 1, the server 150 is coupled with one or more storage units 180a-180b. A storage unit 180 can be implemented locally (e.g., single-node operating environment) or remotely (e.g., multi-node operating environment) via an interconnect 170, which can be a bus or a network. In one embodiment, one of the storage units 180a-180b operates as an active storage unit to receive and store external or fresh data, while the other storage unit operates to periodically archive data from the active storage unit according to an archiving policy or scheme. A storage unit 180 can be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. The storage units 180a-180b can also be combinations of such storage devices. In some embodiments, the storage units 180a-180b can be organized into one or more volumes of Redundant Array of Inexpensive Disks (RAID).

Figure 2:
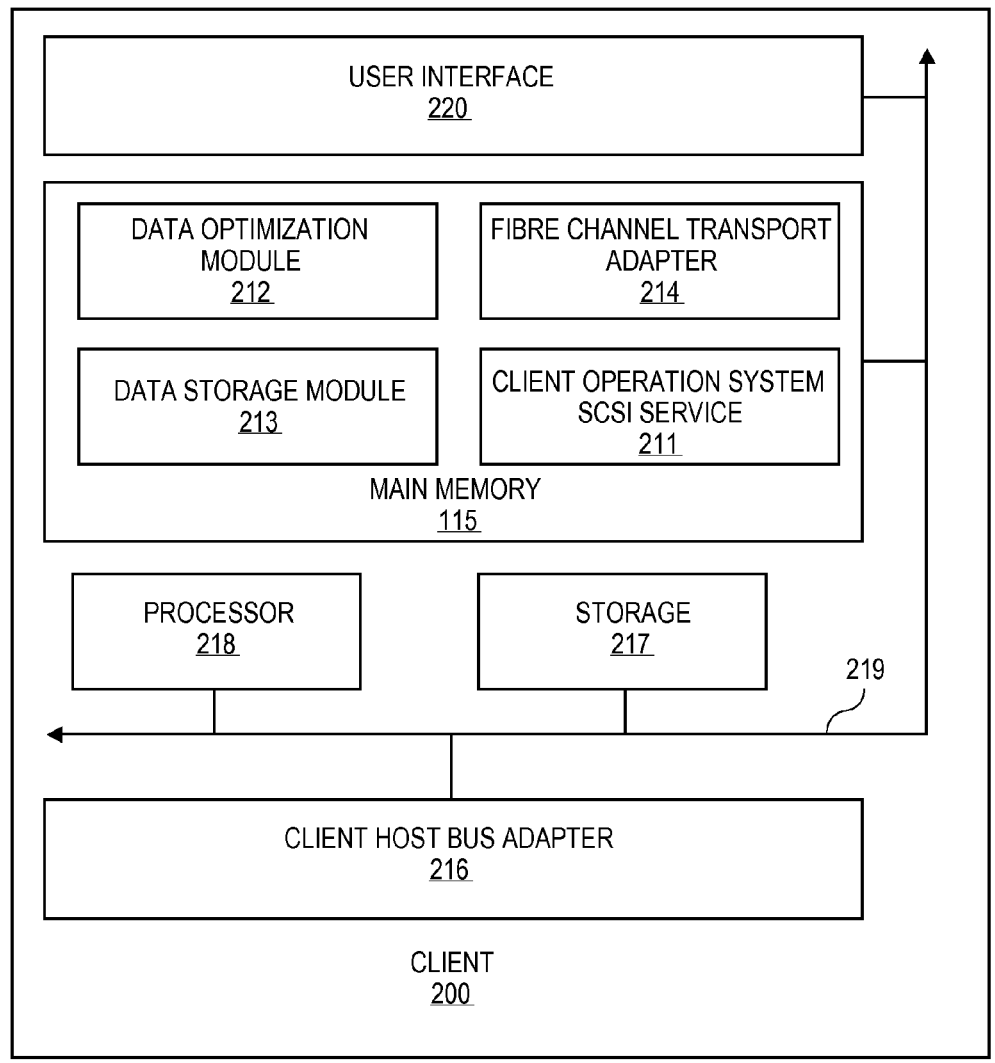
FIG. 2 is a block diagram of one embodiment of a client of a data storage system.

A simple embodiment of a client 200 is illustrated at FIG. 2. The client 200 can be or can include one of clients 110a-110b of FIG. 1. In one embodiment, the client 200 includes, but is not limited to, several components: including a user interface 120, main memory 215, a client host bus adapter 216, storage 217, and a processor 218. These components can be communicatively coupled via a bus 219. The bus 219 can be any communication subsystem or medium adapted to transfer data within the client 200. The bus 219 can be a plurality of computer buses and include additional circuitry to transfer data.

The user interface 220 can allow a user to interact with the client 200, such as a through a graphical user interface (GUI) provided by a module 212-213 or through a command line interface. To realize this, the client 200 can include or can be communicatively coupled with one or more hardware devices (not shown), such as a display and one or more devices suitable for user input (e.g., a keyboard, a mouse, or touch screen).

Storage 217 can be implemented locally (e.g., single-node operating environment) via bus 219 (as shown) or remotely (e.g., multi-node operating environment) via a network (not shown). Storage 217 can be, for example, conventional magnetic disks, optical disks such as CD-ROM or DVD based storage, magnetic tape storage, magneto-optical (MO) storage media, solid state disks, flash memory based devices, or any other type of storage devices suitable for storing data. In some embodiments, storage 217 includes registers, caches or other similar temporary memory components. Though illustrated as a single device, storage 217 can be a combination of several devices, such as volatile and non-volatile memory devices.

The processor 218 can be any processor suitable to execute instructions of the components 211-214 stored in main memory 215. Accordingly, the processor 218 can be, for example, a central processing unit (CPU), a microprocessor, a network processor or other similar processing device. In some embodiments, the processor 218 includes a plurality of processors, such as a dedicated processor (e.g., a graphics processing unit), a network processor, a front end processor, or any processor suitable to execute operations of the client 200 connected with a server by a Fibre Channel network.

Main memory 215 may be coupled with the processor 218. In some embodiments, main memory 215 provides storage of computer readable instructions, data structures, program and application modules, and other data for the client 200. Main memory 215 can include, but is not limited to, a client operating system (OS) Small Computer System Interface (SCSI) service 211, a data optimization module 212, a data storage module 213, and a Fibre Channel (FC) transport adapter 214.

The client OS SCSI service 211 is operable to discover SCSI devices, send SCSI requests and receive SCSI responses across a FC network using a client host bus adapter (HBA) 216. The client OS SCSI service 211 can include any SCSI interface, such as the Windows SCSI Pass Through Interface (SPTI) or the Linux SCSI subsystem. In some embodiments, the client OS SCSI service 211 is operable to discover SCSI devices as one or more logical unit numbers (LUN) advertised by a server. The client OS SCSI service 211 can discover a LUN when the client OS SCSI service 211 is loaded or at any point thereafter—e.g., the client OS SCSI service 211 can be configured to discover the available LUNs at boot time, to periodically discover new or removed LUNs, or to discover available LUNs in the event of an error in communicating with a previously discovered LUN. The client OS SCSI service 211 can create one or more SCSI device entries, such as in a device directory, for each discovered LUN. In some embodiments, multiple SCSI device entries are created at the client 200 for a single LUN to indicate that a client can access that LUN over multiple paths (e.g., one LUN may be advertised at multiple ports of the server host bus adapter 330 at the server 300, and visible through multiple ports of the client host bus adapter 216). These client-side SCSI device entries can be accessed by other components of the client 200, such as the FC transport adapter 214. In some embodiments, the client 200 can support multi-pathing and therefore a single SCSI device entry is created.

The client OS SCSI service 211 can scan the available SCSI devices by sending a SCSI inquiry request for each LUN. The client OS SCSI service 211 can receive a SCSI inquiry response that includes inquiry information associated with the advertised LUN. In some embodiments, the inquiry information includes an indication that this LUN can receive SCSI requests from the client 200 over a FC network, such as a field of the SCSI inquiry response that contains a specific value. A LUN having such an indication represents a transport path between the client 200 and a server over the FC network (e.g., a connection from the client host bus adapter 216 to a server host bus adapter). The inquiry information can also include, for example, a vendor or provider of the server and a SCSI device type. The client OS SCSI service 211 can then store the inquiry information (e.g., at a cache and/or at storage 217) such that the stored inquiry information is accessible by other components of the client 200.

In one embodiment, the client OS SCSI service 211 includes other layers so that SCSI requests and responses can be sent and received over a FC network. The client OS SCSI service 211 can include one or more drivers, such as a driver for the client HBA 216, to present devices advertised over the FC network as standard SCSI devices, which can then be discovered as such. Thus, the one or more drivers can package SCSI requests as FC frames and unpackage SCSI responses from FC frames and route the SCSI responses accordingly, such as by implementing Fibre Channel Protocol.

All or part of the client OS SCSI service 211 can be included in an operating system (not shown) that can be operable to initiate the execution of the instructions provided by components 211-214, interact with the user at the user interface 220 (e.g., by providing a graphical user interface or command line interface and receiving user input), and/or manage hardware (not shown). The operating system may be adapted to perform other operations across the components of the client 200 including threading, resource management, data storage control and other similar functionality.

The data optimization module 212 can identify data (e.g., data at storage 217) that is to be sent to a server and communicate with the FC transport adapter 214 to send or receive data. In one embodiment, the data optimization module 212 provides an application programming interface (API), a dynamic link library (DLL), or other communicative resource that manages or otherwise handles data send and receive operations to be communicated to the server. The data optimization module 212 can be operable to optimize the communication speed between the client 200 and the server, such as by providing data compression and deduplication operations. The data optimization module 212 can identify new or modified data at the client 200 (e.g. data at storage 217) that is to be backed up and/or archived at the server. Additionally, the data optimization module 212 can identify data for the client 200 at the server (e.g., data at a storage unit 180 of server 150).

In some embodiments, data send and receive requests are provided to the data optimization module 212 from the data storage module 213 at the client 200. Accordingly, the data optimization module 212 can communicate with the data storage module 213 in response to the data send and receive requests. The data storage module 213 can be, for example, an application or application suite for backing up and/or archiving data, such as an enterprise-level backup and recovery suite. The data storage module 213 can be configured to specify that data send and receive operations are to be sent to a server over a FC network, such as by having a server identifier or other indicator (e.g., a stored value, a value received as user input, etc.) indicating that data is to be transmitted over the FC network. In some embodiments, some or all of the functionality provided by the data optimization module 212 is combined with the data storage module 213.

To facilitate communication between the data optimization module 212 and a server, the data optimization module 212 can provide a call message to the FC transport adapter 214. The data optimization module 212 can provide a call message to the FC transport adapter 214 for a variety of reasons, such as in response to user input that requires server functionality. In one embodiment, a call message is provided to the FC transport adapter 214 in response to or in anticipation of a data send and receive requests from the data storage module 213. However, the data optimization module 212 can provide a call message to the FC transport adapter 214 for a variety of reasons, and the call message is not limited to backup and/or storage applications. A call message can be, for example, a message requesting a subroutine or procedure to execute at a server process (e.g., a process 315 of server 300), such as a remote procedure call (RPC) message. Additionally, a call message can include data (e.g., data from storage 217, data from a module 212-213, or other data) that is to be sent to the server over the FC network. Thus, the call message can be of any size (e.g., greater than a terabyte). A call message can be, for example, a message to read data from or write data to the server, or a message to retrieve information about data stored at the server. The data optimization module 212 can include data in the call message by, for example, marshaling the data. Correspondingly, the data optimization module 212 can get data in a reply message by unmarshaling. In some embodiments, the data optimization module 212 concatenates a plurality of data send and/or receive requests, into one call message. For example, one call message can include RPC requests to write data and read data.

The data optimization module 212 can provide a call message to the FC transport adapter 214 to be sent to a server over the FC network. To identify a server process for which the message is intended, the data optimization module 212 can provide a process descriptor for the intended server process. The data optimization module 212 can have these process descriptors stored or can provide a call message to the FC transport adapter 214 for a server that is to get a process descriptor for a server process. A call message to get a process descriptor can be, for example, a call message intended for a port mapper process at the server. The FC transport adapter 214 can also be provided a server identifier for the server. The data optimization module 212 can provide the server identifier, such as from a stored value or from the data storage module 213.

The FC transport adapter 214 is operable to receive a call message provided by the data optimization module 212 and adapt the call message for communication to a server over a FC network. The FC transport adapter 214 can adapt the call message to a SCSI request: a call SCSI request. In one embodiment, the FC transport adapter 214 creates a SCSI write request that can include the call message as the request's payload. The FC transport adapter 214 can then identify a connection from the client 200 to the server that is suitable to send the call SCSI request across. To retrieve a reply message to a call message (e.g., a RPC reply message) from the server, the FC transport adapter 214 can create another SCSI request: a reply SCSI request. A reply SCSI request can be a SCSI read request, which the FC transport adapter 214 then sends to the server over the FC network. The FC transport adapter 214 can create the reply SCSI request in response to a request from the data optimization module 212.

In some embodiments, a call SCSI request includes a plurality of messages. The FC transport adapter 214 can receive a plurality of call messages from the data optimization module 212, such as from a staging area and/or storage 117. Accordingly, a call SCSI request can be created that includes the plurality of call messages. Similarly, a reply SCSI response can include a plurality of reply messages. In one embodiment, a call message can be segmented before communication. Consequently, adapting a call message to be sent to the server over the FC network can require a plurality of call SCSI requests, such that each call SCSI request contains a segment of the call message. Likewise, a reply message can be received as a segment of a whole and the FC transport adapter 214 can provide the reply message to the data optimization module 212 as it becomes available.

Accordingly, it is to be understood that call messages and reply messages are not necessarily discrete data requests and responses (e.g., RPC requests and responses) having a one-to-one relationship with SCSI requests and responses and sequentially exchanged. For example, the FC transport adapter 214 can create a plurality call SCSI requests having a plurality of call messages segmentally distributed across the call SCSI requests and send the plurality of call SCSI requests to the server. The FC transport adapter 214 can create one or more reply SCSI requests and, in response, receive one or more reply SCSI responses having a plurality of reply messages segmentally distributed across the one or more reply SCSI responses. Therefore, references to a call message or a reply message adapted to a respective SCSI request or SCSI response (e.g., included in a payload of a SCSI request or response) can denote the message data contained in that particular SCSI request or response, and not necessarily a single or complete RPC request or response.

The FC transport adapter 214 can identify a connection to a server over a FC network using the one or more LUNs discovered by the client OS SCSI service 211. In one embodiment, the FC transport adapter 214 is operable to examine inquiry information for one or more discovered LUNs of one or more SCSI devices advertised by the server. Where the client OS SCSI service 211 has not stored inquiry information for a SCSI device entry, the FC transport adapter 214 can be operable to send a SCSI inquiry request for the LUN and receive the inquiry information for that LUN as a response. The FC transport adapter 214 can determine, using the inquiry information, which LUN(s) advertised by the server can receive SCSI requests over the FC network. In one embodiment, the FC transport adapter 214 makes this determination by examining one or more specific fields of the inquiry information, such as the vendor identification, device identification and/or device type, and verifying that those specific fields match predetermined values for those fields. The FC transport adapter 214 can establish a virtual connection with the server using a LUN indicating that it can receive SCSI requests from the client 200 via the FC network.

The FC transport adapter 214 can establish a connection for one or more messages as a virtual connection. In some embodiments, a virtual connection abstracts the connection from the client 200 to a server to a connection for one or more messages that are to be communicated between the data optimization module 212 and a server process at the server. In some embodiments, the FC transport adapter 214 is operable to receive a process descriptor provided by the data optimization module 212 and, accordingly, establish the virtual connection using the process descriptor. The FC transport adapter 214 can associate a virtual connection with the data optimization module 212. In some embodiments, a virtual connection is associated with the data optimization module 212 by, for example, mapping the virtual connection to the data optimization module 212.

A virtual connection can be identified by a virtual connection identifier, such as a value. The virtual connection identifier can be part of a tuple to guarantee the virtual connection is identifiably unique across space and time; for example, the tuple can include a generation number and/or a verifier value generated by the server so that virtual connection identifier can be recycled. The virtual connection identifier is included in most SCSI requests and SCSI responses for the virtual connection. For example, a SCSI request can include the virtual connection identifier in the logical block address (LBA) field of the SCSI request's command descriptor block (CDB). For some SCSI requests, additional parameters (e.g., a virtual connection tuple and/or a sequence number) can be included in a header added to SCSI request's payload. For call SCSI requests, the call message can be included in the SCSI request's payload. Other SCSI requests, such as a SCSI read request to retrieve a reply message, may only include a portion of the virtual connection tuple (e.g., the low-order four bits of a tuple value) for the virtual connection in the LBA field of the SCSI request's CDB. A reply SCSI response received from the server can include the virtual connection identifier and the reply message in the response's payload. In some embodiments, a reply SCSI request is validated at the server and the reply SCSI response is validated at the client 200.

The FC transport adapter 214 is also operable to track the sent call and reply SCSI requests using counters or other values. In one embodiment, a call sequence number is incremented for each call SCSI request, and a reply sequence number is incremented for each reply SCSI request. Each sequence number is incremented where a SCSI response is received for the SCSI request that does not indicate the SCSI request failed (e.g., aborted at the server or failed during the communication of the SCSI request over the FC network). Thus, the call sequence number is incremented even where the server only accepts a portion, or none, of the call message (e.g., due to insufficient memory at the server). Similarly, the reply sequence number is incremented even where a reply SCSI response includes an incomplete reply message or indicates that no reply message is available at the server. The call and reply sequence numbers can be included in the respective call and reply SCSI requests. However, some SCSI requests (e.g., reply SCSI requests) may only include a bit segment of the sequence number. To acknowledge to the server that a reply SCSI response has been received by the FC transport adapter 214, the FC transport adapter 214 can include in a call SCSI request the reply sequence number of the last reply SCSI request for which a reply SCSI response was received.

In one embodiment, some SCSI responses received from the server include the sequence number. For example, reply SCSI responses include the sequence number in a payload of the reply SCSI response. However, the server does not increment the sequence numbers included in the SCSI responses. For reply SCSI responses, the FC transport adapter 214 can validate a reply SCSI response by comparing the sequence number included in the reply SCSI response to the actual sequence number for the reply SCSI request. In instances in which the sequence numbers do not match, the FC transport adapter 214 closes the virtual connection and/or discards the reply message.

The FC transport adapter 214 can retry failed or aborted SCSI requests without incrementing the sequence number. For example, the FC transport adapter 214 can retry a SCSI request where the FC transport adapter 214 receives an indication that the SCSI request failed or where a timeout for the SCSI response expires. The FC transport adapter 214 can use the same sequence number for a subsequent SCSI request that recreates the failed SCSI request to ensure that the client's sequence number matches the server's expected sequence number. The FC transport adapter 214 then transmits the recreated SCSI request to the server over the FC network.

The FC transport adapter 214 can additionally identify the transport path for a call SCSI request or a reply SCSI request. The transport path is a path over the FC network between the client 200 and the server, such as a connection between the client host bus adapter 216 and the server host bus adapter 330. In some embodiments, the transport path includes a physical component and a logical component. The physical component includes the physical path between the client HBA 216 and a server HBA, such as the server HBA 330. The physical path can include, for example, respective World Wide Names for the client HBA 216 and the server HBA 330, such as a World Wide Port Name (WWPN) for a port of the client HBA 216 of the client 200 and the WWPN for a port of the HBA 330 of the server 300. In one embodiment, World Wide Node Names (WWNN) can be included. The logical component can include a LUN or other identifier for a SCSI device advertised by the server.

In one embodiment, the transport path is identified by issuing a SCSI request for one of the SCSI device entries and the SCSI response can include the transport path in its payload. The FC transport adapter 214 can use any suitable SCSI device entry as the transport path. In some embodiments, the FC transport adapter 214 identifies the transport path in response to a SCSI response from the server. The FC transport adapter 214 can create a SCSI request to be sent over a FC network and provide the transport path to the client OS SCSI service 211, which will then use that transport path to the server. For example, all SCSI requests issued for one SCSI device entry are sent by the client OS SCSI service 211 to the same LUN advertised at the same port of one server host bus adapter.

The client host bus adapter 216 is operable to perform the physical transmission of the SCSI requests and SCSI responses between the client 200 and a server HBA of a server (e.g., the server host bus adapter 330 of the server 300). One or both of the HBAs 216, 330 can be Fibre Channel interface cards. Each HBA 216, 330 has a World Wide Name (WWN) for the respective HBA—a node WWN (WWNN), which is shared by all ports on a respective HBA 216 or 330—and a port WWN (WWPN), which is unique to each port of a respective HBA 216 or 330. As described above, the FC transport adapter 214 can provide the transport path to the client OS SCSI service 211. Accordingly, the client OS SCSI service 211 uses the client HBA 216 to send a SCSI request over the FC network using the provided transport path (or the physical component therein). Note that although only one client HBA 216 is illustrated, the client 200 can have more than one client HBA. Furthermore, the client HBA 216 can have more than one port (either physical or virtual). Multiple client HBAs and/or multiple ports of the same client HBA can be connected with multiple ports (either physical or virtual) of one or more server HBAs (e.g., server HBA 330) at the server.

Figure 3:
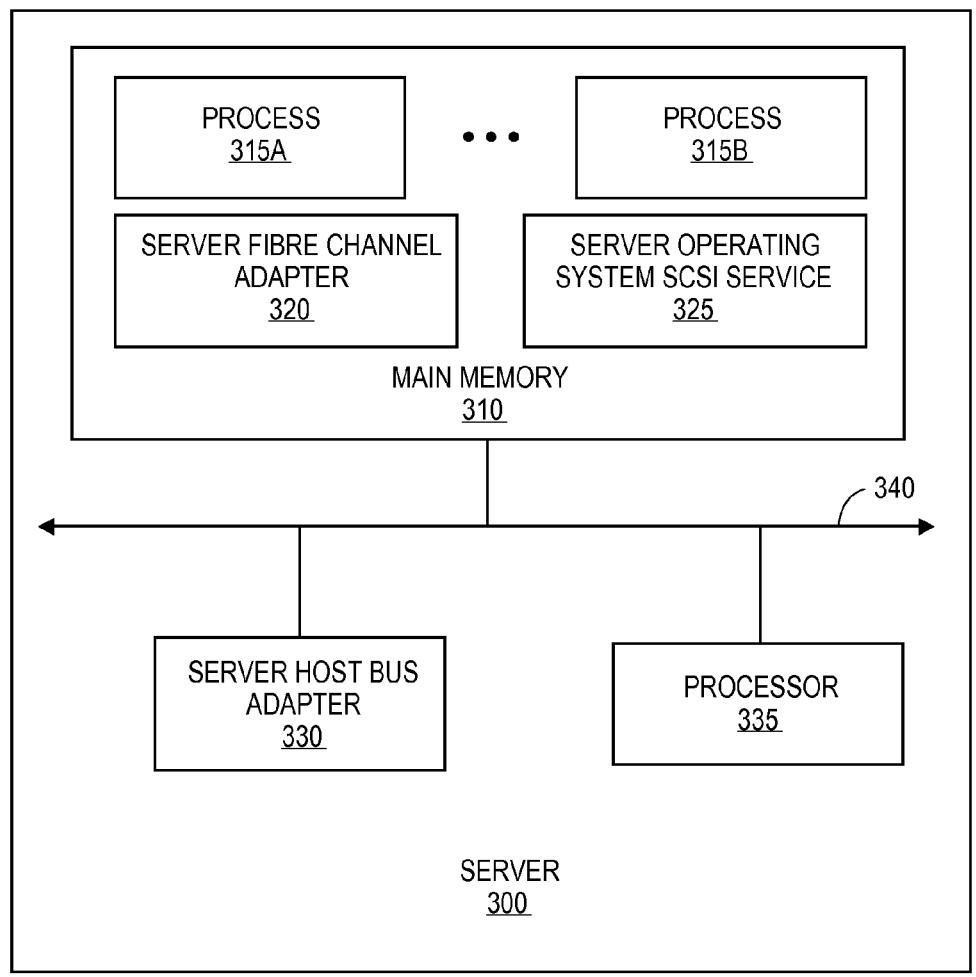
FIG. 3 is a block diagram of one embodiment of a server of a data storage system.

Turning now to FIG. 3, a simple embodiment of a server 300 is shown. The server 300 can be or can include the server 150 of FIG. 1 and can be coupled with one or more local or remote storage units (e.g., the storage units 180a-180b). The server 300 includes, but is not limited to, several components: including main memory 310, a processor 335, and a server host bus adapter 330. These components may be communicatively coupled through a bus 340. The bus 340 can be any subsystem adapted to transfer data within the server 300. The bus 340 can be a plurality of computer buses and include additional circuitry to transfer data.

The server host bus adapter 330 is operable to receive the physical transmission of SCSI requests over the FC network 130 from a client. Though only one server HBA 330 is illustrated, a server 300 can have more than one server HBA. Furthermore, the server HBA 330 can have more than one port (either physical or virtual). Multiple server HBAs and/or multiple ports of the same server HBA can be connected with multiple ports (either physical or virtual) of one or more client HBAs at a client.

The processor 335 can be any processor suitable to execute instructions of the components 315-325 stored in main memory 310. Accordingly, the processor 335 can be, for example, a central processing unit (CPU), a microprocessor, or other similar processor. In some embodiments, the processor 335 includes a plurality of processors, such as a dedicated processor (e.g., a graphics processing unit), a network processor, or any processor suitable to execute operations of the server 300 connected with a client by a Fibre Channel network.

Main memory 310 may be coupled to the processor 335. In some embodiments, main memory 310 provides storage of computer readable instructions, data structures, program modules, and other data for the server 300. Main memory 310 can include, but is not limited to, one or more processes 315a-315b, a server Fibre Channel (FC) adapter 320, and a server OS SCSI service 325.

The server OS SCSI service 325 can include, but is not limited to, components operable to handle SCSI requests and responses using the server HBA 330, such as the SCSI layers (e.g., SCSI interconnect layer, SCSI transport layer, other SCSI layers) and interrelated elements to appropriately route received SCSI requests and send SCSI responses for a client over a FC network.

In one embodiment, the server OS SCSI service 325 is operable to manage the fundamental SCSI-over-Fibre Channel configuration at the server 300. The server OS SCSI service 325 can provide hardware management of the server HBA 330 and the transport path between a client and the server HBA 330, and can therefore include one or more drivers (e.g., a target-mode driver to provide a data path between the client and other SCSI layers of the server OS SCSI service 325, and/or a virtual host bus driver to route SCSI requests from the server OS SCSI service 325 to the server FC adapter 320). One such driver can be for the server HBA 330, so that SCSI devices can be advertised over a FC network. This driver can package SCSI responses as FC frames and unpackage SCSI requests from FC frames and route the SCSI requests accordingly, such as by implementing Fibre Channel Protocol. Additionally, the server OS SCSI service 325 can provide logical management, such as mapping advertised LUNs, managing the namespace of one or more LUNs, and routing SCSI requests.

In one embodiment, the server OS SCSI service 325 is operable to receive SCSI requests and provide those SCSI requests to the server FC adapter 320. Additionally, the server OS SCSI service 325 is operable to receive SCSI responses from the server FC adapter 320 and send the SCSI responses to a client over a FC network in response to a SCSI request from the client. The server OS SCSI service 325 can also implement some SCSI functionality, such as sending a SCSI response to a SCSI report LUNs request.

In one embodiment, the server OS SCSI service 325 advertises one or more LUNs to a client over a FC network. A LUN can be advertised at one or more ports of the server HBA 330 and/or at other HBAs (not shown). A LUN can be mapped to a SCSI device created by the server FC adapter 320. Accordingly, SCSI requests to such a LUN can be routed to the server FC adapter 320. The server FC adapter 320 can specify the advertisement of LUNs by the server OS SCSI service 325, such as by specifying a client to which the LUN is to be advertised or specifying a port of the server HBA 330.

All or part of the server OS SCSI service 325 can be included in an operating system (not shown) that is operable to initiate the execution of the instructions provided by components 315-320 and/or manage hardware (not shown). The operating system may be adapted to perform other operations across the components of the server 300 including threading, resource management, data storage control and other similar functionality.

With respect to the processes 315a-315b, a process 315 can be, for example, an instance of a program at the server 300, such as a set of machine-readable instructions that are executed by the processor 335. A process can be a file system process (e.g., a read/write process for data stored at a storage unit 180). Multiple processes can run concurrently at the server 300. For example, a file system may have different processes 315a-315b. Additionally, multiple processes 315a-315b can accommodate multiple clients that are concurrently connected with the server 300.

Preferably, each process 315a-315b has a descriptor associated with it at the server 300. In one embodiment, the descriptor is a port number, and a port for a process 315 can be maintained by a port map. Additionally, a process (e.g., the process 315a) can identify other processes (e.g., the other process 315b), such as by providing a port map. A process 315 can service call messages from the server FC adapter 320 that originated at a client, such as by unmarshaling the call message, marshaling data in response to the call message (e.g., a reply message), and/or writing data from the call message to a storage unit (e.g., a storage unit 180). The process 315 can then send a reply message to the server FC adapter 320. To receive call messages and send reply messages, the server 300 can provide a server messaging service so that the messages are communicated between the server and the client over the FC network.

The server FC adapter 320 can receive SCSI requests from and provide SCSI responses to the server OS SCSI service 325. Thus, the server FC adapter 320 handles, among other SCSI requests, the SCSI write, SCSI read and SCSI inquiry requests from a client. To that end, the server FC adapter 320 implements the server side of a virtual connection with a client. In some embodiments, the server FC adapter 320 creates one or more SCSI devices, which then are mapped to one or more LUNs. A device can be of any type, such as a processor SCSI device, or any other SCSI device type, such as a communications SCSI device. The LUNs are then advertised to a client, as described above.

Importantly, because the server FC adapter 320 creates a SCSI device so that SCSI requests for the associated LUN are routed to the server FC adapter 320, instead of to a logical disk or physical device, the LUN is effectively a rendezvous point at the server FC adapter 320 for SCSI requests sent to the server 300 over a FC network. Consequently, the server FC adapter 320 can accept multiple client SCSI requests to a single LUN. Furthermore, this allows the LBA field of SCSI requests to include values that are not an actual logical block address. For example, the LBA field can include the virtual connection identifier instead of an actual logical block address for the created SCSI device.

The server FC adapter 320 can implement the SCSI inquiry request sent by a client to describe an advertised LUN by, for example, responding with a SCSI response indicating that the LUN can receive SCSI requests over a FC network. Thereafter, the server FC adapter 320 can receive one or more SCSI requests over the FC network from the client to establish a virtual connection. The server FC adapter 320 can respond to such requests by assigning a virtual connection identifier for the virtual connection. The virtual connection identifier can be part of a tuple to guarantee the virtual connection is identifiably unique across space and time; for example, the tuple can include a generation number and/or a verifier value generated by the server FC adapter 320. Additionally, the server can identify a transport path over the FC network that the client is to use for the virtual connection by, for example, selecting the transport path from a catalog of transport paths provided by the client.

The server FC adapter 320 can also associate a process 315 with the virtual connection by, for example, using a process descriptor for the process 315 provided in a SCSI request for a virtual connection from a client. Once a virtual connection is established, the server FC adapter 320 is able to handle SCSI requests that include the virtual connection identifier using the associated process 315. The server FC adapter 320 can provide call messages to a process 315 by, for example, extracting a call message from a call SCSI request originating at a client and providing the call message to the process 315. Thereafter, the server FC adapter 320 can respond to the call SCSI request with a status code (e.g., a SCSI status code or a vendor-specific status code) indicating the all or part of the call message has been accepted.

In response to the call message, a process 315 can provide a reply message to the server FC adapter 320. Where the server FC adapter 320 subsequently receives a reply SCSI request for the virtual connection, the server FC adapter 320 can respond by creating a reply SCSI response that includes the virtual connection identifier and the reply message in the payload.

In one embodiment, the server FC adapter 320 can associate a process 315 with a virtual connection by establishing a backend connection from the server FC adapter 320 to a process 315. This connection can be, for example, a localhost connection or other transmission control protocol (TCP) connection established using a process descriptor (e.g., a port number) for a process 315. Accordingly, server FC adapter 320 can associate the virtual connection identifier with the process 315 using the backend connection.

The server FC adapter 320 is also operable to monitor the expected received call and reply SCSI requests using counters or other values. An expected sequence number can be included in a SCSI response from the server FC adapter 320. In one embodiment, an expected call sequence number is incremented for each call SCSI response to a received call SCSI request, and an expected reply sequence number is incremented for each reply SCSI response to a received reply SCSI request. Each expected sequence number is incremented after a SCSI response is provided to the server OS SCSI service 325 to be sent to a client over a FC network. A respective expected call sequence number is incremented even where the server FC adapter 320 only accepts a portion, or none, of a call message (e.g., due to insufficient memory at the server). Similarly, the reply sequence number is incremented even where the server FC adapter 320 only includes an incomplete reply message, or returns an indication that no reply message is available.

SCSI requests received at the server FC adapter 320 from a client can include the sequence number, or a portion thereof. For example, call SCSI request includes the call sequence number in a payload of the reply SCSI response. However, the server FC adapter 320 does not increment the sequence numbers included in the SCSI responses; rather, the expected sequence numbers are only incremented after the SCSI responses are provided to the server OS SCSI service to be sent to a client over a FC network.

The server FC transport adapter 320 can validate SCSI requests received from a client according to the actual sequence numbers included in the SCSI requests. For SCSI requests that include the full sequence number (e.g., call SCSI requests), the server FC transport adapter 320 can validate the SCSI request by comparing the sequence number included in the call SCSI request to the expected call sequence number. For SCSI requests that include only a portion of the sequence number (e.g., reply SCSI requests), the server FC transport adapter 320 can validate a reply SCSI request by comparing the portion of the sequence number included in the reply SCSI request to the corresponding portion of the expected reply sequence number. The server FC adapter 320 validates a sequence number included in a SCSI request that matches the excepted sequence number. In some embodiments, the server FC adapter 320 validates a sequence number included in a SCSI request that indicates a retried SCSI request (e.g., the expected sequence number is an increment greater than the actual sequence number in the SCSI request). In instances in which the sequence numbers do not match and do not indicate a retried SCSI request, the SCSI request is erroneous and may be discarded or responded to with an indication that the sequence number is erroneous.

Because a client can retry failed or aborted SCSI requests without incrementing the sequence number, the server FC adapter 320 is operable to handle situations in which the sequence number included in the SCSI request indicates a retried SCSI request. For retried call SCSI messages, the server FC adapter 320 again responds with a call SCSI response indicating that all or part of the call message from the call SCSI request has been accepted. For retried reply SCSI messages, the server FC adapter 320 again responds with a reply SCSI response including all or part of the reply message, which may be stored in a buffer or cache until the server FC adapter 320 receives an acknowledgement from the client that the reply SCSI message has been received by the client. The server FC adapter 320 then sends the stored SCSI response to the client over a FC network.

It should be appreciated that embodiments of the invention as will be hereinafter described may be implemented in conjunction with the execution of instructions by a processor (e.g., processor 218 or processor 335) of a client 110 or the server 150 and/or other circuitry of a client 110 or the server 150. Particularly, circuitry of both a client 110 and the server 150, including but not limited to a respective processor can operate under the control of a program, routine, or the execution of instructions to execute methods or processes in accordance with embodiments of the invention. For example, a data optimization module at a client 110 may be implemented in firmware, software (e.g., stored in main memory) or hardware and may be implemented by a processor and/or other circuitry of the client 110. Further, it should be appreciated that the terms processor, microprocessor, circuitry, controller, etc., refer to any type of logic or circuitry capable of executing logic, commands, instructions, software, firmware, functionality and the like.

Figure 4A:
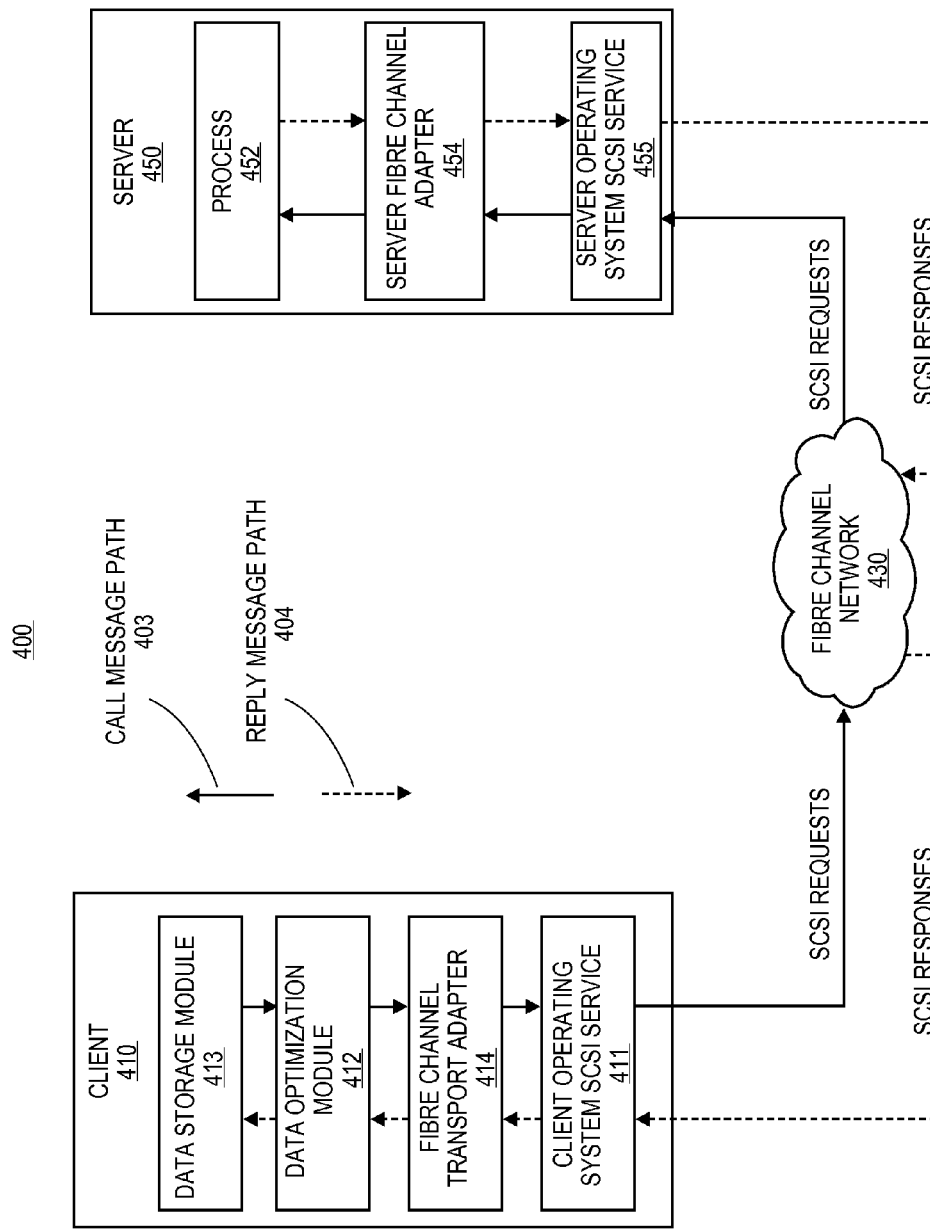
FIG. 4A is a conceptual block diagram illustrating communication paths over a Fibre Channel network connecting a client with a server according to one embodiment of the invention.

FIG. 4A illustrates a conceptual block diagram of message communication between a client 410 and a server 450 using SCSI requests over a FC network 430. The client 410 can be or can include the client 200 of FIG. 2 and, accordingly, the data storage module 413 can be the data storage module 213, the data optimization module 412 can be the data optimization module 212, the FC transport adapter 414 can be the FC transport adapter 214 and the client OS SCSI server 411 can be the client OS SCSI server 211. The server 450 can be or can include the server 300 of FIG. 3 and, accordingly, the process 452 can be a process 315a-315b, the server FC adapter 454 can be the server FC adapter 320 and the server OS SCSI service 455 can be the server OS SCSI service 325. Illustrative embodiments of methods for the system 400 of FIG. 4A are described at FIGS. 5-14.

Beginning first with the server 450, the server FC adapter 454 creates one or more SCSI devices, which are mapped to one or more LUNs to be advertised to the client 410. As described above, the LUN is effectively a rendezvous point at the server FC adapter 454 for SCSI requests sent to the server 450 over the FC network 430. Consequently, the server FC adapter 454 can accept multiple client SCSI requests from multiple clients to a single LUN. Furthermore, this allows the LBA field of SCSI requests to include values that are not an actual logical block address. For example, the LBA field can include the virtual connection identifier and low-order bits of the actual sequence number. The server OS SCSI service 455 advertises the created LUN to the client 410 over the FC network 430.

Turning to the client 410, the client SCSI OS service 411 discovers an advertised LUN as a SCSI device and identifies the LUN as such, e.g., by creating a SCSI device entry. The FC transport adapter 414 can then examine the discovered LUN to determine if the LUN is a transport path over the FC network 430 to the server FC adapter 454, such as by sending a SCSI read request to retrieve server information.

To communicate a message using SCSI requests and responses, the data optimization module 412 can provide a process descriptor to the FC transport adapter 414. The process descriptor identifies a server process 452 to which the module 412 is attempting to communicate a call message. The FC transport adapter 414 can then establish a virtual connection by receiving a virtual connection identifier for the virtual connection and by sending a SCSI request to the discovered LUN that includes the process descriptor. The server OS SCSI service 455 receives the SCSI request for the LUN and routes the SCSI request to the server FC adapter 454. Using the process descriptor in the SCSI request, the server FC adapter associates the virtual connection with the process 452.

After providing the process descriptor, the module 412 provides the call message to the FC transport adapter 414. In one embodiment, the call message is provided in response to a data send or receive request from the data storage module 413. The FC transport adapter 414 adapts the call message to be communicated over the FC network 430 as a SCSI request by, for example, creating a call SCSI request that includes the virtual connection identifier in the LBA field of the SCSI request and the call message in a payload of the SCSI request. In some embodiments, the payload includes a header added by the FC transport adapter 414 that includes other parameters (e.g., a virtual connection tuple, full call sequence number, etc.). The FC transport adapter 414 then sends the call SCSI request over the FC network 430 to the discovered LUN using the client OS SCSI service 411.

The call SCSI request is then received over the FC network 430 by the server OS SCSI service 455. The server OS SCSI service 455 routes the call SCSI request to the server FC adapter 454. The server FC adapter 454 receives the call SCSI request and examines LBA field of the call SCSI request's CDB to validate or identify the virtual connection. Once the server FC adapter 454 has validated the virtual connection, the server FC adapter extracts the call message from the call SCSI request, such as by separating it from the SCSI-specific data (e.g., the CDB) and from the header included in the request payload. The server FC adapter 454 then provides the call message to the server process 452. In response to the call message, the process 452 services the call message and provides a reply message to the server FC adapter 454.

Thus, the call message traverses the call message path 403 as a call message that is adapted to a SCSI request, sent over the FC network 430, extracted from the SCSI request, and then provided to the intended process 452. To retrieve a reply message to the call message, the FC transport adapter 414 creates a reply SCSI request. The reply SCSI request includes the virtual connection identifier in the LBA field of the SCSI request. The FC transport adapter 414 then sends the reply SCSI request over the FC network 430 to the discovered LUN using the client OS SCSI service 411. In some embodiments, the reply SCSI request is created in response to a request from the data optimization module to get the reply message. Additionally, the FC transport adapter 414 can create and send a plurality of SCSI requests having one or more call messages before creating and sending the reply SCSI request.

The server OS SCSI service 455 then receives the reply SCSI request over the FC network 430. The server OS SCSI service 455 routes the reply SCSI request to the server FC adapter 454. The server FC adapter 454 receives the reply SCSI request and examines the LBA field of the reply SCSI request's CDB to validate or identify the virtual connection. Once the server FC adapter 454 has validated the virtual connection, the server FC adapter 454 adapts the reply message to a SCSI response. The server FC adapter 454 adapts the reply message to be communicated over the FC network 430 as a SCSI response by, for example, creating a reply SCSI response that includes the reply message in a payload of the SCSI response. The response payload can include a header added by the server FC adapter 454 that includes the virtual connection identifier and/or other parameters (e.g., a virtual connection tuple, reply sequence number, etc.). The server FC adapter 454 then responds to the reply SCSI request by sending the reply SCSI response over the FC network 430 using the server OS SCSI service 455.

The client OS SCSI service 411 then receives the reply SCSI response over the FC network 430. The client OS SCSI service 411 routes the reply SCSI response to the FC transport adapter 414. The FC transport adapter 414 receives the reply SCSI response and examines the header of the response's payload to validate or identify the virtual connection. Once the FC transport adapter 414 has validated the virtual connection, the FC transport adapter 414 extracts the reply message from the reply SCSI response, such as by separating it from the SCSI-specific data and from the header included in the response payload. The FC transport adapter 414 then provides the reply message to the module 412. Thus, the reply message traverses the reply message path 404 as a reply message that is adapted to a SCSI response, sent over the FC network 430, extracted from the SCSI response, and then provided to the module 412.

Figures 4B, 4C, 4D:
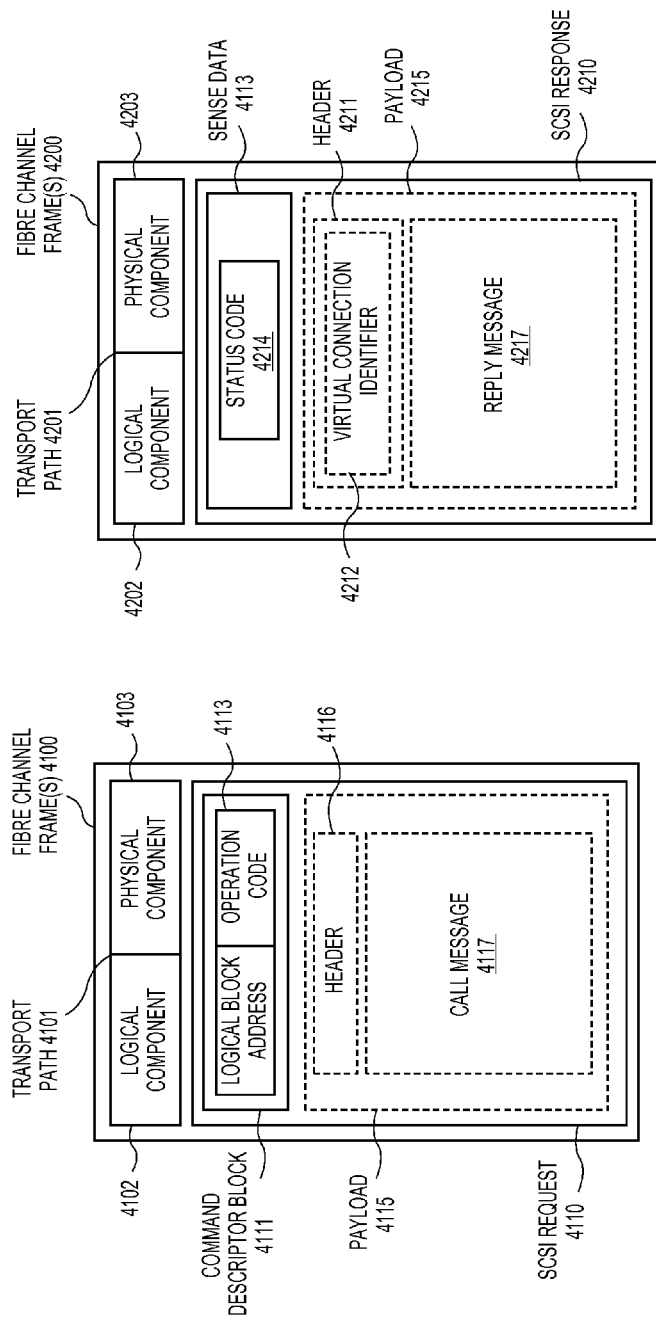
FIG. 4B is a block diagram illustrating one embodiment of a SCSI request adapted for communication over a Fibre Channel network from a client to a server.
FIG. 4C is a block diagram illustrating one embodiment of a SCSI response adapted for communication over a Fibre Channel network from a server to a client.
FIG. 4D is a block diagram illustrating one embodiment of a logical block address field included in a command descriptor block of a SCSI request adapted for communication over a Fibre Channel network from a client to a server.

To illustrate the communication between the client 410 and the server 450 of FIG. 4A, FIGS. 4B and 4C show embodiments of structures of SCSI requests and responses communicated over the FC network 430. FIG. 4B shows a SCSI request 4110 that can be a SCSI write request or a SCSI read request. In the latter case, the SCSI request 4110 does not include a payload 4115. The SCSI request 4110 is packaged as a Fibre Channel frame 4100 (or multiple frames, if appropriate) that includes a transport path 4101 between the client 410 and the server 450 along the FC network 430. In one embodiment, the FC transport adapter 414 specifies the transport path 4101 by issuing the SCSI request 4110 to the client-side SCSI device entry for the discovered LUN. Consequently, the FC frame 4100 having the SCSI request 4110 traverses the FC network 430 from the client 410 to the server 450 according to the physical component 4103. Once received by the server 450, the server OS SCSI service 455 can route the SCSI request 4110 to the server FC adapter 454 according to the logical component 4102.

Prior to being packaged as the FC frame 4100, the FC transport adapter 414 can create the SCSI request 4110. For many SCSI requests, the FC transport adapter 414 adopts the LBA field 4112 of the SCSI protocol to contain the virtual connection identifier for the virtual connection between the client 410 and the server 450 over the FC network 430. However, the LBA field 4112 of an initial SCSI request to begin the establishment of a virtual connection can instead include an indication that the client 410 wishes to establish a virtual connection with the server 450 (e.g., using a predetermined value or flag). In other embodiments, the FC transport adapter 414 can likewise omit a virtual connection identifier from the LBA field 4112 of a SCSI request for an operation not requiring a virtual connection (e.g., a SCSI request to log a message at the server FC adapter 454). Additionally, the FC transport adapter 414 can include other parameters in the LBA field 4112 beyond a virtual connection identifier or an indicator.

In some embodiments, such as SCSI read requests, the SCSI request 4110 may not include any parameters outside of those added to a CDB 4111 by the FC transport adapter 414. In other embodiments of the SCSI request 4110, such as SCSI write requests, the FC transport adapter 414 creates the payload 4115. The FC transport adapter 414 can include a header 4116 in the payload 4115. The content of the header 4116 varies according to the embodiment of the SCSI request 4110. For example, the FC transport adapter 414 can add parameters to the header 4116 such as a process descriptor, a catalog of transport paths, a virtual connection tuple, a request type (e.g., a code for virtual connection establishment or to send a call message), or, if applicable, information about a call message 4117 (e.g., a byte size, a byte sequence number, or a call sequence number) or an acknowledgement that a previous SCSI response sent by the server 450 has been received (e.g., a reply sequence number of a last-received reply SCSI response). Additionally, the FC transport adapter 414 can include all or part of a call message 4117, such as a call message provided by the data optimization module 412. The created SCSI request 4110 can then be packaged as the FC frame 4100 and sent to the server 450 over the FC network 430.

At the server 450, the server FC adapter 454 examines the LBA field 4112 included in the CDB 4111 of the SCSI request 4110. The server FC adapter 454 can use the included virtual connection identifier either alone or in combination with other parameters of the SCSI request 4110, such as a SCSI operation code 4113, to validate or handle the SCSI request 4110. Where included, the server FC adapter 454 can also examine the header 4116 for validation and handling. For call SCSI requests, the server FC adapter 454 can extract the call message 4117 and provide the call message 4117 to the server process 452.

In response to a client SCSI request, the server 450 can send a SCSI response 4210 to the client 410 over the FC network 430, as shown in FIG. 4C. Similar to the SCSI request 4110, the SCSI response 4210 is packaged as a FC frame 4200 (or multiple frames, if appropriate) to be sent to the client 410 along the FC network 430. In one embodiment, the transport path 4201 is the same as that of the client SCSI request to which the SCSI response 4210 is responsive. Once received by the client 410 over the FC network 430, the client OS SCSI service 411 can route the SCSI response 4210 to the FC transport adapter 414.

For many SCSI responses, the server FC adapter 454 creates the SCSI response 4210 prior to its being packaged as the FC frame 4200. In some embodiments, the server FC adapter 454 adopts the sense data 4113 of the SCSI protocol to contain a status code 4214 responsive to the client SCSI request. For example, the status code 4214 can indicate that the client SCSI request has been completely or incompletely processed by the server FC adapter 454, that the client SCSI request has been rejected by the server FC adapter 454, or other status related to the client SCSI request. The status code 4214 can comprise a number of values so that a meaningful status is conveyed; for example, the status code 4214 can be a combination of a generic status code (e.g., "check condition") and a vendor-specific status code (e.g., an indication that only a segment of a call message has been accepted or an indication that a reply message is not available). Additionally, the server FC adapter 454 can include further information about the status code 4214, such as by including in the sense data 4213 a vendor-specific value or a number of bytes of a call message that have been accepted.

In some instances, the server FC adapter 454 does not create the SCSI response 4210. For example, the client SCSI request may be aborted before reaching the server FC adapter 454 and, therefore, the SCSI response 4210 includes an "aborted" status code 4214 originating at a component that aborted the client SCSI request (e.g., the server OS SCSI service 455).

In some embodiments, such as SCSI responses to call SCSI requests from the client 410, the SCSI response 4210 may not include any parameters outside of the status code 4214 or the sense data 4213. In other embodiments of the SCSI response 4210, the server FC adapter 454 creates a payload 4215. The server FC adapter 454 can include a header 4211 in the payload 4215. The header 4211 can include a virtual connection identifier 4212 as well as other parameters, such as a virtual connection tuple, a request type (e.g., a code for virtual connection establishment or to send a reply message), a request for the client 410 to migrate to a new transport path or, if applicable, information about a reply message 4217 (e.g., a byte size, a byte sequence number, or a reply sequence number). Additionally, the server FC adapter 454 can include all or part of a reply message 4217, such as a reply message provided by the server process 452. The created SCSI response 4210 can then be packaged as the FC frame 4200 and sent to the client 410 over the FC network 430.

At the client 410, the FC transport adapter 414 examines the status code 4214 included in the sense data 4213 of the SCSI response 4210. The FC transport adapter 414 can use the status code 4214 either alone or in combination with other parameters of the SCSI response 4210 to validate or handle the SCSI response 4210. Where included, the FC transport adapter 414 can examine the header 4211 for validation and handling. For reply SCSI responses, the FC transport adapter 414 can extract the reply message 4217 and provide the reply message 4217 to the data optimization module 412.

FIG. 4D illustrates an embodiment of a logical block address field 4300 included in a CDB of a client SCSI request that has been created by the FC transport adapter 414 for a virtual connection. In the illustrated embodiment, the LBA field 4300 is divided into five discrete fields: a virtual connection identifier 4301, a sequence number 4302, a generation number 4303, a byte padding 4304, and a timeout 4305. Thus, the LBA field 4300 does not address an actual location of data or data blocks, but can be handled by the server FC adapter 454 to communicate messages over the FC network 430 using the SCSI protocol.

In FIG. 4D, the virtual connection identifier 4301 is included to identify a virtual connection which the FC transport adapter 414 is to use to communicate messages over the FC network 430. The sequence number 4302 is included to monitor or validate an associated one of a reply message or a call message. Similarly, a generation number 4303 of a virtual connection tuple is included to validate the SCSI request. The byte padding 4304 is included to indicate a number of padding bytes included in SCSI requests and responses. The byte padding 4304 can be included in some embodiments because the FC transport adapter 414 and the server FC adapter 454 use SCSI read and write requests to transfer data of any size, but the SCSI requests operate in units of block that are customarily 512 bytes. Finally, a timeout 4305 is included to indicate an expected maximum duration for a SCSI request to be serviced or for a SCSI response to be received. In some embodiments, one or more parameters 4301-4305 can be a bit-segment of a full parameter, such as a low-order bit segment of the sequence number 4302 or the generation number 4303.

Importantly, the parameters included in the LBA field 4300 of FIG. 4D are to be regarded as illustrative and not limiting. Other parameters are used in other embodiments of the LBA field 4300. For example, the LBA field of an initial SCSI request to begin the establishment of a virtual connection can instead include an indication that the client 410 wishes to establish a virtual connection with the server 450 (e.g., a predetermined value or flag).

Figure 5:
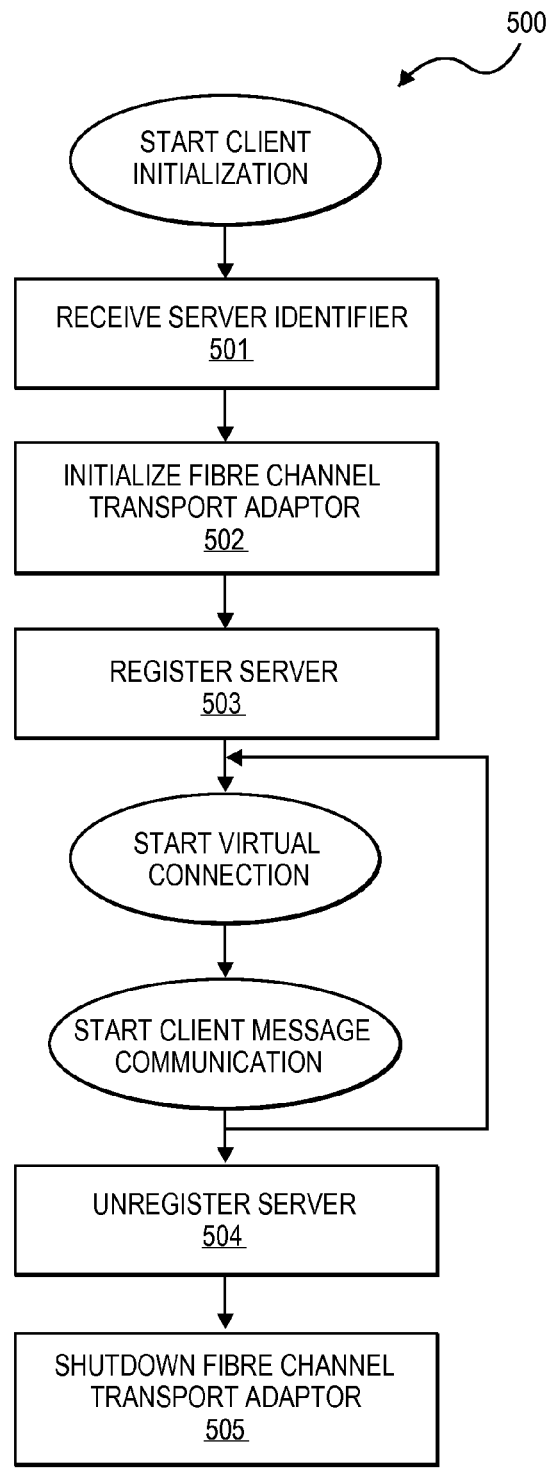
FIG. 5 is a flowchart illustrating one embodiment of a method for initializing a client that is connected with a server by a Fibre Channel network.

Turning to FIG. 5, a method 500 for initializing a client is illustrated according to one embodiment of the invention. The client can be initialized for connecting with a server over a Fibre Channel network so that the client can send SCSI requests to and receive SCSI responses from the server. The method 500 can be performed by a client 110 of FIG. 1 to connect with the server 150 over the FC network 130.

Beginning first with operation 501, an identifier for the server is received at the client. In one embodiment, the server identifier can be received as input at the client. For example, a user can input the server identifier at an interface of the client, such as a graphical user interface (GUI) provided by a module at the client or a command line interface. In some embodiments, the server identifier can be a stored value.

At operation 502, a FC transport adapter at the client is initialized. The initialization can occur, for example, when the client boots up, in response to a module at the client, or in response to user input. In some embodiments, operations 502 and 501 are transposed or are concurrent so that the FC transport adapter is initialized before or simultaneously with the reception of the identifier for the server. Thus, the client can receive a server identifier using FC transport adapter.

Proceeding to operating 503, the client registers the server. In some embodiments, registering the server with the received server identifier indicates that messages between the client and the server are to be communicated over a FC network. According to the server identifier, the client can determine which of the discovered LUNs are paths to the registered server by, for example, sending a SCSI read request to get server information and comparing the SCSI response to the server identifier. Thus, call messages from a module can be sent to the registered server using discovered SCSI LUNs.

With the server registered, the client is operable to communicate with the server using SCSI requests over a FC network. In one embodiment, the client communicates with the server in response to a module at the client that is to communicate with a server process. To do so, a virtual connection is first established. With a virtual connection established, the client is operable to communicate with the server over the FC network using messages adapted to SCSI requests and responses. The client can establish additional virtual connections for additional message communication.

Where the client is to end communication with the server, the client can unregister the server at operation 504. This operation 504 can free resources at the client or allow the client to register another server (n.b., the client can have more than one server registered concurrently). Additionally, the client can unregister a server if an error has been detected (e.g., where the FC network connecting the client to the server is unavailable or where there is a hardware failure at the client or the server). In one embodiment, the server can be unregistered in response to input (e.g. user input).

At completion, the FC transport adapter at the client is shut down at operation 505. The shutdown 505 can occur, for example, when the client shuts down and/or in response to user input. In some embodiments, operations 505 and 504 are transposed or are concurrent so that the FC transport adapter is shutdown before or simultaneously with the unregistering of the server.

Figure 6:
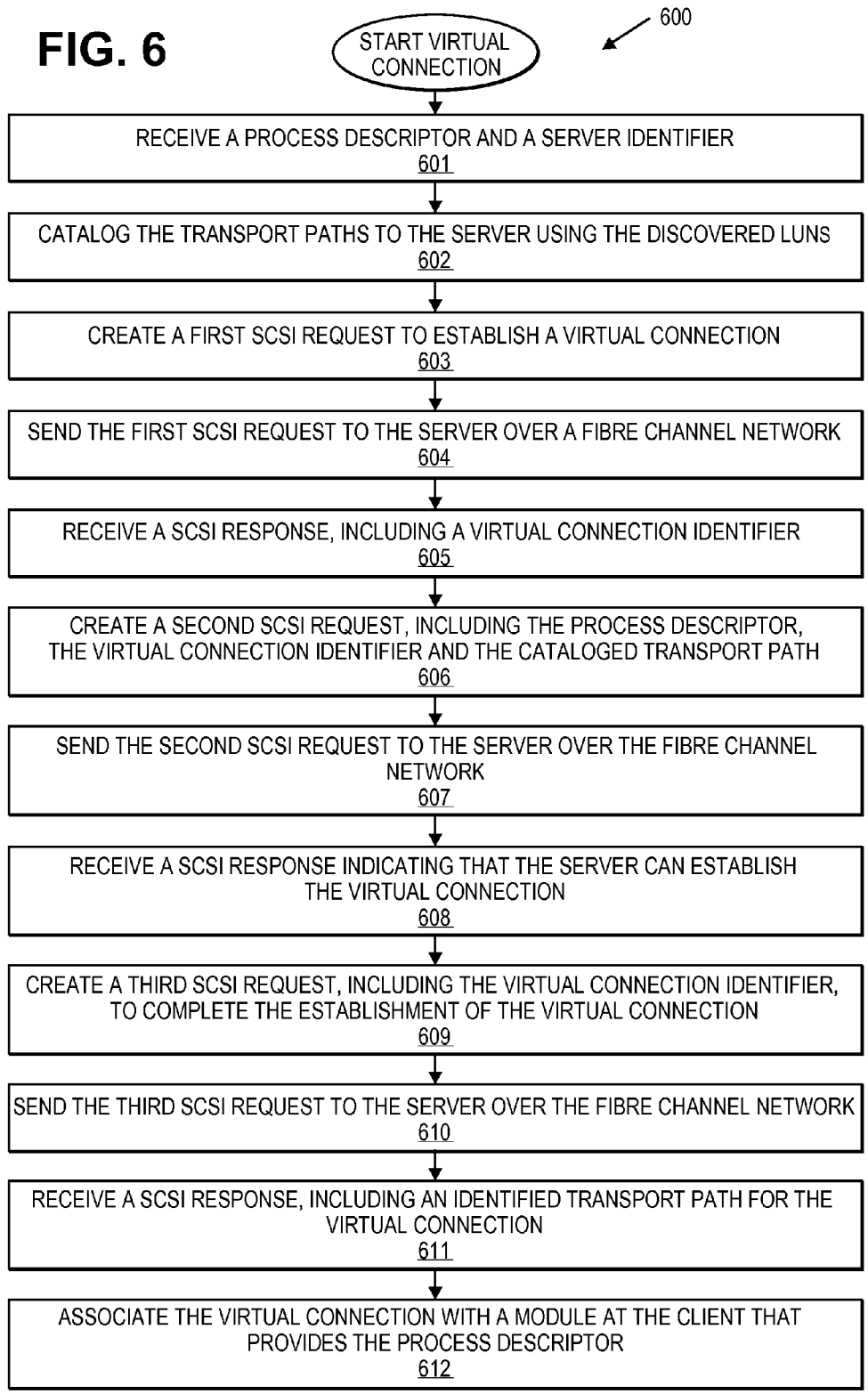
FIG. 6 is a flowchart illustrating one embodiment of a method executed by a client for establishing a virtual connection with a server over a Fibre Channel network.

FIG. 6 illustrates an embodiment of a method 600 for establishing a virtual connection by a client connected with a server over a FC network. As described above, the method 600 is performed where the client wishes to communicate with the server. The method 600 can be performed in response to a data optimization module, such as where the data optimization module is to provide a call message. In some embodiments, a FC transport adapter includes instructions to perform the method 600. For example, the FC transport adapter can be the FC transport adapter 214 of client 110 illustrated at FIG. 2.

Beginning with operation 601, a process descriptor and a server identifier are provided at the client. The process descriptor and the server identifier may be provided sequentially or simultaneously. The process descriptor and the server identifier can be provided by a module of the client, and subsequently be received by a FC transport adapter. The server identifier can identify the registered server with which the client is to communicate, and the process descriptor can identify a process at the registered server for which one or more messages from the client are intended. The module can provide this information in response to a data send or receive request from another client module (e.g., a data storage module).

At operation 602, the client catalogs the transport paths to the registered server using LUNs discovered by the client. The client can catalog one or more transport paths to the registered server by issuing a SCSI request to get server information for each LUN, such as a SCSI read request. The client can receive a SCSI response for each SCSI request that includes a server identifier and the transport path between the client and the server over the FC network. In response to the one or more SCSI responses, the client can catalog the transport paths corresponding to the LUNs advertised by the registered server. In one embodiment, the client compares the server identifier at the client (e.g., the server identifier of the registered server) to a server identifier included in the SCSI response. Where the client validates the server identifier received in the SCSI response, the client catalogs that transport path to the registered server. The cataloged transport paths can be stored or cached. Accordingly, the client can catalog transport paths by using stored or cached transport paths, instead of issuing SCSI requests.

In one embodiment of operation 602, the client can determine that a server can receive call SCSI requests over the FC network. The client can issue a SCSI inquiry request for each SCSI device entry and receive a SCSI inquiry response. The client can then examine the one or more fields of the SCSI inquiry response that indicate a server can receive SCSI requests over the FC network. This inquiry information can be stored or cached so that the client may issue further SCSI requests only for LUNs advertised by a server that can receive SCSI requests over the FC network. In one embodiment, this inquiry information is stored or cached by a client OS SCSI service as part of the SCSI device discovery process so that the FC transport adapter can later access the inquiry information. The FC transport adapter may also be operable to get inquiry information.

At operation 603, the client creates a first SCSI request for the registered server that is to start the establishment of a virtual connection. The SCSI request can be, for example, a SCSI read request. The SCSI request can include an indication that this SCSI request is to start establishing a virtual connection. For example, the indication can be a predetermined value included in the LBA field of the SCSI request.

At operation 604, the client sends the first SCSI request to the registered server over the FC network to start the establishment of a virtual connection. The client can send the SCSI request to the registered server over the FC network using any transport path to the registered server, such a selected transport path from the catalog of transport paths.

At operation 605, the client receives a first SCSI response to the first SCSI request over the FC network to start the establishment of a virtual connection with the registered server. The first SCSI response can include an identifier for the virtual connection, such as a value. Additionally, the SCSI response can include parameters such as a generation number and/or a verifier value. The SCSI response can further include server identification information so that the client can verify that the SCSI response is from the registered server.

In response to receiving the identifier for the virtual connection, the client creates a second SCSI request at operation 606. This second SCSI request can be, for example, a SCSI write request. The second SCSI request can include the virtual connection identifier and the process descriptor. Additionally, the second SCSI request can include the generation number and/or a verifier value from the first received SCSI response. In some embodiments, the second SCSI request includes the cataloged transport paths. Some of this information can be included in the LBA field of the SCSI request, while other information can be included in the SCSI request payload.

At operation 607, the client sends the second SCSI request to the registered server over the FC network to indicate the server process with which the client is to communicate. The client can send the SCSI request to the registered server over the FC network using any transport path to the registered server, such as the transport path used for the first SCSI request.

At operation 608, the client receives a second SCSI response to the second SCSI request over the FC network. This second SCSI response can indicate that the registered server is able to establish the virtual connection. In one embodiment, the SCSI response is a status code, such as a SCSI status code or vendor-specific status code. The client can determine whether the registered server is able to establish the virtual connection based on the second SCSI response.

Where the client determines that the registered server is able to establish the virtual connection, the client creates a third SCSI request at operation 609. This third SCSI request can be a SCSI read request. The third SCSI request includes the virtual connection identifier. The virtual connection identifier can be included in the LBA field of the third SCSI request. Additional information can be included in the third SCSI request, such as in the LBA field.

At operation 610, the client sends the third SCSI request over the FC network to the registered server over the FC network to complete the establishment of the virtual connection. The client can send the third SCSI request to the registered server over the FC network using any transport path to the registered server, such as the transport path used for the first and/or second SCSI request.

At operation 611, the client receives a third SCSI response to the third SCSI request over the FC network. The third SCSI response can include the virtual connection identifier. Additionally, the third SCSI response can include a selected transport path that the client is to use for the virtual connection. In some embodiments, the reception of the third SCSI response completes the establishment of the virtual connection.

At operation 612, the client associates the virtual connection with the module providing the process descriptor. The client can associate the virtual connection by, for example, mapping the virtual connection to the module. In some embodiments, operation 612 occurs before some of the preceding operations of the method 600. For example, the client can associate the virtual connection at any point after the virtual connection identifier is received at operation 605. With the virtual connection associated, the client is operable to send and receive messages adapted to SCSI requests and responses over the FC network.

In one embodiment of operation 612, the virtual connection is associated with the module by establishing a socket connection between the module providing the process descriptor and the FC transport adapter. For example, the module can connect a stream socket with the FC transport adapter and provide that process descriptor when connecting. The FC transport adapter can subsequently map a socket identifier, such as a file descriptor for the socket, with the virtual connection identifier. Accordingly, call messages can be received at the FC transport adapter as writes to the socket from the module. The module can then poll the socket and use socket reads to receive reply messages or other data provided to the socket by the FC transport adapter.

Figure 7:
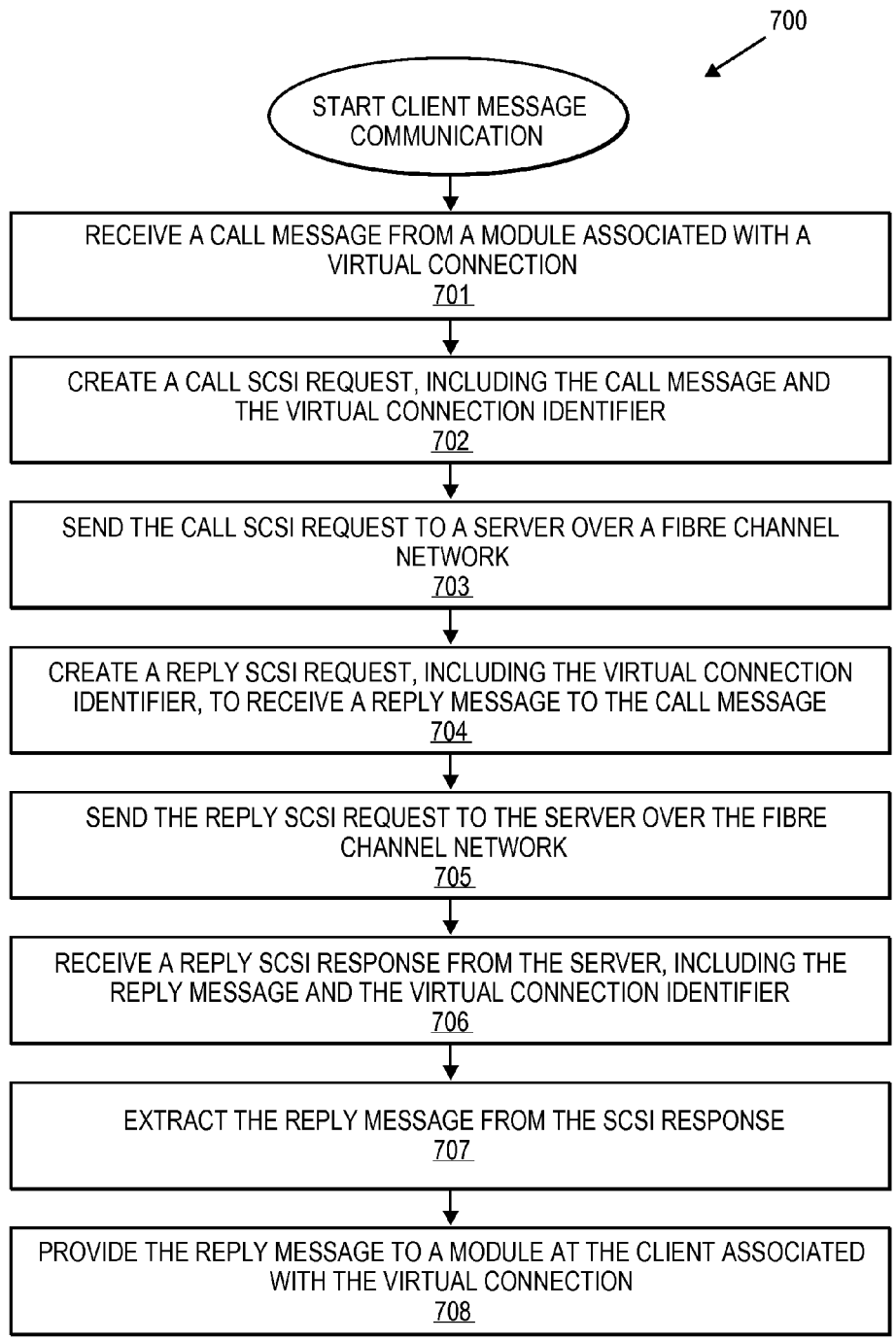
FIG. 7 is a flowchart illustrating one embodiment of a method executed by a client for communicating with a server over a Fibre Channel network.

Turning to FIG. 7, a method 700 illustrates an embodiment of a method at a client for communicating messages between the client and a server over a Fibre Channel network using SCSI requests and responses. This method 700 can be performed by a FC transport adapter 214 communicatively coupled with one or both of a data optimization module 212 and a data storage module 213 of a client 110, as shown in FIG. 2. In some embodiments, the method 700 is performed where a virtual connection has been established with a registered server over the FC network. Accordingly, the SCSI requests include a virtual connection identifier associated with a client module.

Beginning with operation 701, a call message is received at the client. As described above, this call message can include, for example, an RPC request and data corresponding to the RPC request. In some embodiments, the call message is received at the client's FC transport adapter from a client module, such as a data optimization module, that is associated with a virtual connection—i.e., the module providing a process descriptor used to establish the virtual connection. In one embodiment, the call message is received over a socket connection between the FC transport adapter and the module. For example, the module writes the call message to a socket connected to the FC transport adapter.

At operation 702, the client creates a call SCSI request, such as a SCSI write request. In one embodiment, the FC transport adapter creates the call SCSI request to adapt the call message to be sent over the FC network using the SCSI request structure. The virtual connection identifier is included in this call SCSI request. For example, the LBA field of the call SCSI request can include the virtual connection identifier. Other parameters can be included in the LBA, such as a timeout value and an operation sequence number (or a bit segment of the operation sequence number). The call SCSI request includes the call message in the request's payload.

In some embodiments, the payload of the call SCSI request includes a header added by the FC transport adapter in addition to the call message. The header can include some parameters for verification and handling of the call SCSI request and the call message contained therein. For example, the header can include a virtual connection tuple. The header may additionally include an operation code so that the server receiving the call SCSI request can handle the call message appropriately. Furthermore, the header can include a call sequence number, a byte sequence number, a number of bytes requested, or an acknowledgement that a SCSI response has been previously received by the client, such as a reply sequence number for a preceding reply SCSI request.

Subsequently, the client sends the call SCSI request to the server over the FC network so that the call message may be received by a server process for which it is intended, as shown at operation 703. In one embodiment, the FC transport adapter provides the call SCSI request to a client OS SCSI service to be sent over the FC network. The client can send the SCSI request to the registered server over the FC network using any transport path to the registered server, such as a transport path received from the server during the establishment of the virtual connection. In some embodiments, one or more additional call SCSI requests can be created and sent to the server before proceeding.

At operation 704, the client creates a reply SCSI request, such as a SCSI read request. The reply SCSI request is created to retrieve a reply message from a server process over the FC network using the SCSI request and response structure. The virtual connection identifier is included in this reply SCSI request. For example, the LBA field of the reply SCSI request can include the virtual connection identifier. Other parameters can be included in the LBA field, such as a timeout value, a reply sequence number and/or a tuple value of the virtual connection tuple (or bit segments of the reply sequence number or tuple value). In some embodiments, this operation 704 is performed in response to a request from a module, such as the data optimization module that provided the call message.

Proceeding to operation 705, the client sends the reply SCSI request to the server over the FC network so that the reply message may be retrieved from the server process for which the call message was intended. The client can send the SCSI request to the registered server over the FC network using any transport path to the registered server, such as a transport path received from the server during the establishment of the virtual connection.

In response to operation 705, the client receives a reply SCSI response from the server over the FC network at operation 706. In some embodiments, the payload of the reply SCSI response includes a header in addition to the reply message. The header can include some parameters for verification and handling of the reply SCSI response and the reply message contained therein. For example, the header can include a virtual connection identifier or virtual connection tuple so that the client receiving the reply SCSI response can validate the response. The header may additionally include an operation code so that the client receiving the reply SCSI response can handle the reply message appropriately. Furthermore, the header can include a reply sequence number, a byte sequence number, a number of bytes returned in the reply message, or a number of additional bytes of the reply message not returned in the reply SCSI response payload but available to be retrieved from the server. Where the reply SCSI response includes a number of additional bytes of the reply message not returned in the reply SCSI response, the client can create one or more additional reply SCSI requests and send the one or more reply SCSI requests to the server of the FC network.

In one embodiment of operation 706, the reply SCSI response includes an indication that the server requests that the client migrate to another transport path for future SCSI requests. This indication can be, for example, a flag or Boolean value, or may simply be the presence of a new transport path. Going forward, the client can use the new transport path when sending SCSI requests to the server.

At operation 707, the reply message is extracted from the reply SCSI response. The extraction can include, for example, separating the reply message from SCSI-specific or FC-specific data. In some embodiments, this operation involves recognizing a header in the reply SCSI response and separating the header from the reply message. For example, the header can include a number of bytes of the reply message in the payload and a padding or offset of the reply message bytes within the payload so that the FC transport adapter recognizes that number of bytes as the reply message.

With the reply message available at the client, the reply message is provided to the module associated with the virtual connection at operation 708. The reply message can be sent to the module or made available so that the module can retrieve the reply message, such as by reading the reply message. In some embodiments, the virtual connection includes a stream socket connected between the FC transport adapter and the module. The FC transport adapter can therefore provide the reply message to the module by making the reply message available at the stream socket. The module may be polling the socket and, where the reply message is available, read the socket to retrieve the reply message. Alternatively, the FC transport adapter can write to the socket to provide the message to the module.

In one embodiment, the client determines that all call messages from the client module and reply messages from the server process have been satisfactorily communicated. At this point, the client can close the virtual connection, such as by creating a SCSI request to close the virtual connection and sending that SCSI request to the server over the FC network. For example, the client can close the virtual connection in response to the closing of the socket (e.g., where the module closes the socket). The client can then return to the start virtual connection establishment state, where a module may provide another process descriptor indicating that the module is to send additional call messages to a server process, as shown in FIGS. 6 and 7.

Figure 8:
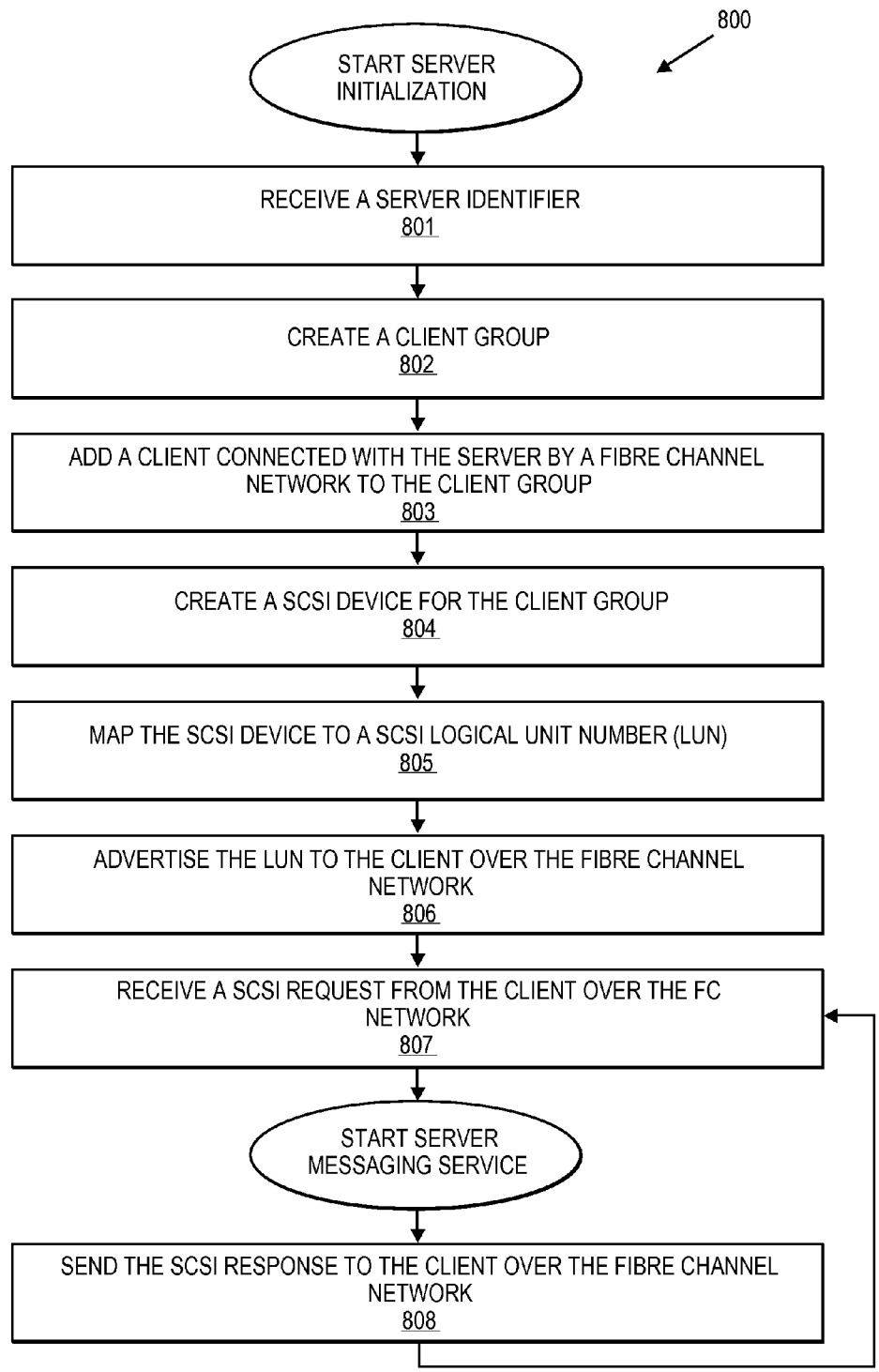
FIG. 8 is a flowchart illustrating one embodiment of a method for initializing a server that is connected with a client by a Fibre Channel network.

Now with respect to a server implementation of communicating messages between the server and a client over a Fibre Channel network using SCSI requests and responses, FIG. 8 illustrates a method 800 for initializing a server according to one embodiment of the invention. The server can be initialized for connecting with a client over a Fibre Channel network so that the server can receive SCSI requests from and send SCSI responses to the client. The method 800 can be performed by the server 150 of FIG. 1 to connect with a client 110 over the FC network 130.

Beginning first with operation 801, an identifier for the server is received at the client. In some embodiments, the server identifier can be a stored value or received at the server as input (e.g., user input). In one embodiment, the server identifier can be received as input at the client and sent to the server. For example, a user can input the server identifier at an interface of a client, such as a command line interface, and communicate the server identifier to the server using a cryptographic network protocol, such as Secure Shell or other similar protocol.

At operation 802, a client group is created. A client group can define the SCSI devices advertised to a client and at which ports of a server host bus adapter those devices are to be advertised. To that end, the server can add a client to the client group, where the client is connected to the server over the FC network, as shown at operation 803.

Proceeding to operating 804, the server creates one or more devices for the client group. The number of devices created may be contingent upon client considerations, such as whether the client serializes SCSI requests and responses and presents those requests and responses to a single client-side SCSI device entry. For other clients, the client can dynamically adjust the number of simultaneous SCSI requests and responses, so that the server need advertise only one SCSI device. Each SCSI device is then mapped to a respective LUN for the client group at operation 805. In some embodiments, a SCSI device can be added to more than one client group, so the SCSI device can be mapped to a LUN for each client group of which it is a member.

A LUN for the created client group is then advertised to the client over the FC network at operation 806. The advertised LUN can then be discovered by the client so that the client can send SCSI requests to that LUN. The server can advertise the LUN at one or more ports of one or more server HBAs, according to the requirements of the client group. In some embodiments, multiple LUNs are created and advertised for each client group.

With the client added to a group and one or more LUNs advertised to the client, the server is operable to communicate with the client using SCSI requests and SCSI responses over the FC network. Accordingly, at operation 807 the server receives a SCSI request from the client over the FC network. The server can then service the SCSI request, such as by routing the SCSI request to a server FC adapter. Where the server has responded to the SCSI request from the client, the server is operable to send the SCSI response to the client over the FC network, as shown at operation 808.

Figure 9:
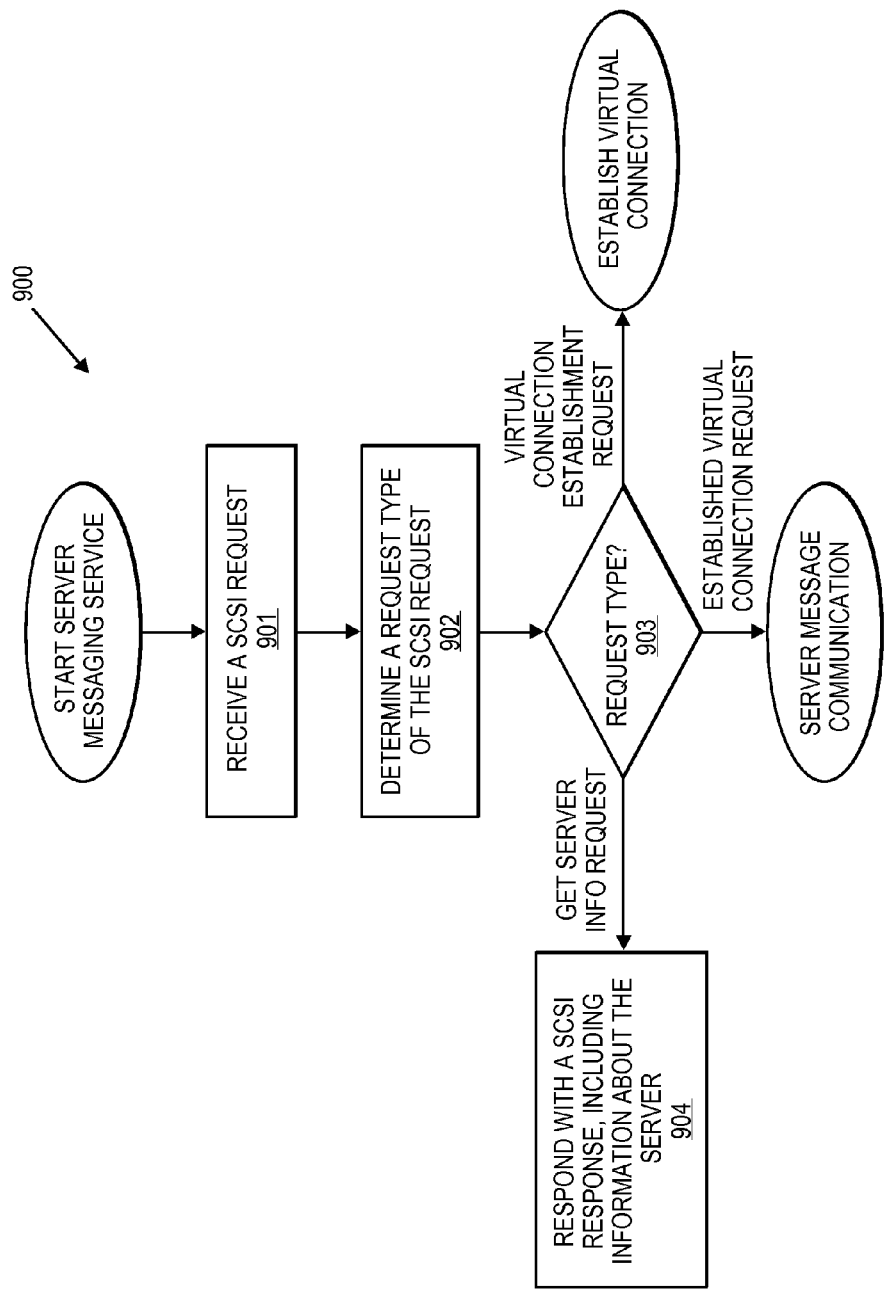
FIG. 9 is a flowchart illustrating one embodiment of a method executed by a server for a server messaging service.

FIG. 9 illustrates an embodiment of a method 900 executed by a server for servicing SCSI requests received over a FC network from a client. In one embodiment, the method 900 is performed where the server receives a SCSI request for a LUN that is routed to a server FC adapter. The method 900 can be performed by the server FC adapter 320 of the server 150 illustrated in FIG. 3.

Beginning at operation 901, a SCSI request originating at a client is received. This SCSI request can be a SCSI request for a LUN mapped to a SCSI device created by or associated with a server FC adapter of the server. The SCSI request can be received from a server OS SCSI service operable to receive SCSI requests over the FC network.

At operation 902, the server determines the type of request included in the SCSI request. For example, the type of request can be a request to establish a virtual connection, a request to send or receive a message from the server, or a request to get information associated with the server. For some SCSI requests, the SCSI request includes the request type in the LBA field of the SCSI request, such as a predetermined value or other indicator. The request type can also be included in a header within a payload of the SCSI request. For other SCSI requests, the server is operable to identify a virtual connection identifier included in the SCSI request and resolve the request type based on the virtual connection identifier. In one embodiment, the server determines the request type using the virtual connection identifier in combination with one or more other parameters, such as an SCSI operation code of the SCSI request (e.g., SCSI read) or an additional value in the LBA field or payload of the SCSI request.

Figure 10:
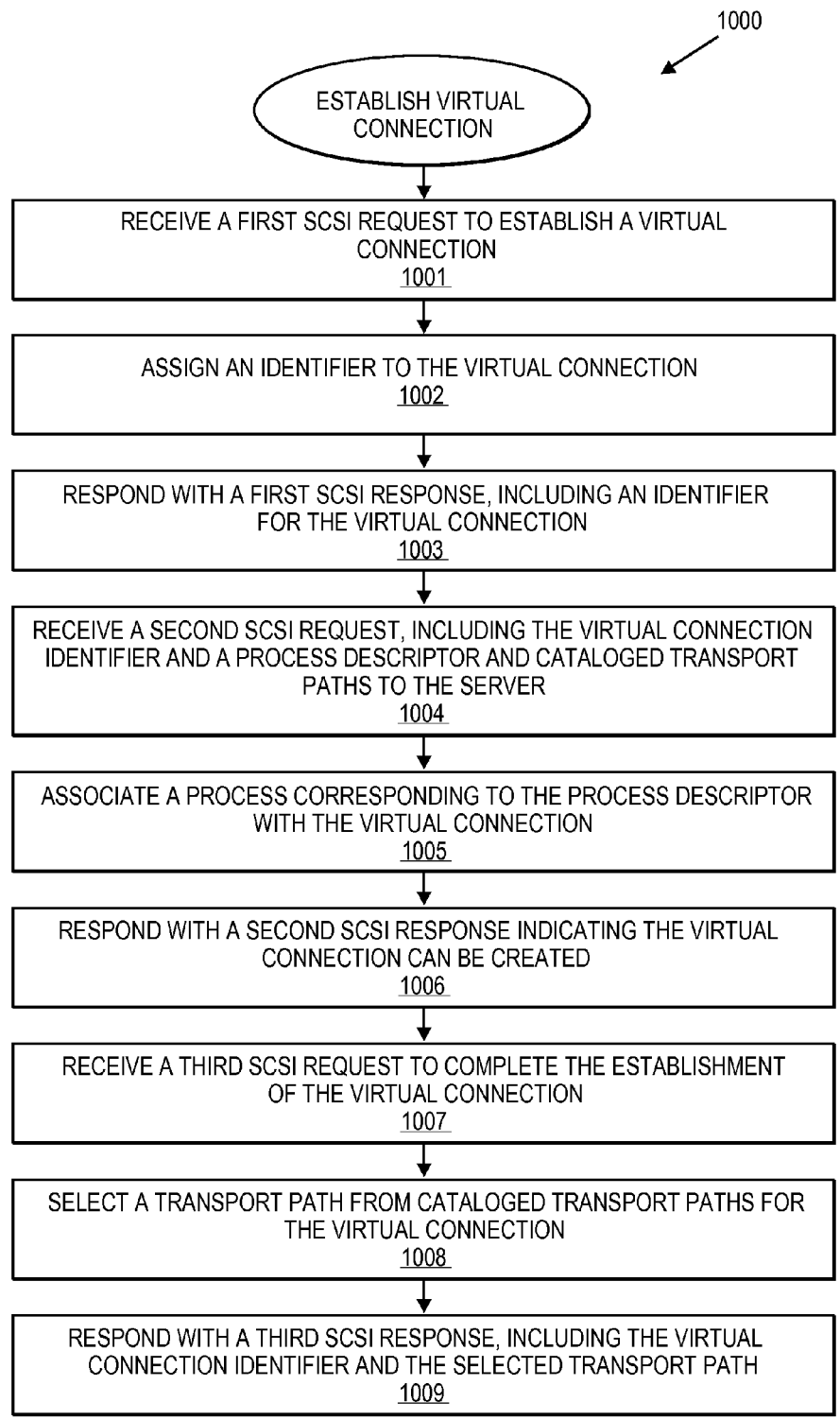
FIG. 10 is a flowchart illustrating one embodiment of a method executed by a server for establishing a virtual connection with a client over a Fibre Channel network.
Figure 11:
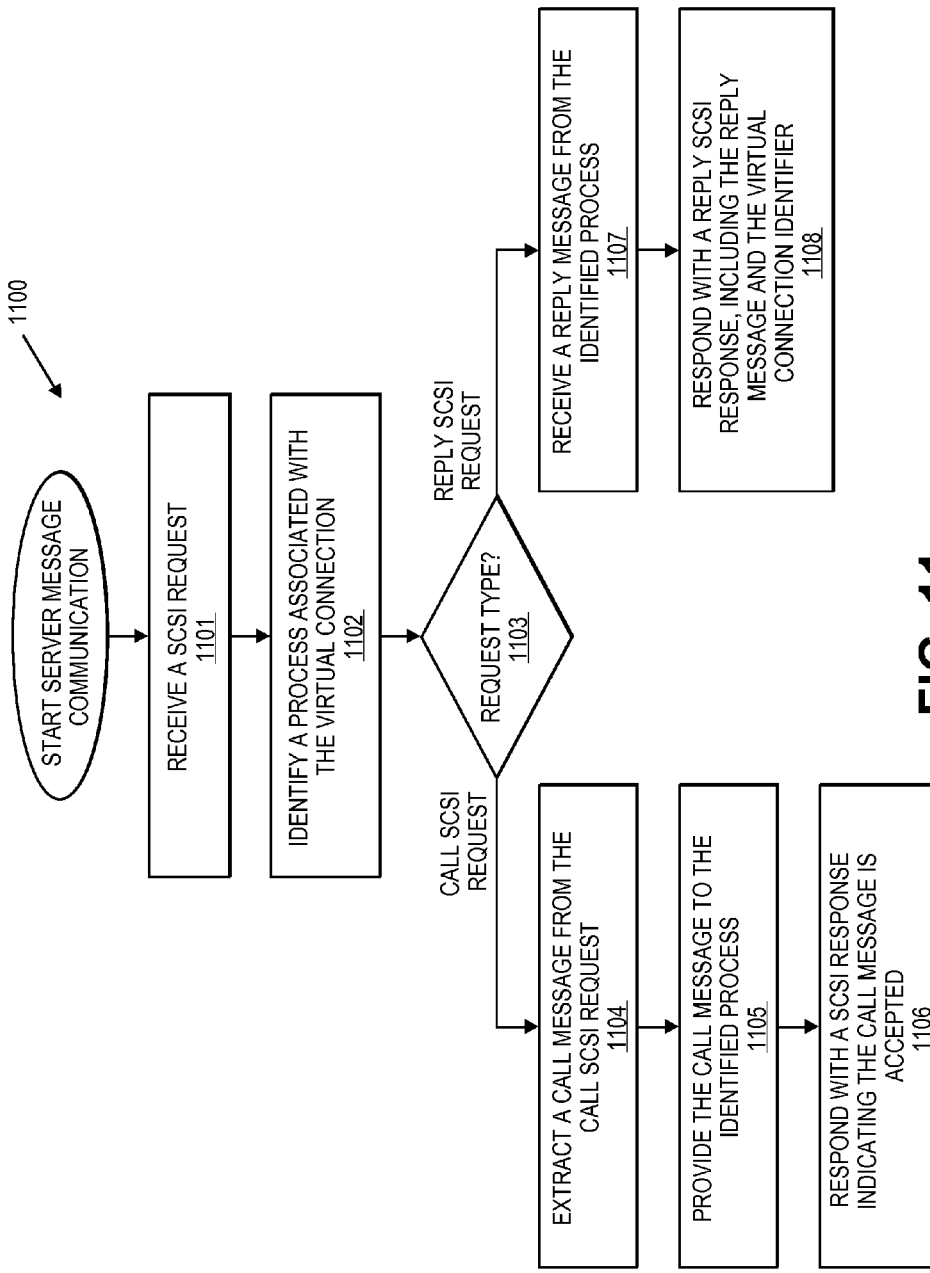
FIG. 11 is a flowchart illustrating one embodiment of a method executed by a server for communicating with a client over a Fibre Channel network.

In response to determining the request type, the server determines how to handle the SCSI request, as shown at decision block 903. In one embodiment, the SCSI request can include one of three request types: (1) a request to get information about the server, (2) a request establish a virtual connection, and (3) a request for an existing virtual connection. A request to establish a virtual connection may include SCSI requests for the assignment of a virtual connection identifier and other related requests from the client to establish a virtual connection, such as a SCSI request including a process descriptor. An embodiment of a method for establishing a virtual connection is illustrated at FIG. 10. A request for an established virtual connection may include SCSI requests including call messages or other data and SCSI requests to retrieve reply messages or other data. An embodiment of a method for communicating messages by a server is illustrated at FIG. 11.

A request to get server information may be received at the server where the server has not yet established a virtual connection with the client, or where the client is attempting to confirm or catalog information about the server. Where the SCSI request is a request to get server information, the server responds with a SCSI response that includes information about the server at operation 904. In one embodiment, the server creates a SCSI response that includes information about the server included in a payload of the SCSI response. The server information can include, for example, a server identifier, a serial number, and/or the transport path which the SCSI request traversed in reaching the server (e.g., a transport path including a physical component and a logical component). The request is then sent by the server to the client over the FC network.

FIG. 10 illustrates an embodiment of a method 1000 for assigning a virtual connection to a client by a server connected with the client over a FC network. As described above, the method 1000 is performed where the server receives SCSI one or more SCSI requests indicating the client is attempting to establish a virtual connection. The method 1000 can be performed in response to receiving a SCSI request from the client at a server FC adapter of the server, such as a SCSI request routed to the server FC adapter by a server OS SCSI service. The method can be performed by the server FC adapter 320 of the server 150, illustrated in FIG. 3. With respect to the embodiment of FIG. 9, the received SCSI requests illustrated in the method 1000 can be the SCSI requests received at operation 901 and determined to be SCSI requests for establishing a virtual connection at operations 902-903.

Beginning with operation 1001, a first SCSI request originating at the client is received by the server over the FC network. The first SCSI request can indicate that the client is attempting to start the establishment of a virtual connection. The SCSI request can be, for example, a SCSI read request that includes an indication or other a predetermined value included in the LBA of the SCSI request.

In response to the received SCSI request, the server assigns a virtual connection identifier to the virtual connection, as shown at operation 1002. The virtual connection identifier can be, for example, a value and can be part of a virtual connection tuple that includes a generation number and/or verifier assigned by the server to ensure that the virtual connection can be uniquely identified across space and time. The server can assign the virtual connection identifier by for example, generating a value or selecting a value from a pool of available values.

At operation 1003, the server responds to the first SCSI request with the virtual connection identifier. In one embodiment, the server creates a SCSI response that includes the virtual connection identifier and/or other parameters, such as the virtual connection tuple and/or a server identifier. The server can then send the first SCSI response to the client over the FC network. In some embodiments, the server places the virtual connection in a "waiting" state with a timeout. Where the server does not receive a second SCSI request from the client for the virtual connection before the timeout expires, the server can release the virtual connection identifier and any resources associated with the virtual connection.

After responding to the first SCSI request with the assigned virtual connection identifier, the server receives a second SCSI request from the client over the FC network, as shown at operation 1004. The second SCSI request includes a descriptor for a server process with which the client is attempting to communicate. The second SCSI request can be a SCSI write request. In one embodiment, the second SCSI request includes the assigned virtual connection identifier in the LBA field of the second SCSI request. The second SCSI request can also include parameters for validation and creation of the virtual connection, such as the virtual connection tuple. The parameters can be included in a payload of the second SCSI request. In one embodiment of operation 1004, the second SCSI request includes a catalog of transport paths between the server and the client over the FC network.

At operation 1005, the server associates the virtual connection with a server process corresponding to the process descriptor included in the second SCSI request. The server can associate the virtual connection by, for example, mapping the virtual connection to the server process. In some embodiments, operation 1005 occurs after some of the succeeding operations of the method 1000. For example, the server can associate the virtual connection at any point after the process descriptor is received at operation 1004. With the virtual connection associated, the server is operable to receive and respond to messages adapted to SCSI requests over the FC network. An embodiment of this communication process is illustrated at FIG. 11.

At operation 1006, the server responds to the second SCSI request with a second SCSI response. This second SCSI response can indicate that the server is able to establish the virtual connection. In one embodiment, this second SCSI response is contingent upon operation 1005. For example, the server FC adapter creates a second SCSI response indicating that the server is able to establish the virtual connection only where the server FC adapter first associates the virtual connection with the server process. In one embodiment, the second SCSI response is a status code, such as a SCSI status code or vendor-specific status code. The server can then send the second SCSI response to the client over the FC network. In some embodiments, the server again places the virtual connection in a "waiting" state with a timeout. Where the server does not receive a third SCSI request from the client for the virtual connection before the timeout expires, the server can release the virtual connection identifier and any resources associated with the virtual connection, and/or disassociate the server process.

At operation 1007, the server receives a third SCSI request over the FC network that is to complete the establishment of the virtual connection. This third SCSI request can be a SCSI read request. The third SCSI request includes the virtual connection identifier, such as in the LBA field of the third SCSI request.

The server can select a transport path to complete the establishment of the virtual connection. As shown at operation 1008, the server selects the transport path for the virtual connection from the catalog of transport paths provided to the server at operation 1004. The catalog of transport paths can be used by the server for load balancing and other optimization. The server can select a transport path so that SCSI requests are more evenly distributed across ports, server HBAs, and/or LUNs of the server.

At operation 1009, the server responds to the third SCSI request with the selected path for the virtual connection. In one embodiment, the server creates a SCSI response that includes the virtual connection identifier and the transport path in a payload of the third SCSI response. The payload of the third SCSI response can include other parameters, such as a virtual connection tuple. In response to the third SCSI request, the server can then send the third SCSI response to the client over the FC network. In some embodiments, responding to the third SCSI request with the third SCSI response completes the establishment of the virtual connection at the server.

Turning to FIG. 11, a method 1100 illustrates an embodiment of a method at a server for communicating messages between the server and a client over a Fibre Channel network using SCSI requests and responses. This method 1100 can be performed by the server FC adapter 320 operable to communicate with one or more processes 315a-315b of a server 150, as shown in FIG. 3. In some embodiments, the method 1100 is performed where a virtual connection has been established with a client over the FC network. Accordingly, SCSI requests received at the server from the client include a virtual connection identifier for the virtual connection. With respect to the embodiment of FIG. 9, the received SCSI request illustrated in the method 1100 can be a SCSI request received at operation 901 and determined to be a SCSI request for an established virtual connection at operations 902-903.

Beginning with operation 1101, a SCSI request originating at the client is received by the server over the FC network. The received SCSI request is for an established virtual connection and, accordingly, the SCSI request includes a virtual connection identifier. Additionally, the SCSI request can indicate that the client is attempting to send a call message to a server process or retrieve a reply message from a server process. The SCSI request can be a SCSI read request that includes a virtual connection identifier in the LBA field of the SCSI request (i.e., a reply SCSI request). Alternatively, the SCSI request can be a SCSI write request that includes the virtual connection identifier and a call message (i.e., a call SCSI request).

At operation 1102, the server identifies a server process that is associated with the virtual connection of the received SCSI request. For example, the server can maintain a map of the virtual connection to the server process. Subsequently, the server can refer to the map to identify the process using the virtual connection identifier included in the received SCSI request. In one embodiment of operation 1102, the associated server process is identified from a map of the virtual connection to a socket identifier (e.g., a file descriptor) for an established socket connection between the server FC adapter and the server process.

Following the identification of the associated process, the server handles the received SCSI message according to the type of request, as shown at decision block 1103. For some SCSI requests, the server is operable to identify a virtual connection identifier included in the SCSI request and resolve the request type based on the virtual connection identifier. In one embodiment, the server determines the request type using the virtual connection identifier in combination with one or more other parameters, such as an operation code included in the CDB of the SCSI request (e.g., a SCSI read operation code) or an additional value in the LBA or payload of the SCSI request. In some embodiments, the request type is determined at operations 902-903 of FIG. 9. Consequently, the type of request can be resolved before the associated server process is identified.

Where the received SCSI request is a call SCSI request (e.g., a SCSI write request including the call message in the payload), the method 1100 proceeds to operation 1104. At operation 1104, the server extracts a call message from the SCSI request. The extraction can include, for example, separating the call message from SCSI-specific or FC-specific data. In some embodiments, this operation involves recognizing a header in the call SCSI request and separating the header from the call message. For example, the header can include a number of bytes of the call message in the payload and a padding or offset of the call message bytes within the payload of the call SCSI request so that the call message bytes can be extracted.

In one embodiment, the call SCSI request includes an indication in the header that a prior SCSI response sent by the server was received by the client. The indication can be, for example, a sequence number included in a prior reply SCSI response received by the client from the server. In response to the indication that the client received a prior SCSI response from the server, the server can increment the expected reply sequence number and free resources consumed by the prior SCSI response, such as by removing a reply message included in the prior SCSI response from one or more buffers.

With the call message extracted at the server, the call message is provided to the process associated with the virtual connection at operation 1105. The call message can be sent to the process or made available so that the process can retrieve the call message, such as by reading the call message. In some embodiments, the virtual connection includes a connected stream socket between a server FC adapter and the associated process. The server FC adapter can therefore write to the socket opened for the associated process. Alternatively, the server FC adapter can provide the call message so that it can be read from the socket connected with the associated process.

At operation 1106, the server responds to the received SCSI request with a SCSI response. This SCSI response can indicate that the server is able to accept the entire call message included in the SCSI request. In one embodiment, the SCSI response is a status code, such as a SCSI status code or vendor-specific status code. The server can then send the SCSI response to the client over the FC network.

In one embodiment, this SCSI response is contingent upon operation 1105. For example, the server FC adapter creates a SCSI response indicating that the server is able to accept the entire call message only where the server FC adapter first buffers the entire call message or provides the entire call message to the associated process. In some instances, the server is unable to accept the entire call message. Therefore, the server can create a SCSI response indicating that some or none of the call message is accepted. In some embodiments, a SCSI response indicating that the entire call message is not accepted can include a number of bytes of the call message that are accepted by the server.

Where the received SCSI request is a reply SCSI request (e.g., a SCSI read request for an established virtual connection), the method 1100 proceeds to operation 1107. At operation 1107, the server receives a reply message from the associated process. The reply message may be a reply to a call message, such as data for a call message to get that data. The reply message can be sent by the associated process to the server FC adapter or made available so that the server FC adapter can read the reply message. In some embodiments, the virtual connection associated with the identified process includes a stream socket connection between the server FC adapter and the associated process. The server FC adapter can therefore read the reply message from the socket connected with the identified process. Alternatively, the associated process writes the reply message to the socket connected with the virtual connection.

At operation 1108, the server responds to the received SCSI request with a reply SCSI response. In one embodiment, the server creates the reply SCSI response so that a payload of the response includes the virtual connection identifier and the reply message. The payload of the reply SCSI response can include other parameters, such as a virtual connection tuple. In some embodiments, the reply message is incomplete. For example, the reply message may be responsive to an earlier-received call message requesting data, but the reply message may only contain a portion of the requested data. The reply SCSI response can indicate that the reply message does not contain all of the requested data, such as by including a number of bytes returned in the reply message and/or a number of bytes that are available at the server in response to a call message but not returned in the instant reply SCSI response. The server can then send the reply SCSI response to the client over the FC network.

In one embodiment, the reply SCSI response includes an indication that the server requests that the client migrate to a different transport path for future SCSI requests. This indication can be, for example, a flag or Boolean value, and/or the presence of a different transport path in a header of the reply SCSI response. The different path may be selected from a catalog of transport paths received by the server from an earlier SCSI request from the client. In this way, the server can balance the load of received SCSI requests across the server HBAs and/or LUNs.

Figure 12:
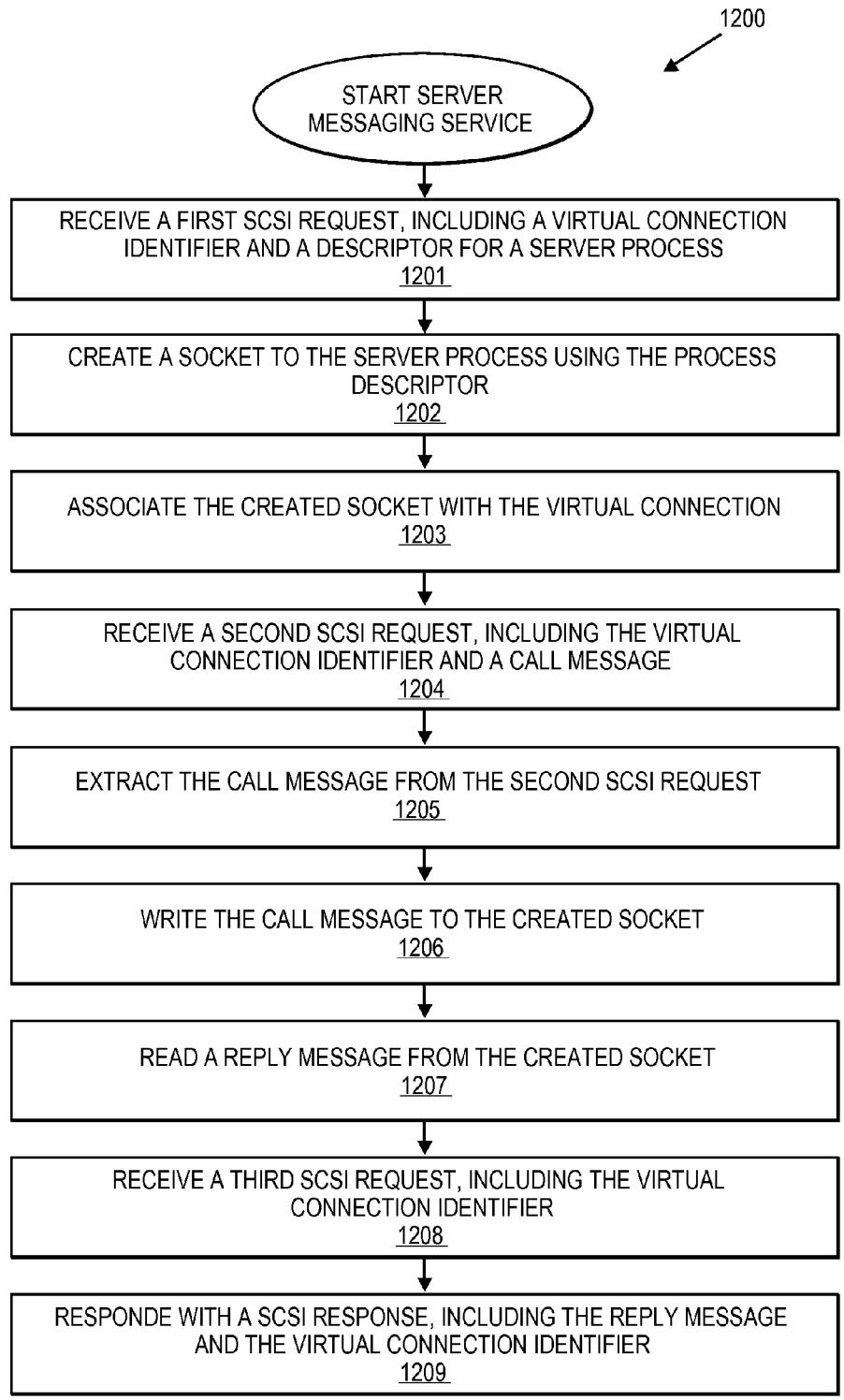
FIG. 12 is a flowchart illustrating one embodiment of a method executed by a server for a server messaging service.

Turning now to FIG. 12, the method 1200 illustrates an embodiment of a method executed by a server for servicing SCSI requests received over a FC network from a client. In one embodiment, the method 1200 can be performed by the server FC adapter 320 of the server 150 illustrated in FIG. 3. The method 1200 can be performed in response to receiving a SCSI request from the client at a server FC adapter of the server, such as a SCSI request routed to the server FC adapter by a server OS SCSI service. With respect to the embodiments of FIGS. 9-11, the method 1200 is not mutually exclusive, and some operations of FIGS. 9-11 can be performed in addition to those operations illustrated in the method 1200. For example, operations 901-903 may still be performed to determine the request type. In such an example, the method 1200 is performed for both virtual connection assignment requests and requests for an established virtual connection.

Beginning with operation 1201, the server receives a first SCSI request from the client over the FC network. The first SCSI request includes a descriptor for a server process with which the client is attempting to communicate. Additionally, the first SCSI request includes a virtual connection identifier for a virtual connection. This virtual connection identifier may have been assigned by the server, such as described at operations 1001 and 1002 of FIG. 10. In one embodiment, this operation 1201 is analogous to operation 1004.

At operation 1202, a socket is created and connected to a server process using the process descriptor. A server FC adapter can create and connect the socket. By creating the socket, a socket identifier, such as a file descriptor, is returned. Thus, the socket identifier is received by the server FC adapter. In one embodiment, the process descriptor is a port number. The server FC adapter can establish a connection with the server process by connecting the created socket to the server process using the port number. The established connection can be a localhost connection or a remote connection. The server FC adapter can then write to the socket, poll the socket and read from the socket to communicate messages (e.g., data) to and from the server process.

Once the socket is created and connected to the server process, the socket can be associated with the virtual connection identifier, as illustrated at operation 1203. The server can associate the socket with the virtual connection by, for example, mapping the virtual connection identifier to the socket identifier. The operations 1202-1203 can be an embodiment of operation 1005. Accordingly, the virtual connection can be established following operation 1203—for example, operations 1006-1009 can be performed.

In one embodiment of operation 1203, two or more threads are created and attached to the socket so that messages can be continuously written to and read from the socket. For example, the server FC adapter can write call messages to one or more buffers and attach those buffers to the virtual connection. A write thread then asynchronously writes the buffered call messages to the socket associated with the virtual connection. A read thread can then poll the socket and read reply messages into one or more buffers, which the second thread then attaches to the virtual connection. The server FC adapter can receive the reply messages from the buffers attached to the virtual connection.

At operation 1204, a second SCSI request originating at the client is received by the server over the FC network. The received SCSI request is for the established virtual connection and, accordingly, the SCSI request includes a virtual connection identifier. Here, the second SCSI request can indicate that the client is attempting to send a call message to a server process (i.e., a call SCSI request). In some embodiments, this operation 1204 is analogous to operation 1101 of FIG. 11. Accordingly, operation 1102 follows operation 1204 in some embodiments of the method 1200. In one embodiment, the server process can be identified by the socket connected to the process.

Proceeding to operation 1205, a call message is extracted from the SCSI request. In one embodiment, the extraction is analogous to operation 1104. The extracted call message can then be written to the socket having the socket identifier associated with the virtual connection identifier included in the second SCSI request, as shown at operation 1206. This operation 1206 can include writing the call message to one or more buffers and attaching the one or more buffers to the virtual connection. A write thread can then write the buffered call message to the socket. Operation 1206 illustrates one embodiment of operation 1105. Therefore, operation 1106 can follow operation 1206 in some embodiments of the method 1200.

At operation 1207, a reply message is read from the socket associated with the virtual connection. In some embodiments, the server FC adapter is polling the socket and, where the reply message is available, the server FC adapter reads the reply message from the socket. Operation 1207 can include a read thread that polls the socket and reads the available reply message into one or more buffers, which are then attached to the virtual connection. Depending upon the available buffer space, the read thread can read an entire reply message to one or more buffers or a portion of a reply message. Operation 1207 illustrates one embodiment of operation 1107.

Continuing to operation 1208, a third SCSI request originating at the client is received by the server over the FC network. The third SCSI request is for an established virtual connection and, accordingly, the third SCSI request includes a virtual connection identifier. The third SCSI request can be a SCSI read request that includes a virtual connection identifier in the LBA of the SCSI request (i.e., a reply SCSI request). In one embodiment, the third SCSI request is identified as a reply SCSI request according to an embodiment of operation 1103; for example, the server FC adapter can determine that the third SCSI request is a reply SCSI request by examining the LBA for the virtual connection identifier and the operation code for the SCSI-read operation code.

At the operation 1209, the third SCSI request is responded to with a reply SCSI response. In one embodiment, the server creates the reply SCSI response that includes the virtual connection identifier and the reply message in the payload of the reply SCSI response. The payload of the reply SCSI response can include other parameters, such as a virtual connection tuple. In some embodiments, the reply message is incomplete. For example, a read thread may only be capable of buffering a portion of a reply message available at the socket. The reply SCSI response can indicate that the payload of the reply SCSI response does not contain the full reply message. An embodiment of operation 1209 is described at operation 1108. The server can then send the reply SCSI response to the client over the FC network. In one embodiment, the reply SCSI response includes an indication that the server requests that the client migrate to a different transport path for future SCSI requests, as described with respect to operation 1108.

Figure 13:
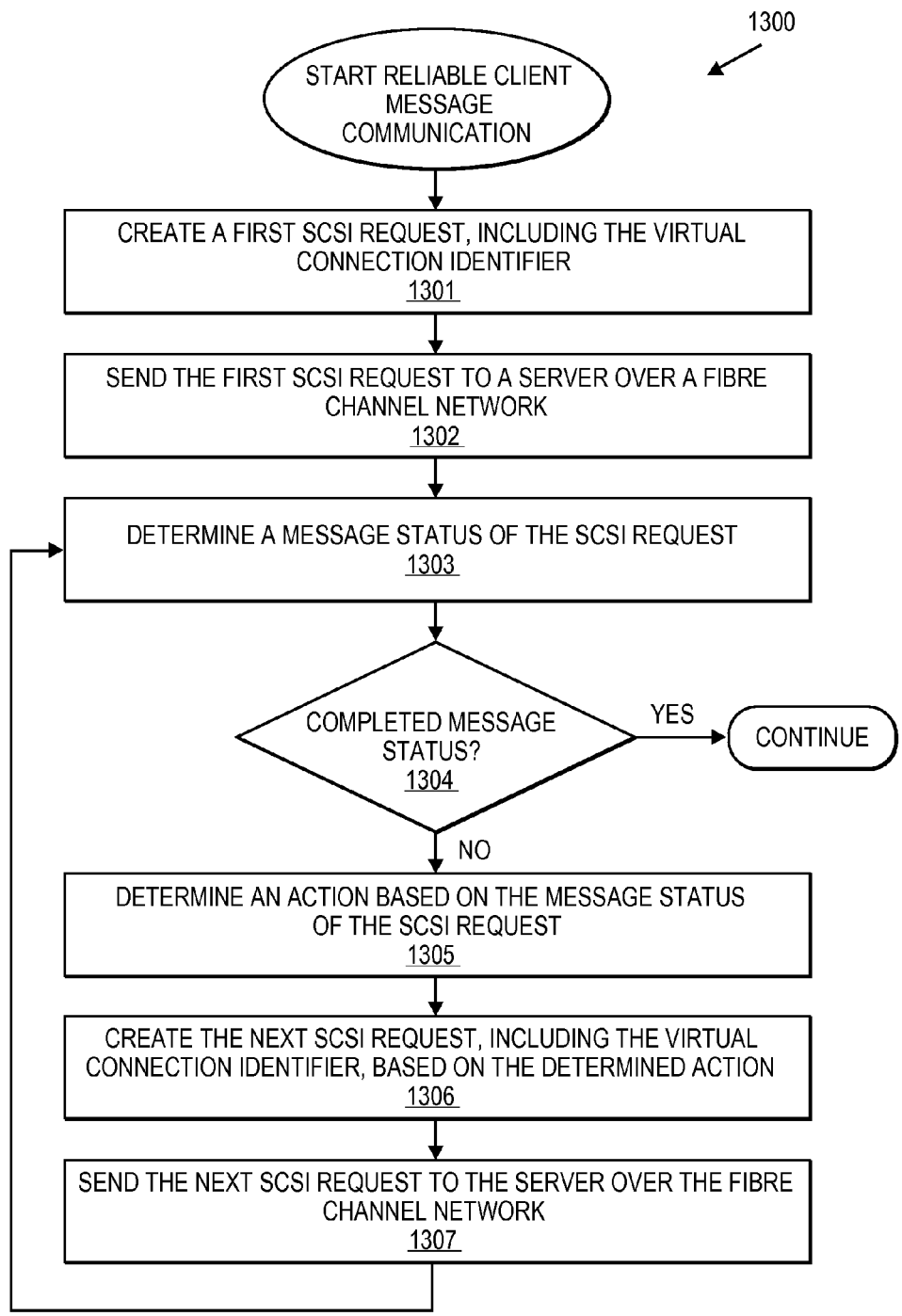
FIG. 13 is a flowchart illustrating one embodiment of a method executed by a client for reliably communicating with a server over a Fibre Channel network.

Turning to FIG. 13, a method 1300 illustrates an embodiment of a method executed by a client for communicating messages between the client and a server over a Fibre Channel network using SCSI requests and responses. This method 1300 can be performed by a FC transport adapter 214 communicatively coupled with one or both of a data optimization module 212 and a data storage module 213 of a client 110, as shown in FIG. 2. In some embodiments, the method 1300 is performed where a virtual connection has been established with a registered server over the FC network. Accordingly, the SCSI requests include a virtual connection identifier associated with a client module. With respect to the embodiments of FIGS. 6-7, the method 1300 is not mutually exclusive, and some operations of FIGS. 6-7 can be performed in addition to those operations illustrated in the method 1300. For example, operation 701 may still be performed to receive a call message from a client module. The method 1300 can be included in FIGS. 6-7 to provide reliable communication of messages.

Beginning with operation 1301, the client creates a first SCSI request, such as a call SCSI request or a reply SCSI request. The virtual connection identifier is included in this first SCSI request, such as in the LBA field. Other parameters can be included in the LBA field, such as a timeout value and/or a sequence number (or a bit segment of the sequence number). Additionally, a SCSI write request can include other parameters as part of its payload. For a call SCSI request, the request's payload can include a call message byte number and/or the number of bytes of the call message included in the payload. Two embodiments of operation 1301 are described at operations 702 and 704 of FIG. 7.

Subsequently, the client sends the first SCSI request to a server over the FC network, as shown at operation 1302. The client can send the SCSI request to the server over the FC network using any transport path to the registered server, such as a transport path received from the server during the establishment of the virtual connection.

At operation 1303, the client determines a message status of the first SCSI request. In one embodiment, the message status is one of four categories: (1) complete, (2) incomplete, (3) invalid, and (4) failed. The client can determine that the message status of the first SCSI request is complete where all of a message has been communicated between the client and the server. For example, the client can determine that the message status of a call SCSI request is complete where the server has accepted the entire call message. Alternatively, the client can determine that the message status of a reply SCSI request is complete where the client has received the entire reply message from the server.

In some instances, the server is unable to completely accept a call message (e.g., the server has insufficient buffer space for the entire call message) or completely send a reply message (e.g., the reply message is not available for communication at the server or is too large to include in a payload of a single SCSI response). Consequently, the client can receive a first SCSI response from the server over the FC network that indicates this incompletion. The SCSI response can include, for example, a status code and/or an indication of a number of bytes accepted for a call message or the number of bytes returned for reply messages. The client then can determine that the message status of the first SCSI request is incomplete.

To maintain data integrity, the first SCSI request sent by the client to the server over the FC network is validated at the server. In one embodiment, the first SCSI request includes the virtual connection identifier in the LBA field of the first SCSI request. The server can validate the first SCSI request using the virtual connection identifier and/or other parameters in the LBA, such as a sequence number. Additionally, where the first SCSI request is a call SCSI request having a payload, the server can validate the SCSI request using parameters included in the payload, such as a virtual connection tuple. If the server determines that the first SCSI request is invalid, the client receives a SCSI response from the server over the FC network indicating the first SCSI request is invalid. The client can determine that the message status is invalid upon receiving such a SCSI response from the server.

Additionally, a SCSI response for the first SCSI request can be validated at the client. For example, the client can validate a SCSI response using a header of the response that includes the virtual connection identifier and/or other parameters included in the header, such as a virtual connection tuple and a sequence number. If the client determines that the SCSI response is invalid, the client can determine that the message status is invalid.

Occasionally, the first SCSI request or the first SCSI response fails to be communicated, such as due to a failure of software or hardware at the client, the server or the FC network. The client can determine the failed message status where a client timeout expires and a SCSI response has not been received. Alternatively, the client can determine the failed message status of the first SCSI request by receiving a notification that the SCSI request failed (e.g., from a client OS SCSI service) or by receiving a SCSI response from the server indicating that the first SCSI request was aborted (e.g., before reaching a server FC adapter).

Where the message status is determined to be complete, normal message communication using SCSI requests and responses over a FC network can resume, as shown at decision block 1304. An embodiment of this process is illustrated at FIG. 7, and the process can resume at, for example, operations 701, 702 or 704.

If the message status is not complete, the client can determine an action based on the determined message status, as shown at operation 1305, such as retrying the SCSI request or closing the virtual connection. In one embodiment, the client can provide the status to the module, such as by indicating the call or reply message could not be sent or received or by indicating a socket failure at the FC transport adapter. In response, the module can instruct the FC transport adapter to end message communication, such as by closing a socket connection between the module and the FC transport adapter. Thus, FC transport adapter can disassociate the module and the virtual connection and cease creating SCSI requests for message communication for that virtual connection.

In an embodiment in which the client determines the message status is incomplete, the client can determine that the action is to complete the message communication by creating a next SCSI request at operation 1306. Where the first SCSI request includes a call message, the client can create a next call SCSI request that includes the remainder of the call message that was not accepted by the server. Where the first SCSI request is a reply SCSI request, the client can create a next reply SCSI request that requests the remainder of the reply message.

In an embodiment in which the client determines the status is invalid, the client determines that the action is to close the virtual connection. In one embodiment, the client closes a virtual connection by sending a SCSI request to the server over the FC network to request that the virtual connection be closed. Thus, at operation 1306 the client creates a next SCSI request (e.g., a SCSI write request) that includes the virtual connection identifier and an indication that the virtual connection is to be closed at the server. The client can also disassociate the virtual connection from the associated module.

In an embodiment in which the client determines the message status is failed, the client can determine that the action is to retry the first SCSI request. Accordingly, at operation 1306 the client can create a next SCSI request that is substantially the same as the first SCSI request. In some embodiments, the next SCSI request does not increment the message sequence number but uses the same sequence number from the first SCSI request, because the client assumes that the first SCSI request did not reach the server and therefore the expected sequence number at the server would not have been incremented. Additionally, the client can select a new transport path for the next SCSI request to address a failure.

At operation 1307, the client sends the next SCSI request to a server over the FC network. The method 1300 then returns to operation 1303 and iterates through the method 1300 as described above.

Figure 14:
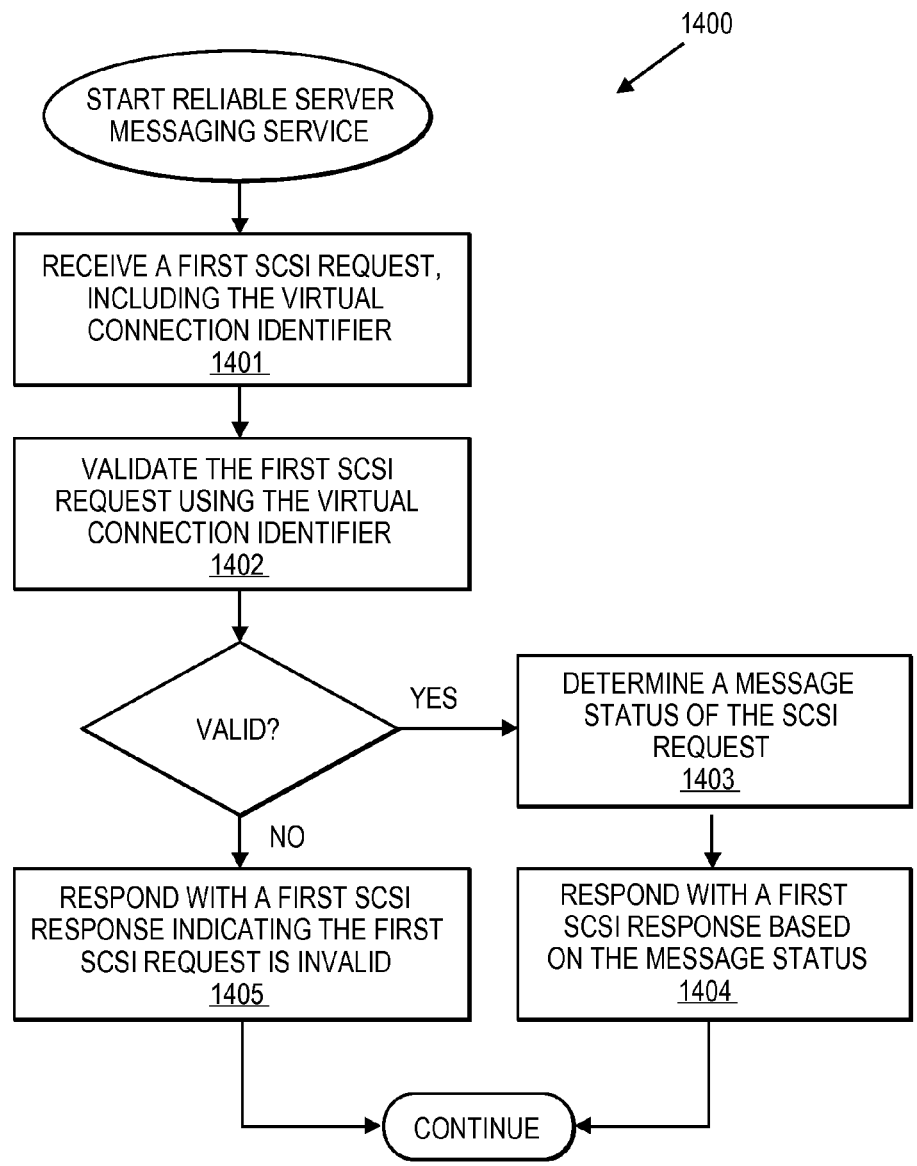
FIG. 14 is a flowchart illustrating one embodiment of a method executed by a server for reliably communicating with a client over a Fibre Channel network.

Now with respect to FIG. 14, a method 1400 illustrates an embodiment of a method executed by a server for reliably communicating messages between the server and a client over a Fibre Channel network using SCSI requests and responses. This method 1400 can be performed by a server FC adapter 320 operable to communicate with one or more processes 315a-315b of the server 150, as shown in FIG. 3. In some embodiments, the method 1400 is performed where a virtual connection has been established with a client over the FC network. Accordingly, the SCSI requests include a virtual connection identifier associated with a server process. With respect to the embodiments of FIGS. 11-12, the method 1400 is not mutually exclusive, and some operations of FIGS. 11-12 can be performed in addition to those operations illustrated in the method 1400. For example, the operations 1201-1203 of FIG. 12 may be performed to create a socket connection to a server process and associate the socket with a virtual connection. The method 1400 can be included in FIGS. 9-12 to provide reliable communication of messages.

Beginning with operation 1401, a first SCSI request is received at the server. The received SCSI request is for an established virtual connection and, accordingly, the SCSI request includes a virtual connection identifier. The SCSI request can be a SCSI read request that includes a virtual connection identifier in the LBA field of the SCSI request (i.e., a reply SCSI request). Alternatively, the SCSI request can be a SCSI write request that includes the virtual connection identifier in the LBA field and a call message, and/or a header, in the payload (i.e., a call SCSI request). Embodiments of operation 1401 are described at operations 1101, 1204 and 1208.

At operation 1402, the first SCSI request is validated. The first SCSI request can be validated by examining the virtual connection identifier, such as by comparing it to an expected virtual connection identifier. Additionally, the first SCSI request can be validated by examining other parameters included therein. In one embodiment, the first SCSI request includes a tuple value of a virtual connection tuple (or a bit segment thereof) and the included tuple value is compared to an expected tuple value for that virtual connection. The server can examine the virtual connection identifier and other parameters at the LBA field of the first SCSI request. For a SCSI request that includes a payload (e.g., a call SCSI request), the server can use other parameters included in a header of the payload to validate the first SCSI request, such as the virtual connection tuple, in addition to or instead of the parameters in the LBA field. Where the server encounters an unexpected virtual connection identifier, the server can determine that the first request is invalid. In one embodiment, validation is contingent upon one or more parameters included in the first SCSI request, in addition to the virtual connection identifier.

In one embodiment, the first SCSI request includes a sequence number in addition to the virtual connection identifier. The server can compare the sequence number to an expected sequence number. Where the two sequences numbers do not match, the server can determine that the request is invalid. However, where the server determines that the request is otherwise valid and the received sequence number matches a last expected sequence number, the server can assume that the client did not receive a last SCSI response sent by the server over the FC network, and therefore the client is retrying the SCSI request. A retried request can be considered either valid or invalid, depending upon the embodiment.

Where the first SCSI request is invalid, the server proceeds to operation 1405. At operation 1405, the server responds to the first SCSI request with a first SCSI response indicating that the first SCSI request is invalid. In one embodiment, the server FC adapter creates a first SCSI response that includes a SCSI status code or vendor-specific status code to indicate the invalidity. The first SCSI response is then sent to the client over the FC network.

Where the first SCSI request is valid, the server continues to operation 1403 to determine a message status of the first SCSI request. The message status can be based on attempting to communicate a message with a server process associated with the virtual connection identified in the first SCSI request (e.g., send a call message to or receive a reply message from the process).

Where the first SCSI request is a call SCSI request, the message status can be determined based on whether the server accepts the entire call message. Two embodiments of this are illustrated at operations 1104-1105 and 1205-1206. For example, a server FC adapter can accept the entire call message by providing the call message to a server process associated with the virtual connection or by buffering the call message to be provided to the associated process and, therefore, the message status is complete. Where the server only accepts part of the call message, the message status is incomplete.

Similarly, where the first SCSI request is a reply SCSI request, the message status can be determined based on whether a reply message is available for the virtual connection of the reply SCSI request. Two embodiments of this are illustrated at operations 1107 and 1206. For example, a server FC adapter receive the entire reply message from a server process associated with the virtual connection or by receiving the entire message from one or more buffers and, therefore, the message status is complete. Where the server only a portion of or none of the reply message is available, the message status is incomplete.

In some embodiments, the message communication is constrained by a timeout. If the server is unable to accept the call message or if an entire reply message is unavailable before the timeout expires, the message status can indicate incomplete.

In one embodiment, the first SCSI request includes an indication that a prior SCSI response sent by the server was received by the client. The indication can be, for example, a sequence number of a prior reply SCSI response received by the client from the server. In response to the indication that the client received a prior SCSI response from the server, the server can free resources consumed by the prior SCSI response, such as by removing a reply message included in the prior SCSI response from one or more buffers. Additionally, the client can increment the expected reply sequence number.

At operation 1404, the first SCSI request is responded to with a first SCSI response based on the message status. For example, if the server is able to accept or provide an entire call or reply message, the server can create a first SCSI response indicating that the message status is complete. Where the server is unable to accept or provide an entire call or reply message, the server can create a SCSI response indicating that the message status is incomplete. In some embodiments, the SCSI response can include a number of bytes of an incomplete call message that were accepted or not accepted by the server. Alternatively, the SCSI response can include a number of bytes of an incomplete reply message and/or an indication that the reply message is incomplete (e.g., the number of bytes requested and the number of bytes actually included do not match). Three embodiments of this operation are described at operations 1106 and 1108 of FIG. 11 and operation 1209 of FIG. 12. The server can then send the SCSI response to the client over the FC network.

In embodiments wherein a retried SCSI request is not considered invalid, the server can respond with the prior SCSI response. The server can have the prior SCSI response buffered or cached so that a retried SCSI request can be quickly responded to by the server without consuming additional resources. The server can then send the SCSI response to the client over the FC network.

At the end of the method 1400, normal message communication using SCSI requests and responses over a FC network can resume. An embodiment of this process is illustrated at FIG. 9.

Figure 15:
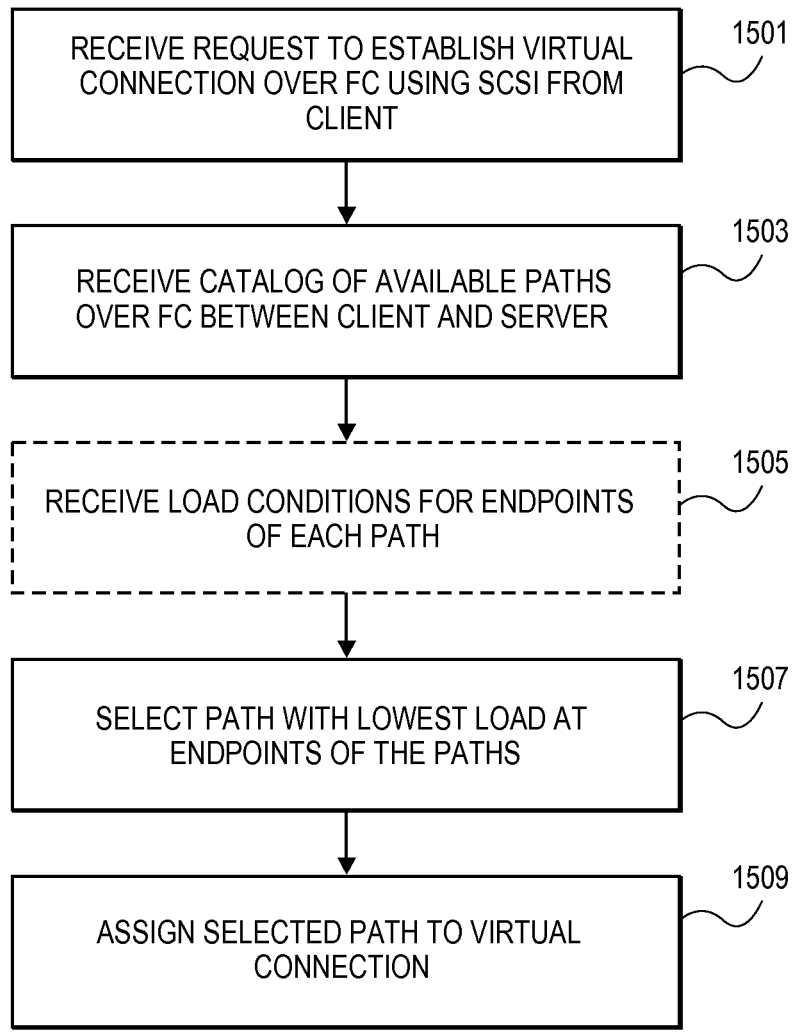
FIG. 15 is a flowchart illustrating one embodiment of a method executed by a server for selecting paths for virtual connections.

FIG. 15 is a flowchart illustrating one embodiment of a method executed by a server for selecting paths for virtual connections. In one embodiment, the method begins with the operation 1501 where the server receives a request to establish a connection that is serviced by a virtual connection over the Fibre Channel network using SCSI messages sent by the client. As detailed further herein above, the operation 1503 continues with the server Fibre Channel adapter receiving a set or catalog of available paths over the Fibre Channel network between the client and the server, or more specifically the resource (e.g., a server host bus adapter, client host bus adapter, and a LUN) that the client is seeking to communicate with.

At operation 1505, the server Fibre Channel adapter receives load conditions for endpoints of each path. The load conditions can be measured by a separate monitoring module or similar component of the system. The load can be measured in throughput, resource usage, queue length or similar metrics. The load is measured on an endpoint by endpoint basis. The local endpoints can be monitored by a module of the server Fibre Channel adapter at the server and/or a module of the Fibre Channel transport adapter at the client. The server and client can exchange this data using the SCSI over Fibre Channel protocols as described herein or using other methods of communication.

The operation 1507 then selects the path with the lowest load at its endpoints. Where endpoint load is known for both ends the total cumulative load can be considered when selecting the path, the server-side endpoint can be given primary consideration or weight with the client-side load being a secondary or tie-breaking consideration or weight. Where endpoint load is only known for the server-side endpoints then the path having the lowest load at the server-side endpoint can be selected. In some embodiments, the LUNs of a path are considered as a tertiary component of the load. Where the load across the LUNs of a selected server-side endpoint are unevenly distributed, then a less-busy LUN of that server-side endpoint can be selected for the path. The selected path is then assigned to the virtual connection at operation 1509. The server Fibre Channel adapter can return the selected path that is assigned to the virtual connection as described herein above.

Figure 16:
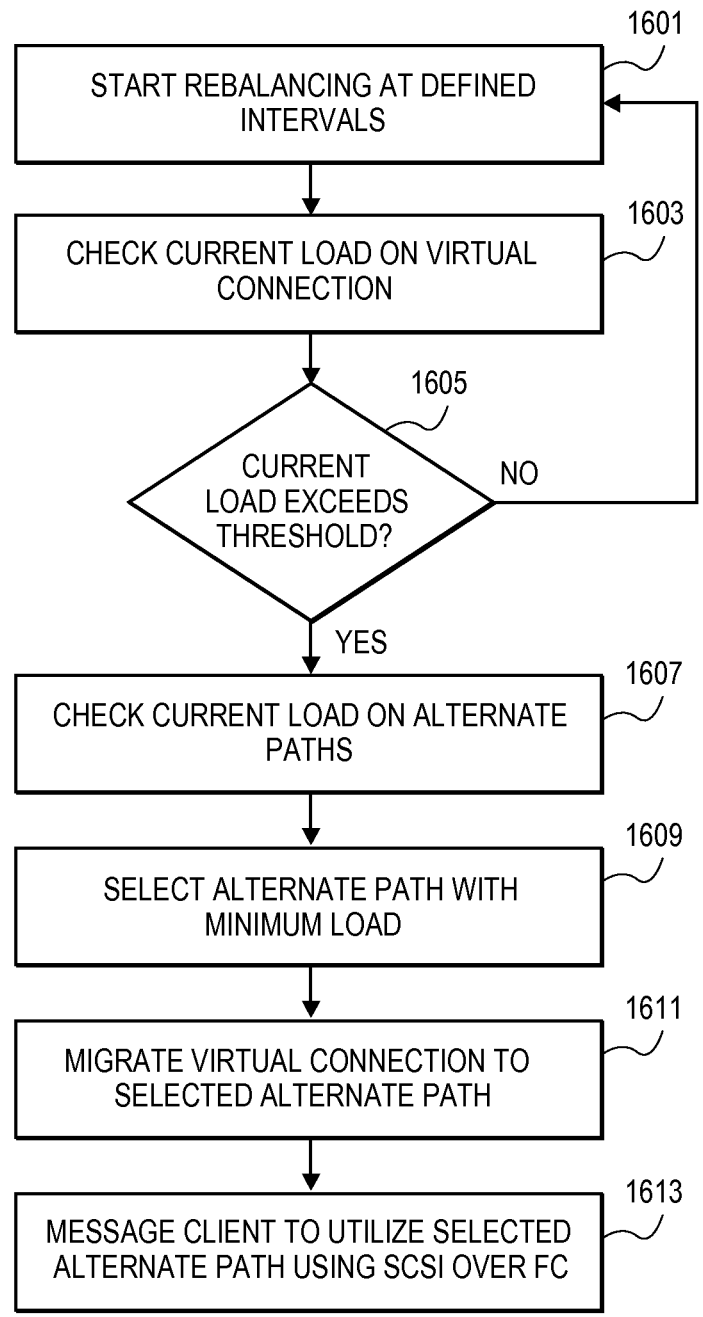
FIG. 16 is a flowchart illustrating one embodiment of a method executed by a server for rebalancing virtual connections over available paths.

FIG. 16 is a flowchart illustrating one embodiment of a method executed by a server for rebalancing virtual connections over available paths. This process can be executed by a virtual connection rebalancing module that is part of or in conjunction with the server Fibre Channel adapter. A rebalancing of the distribution of virtual connections over the paths and endpoints can be analyzed intermittently at defined intervals or in response to heavy load conditions at particular endpoints. In one example embodiment, at operation 1601 the rebalancing is initiated at a defined interval. At operation 1603 the current load conditions for the virtual connections are checked. The check of the virtual connections can determine the load at the endpoints associated with each virtual connection as well as the overall virtual connection load. The monitoring of the load can be on the server-side by a local monitoring module or can be at both the server-side and the client-side where the client executes a monitoring module to collect load information for the client-side endpoints of the paths associated with the virtual connections. The load can be measured in throughput, resource usage, queue length or similar metrics.

At operation 1605, the load on a particular path assigned to a virtual connection can be determined to exceed a define threshold. If such a threshold were not exceeded, then the process would continue at the next interval at operation 1601. The operation 1607 checks the load on alternate paths for a virtual connection, in response to determining that the load on the path of the virtual connection has exceeded the threshold. The alternate paths can be known from the catalog or set of paths that was provided by the client at the time of the selection of the initial path for the virtual connection or by a recalculation of the available paths based on current topology data maintained by the server. The alternate path having the lowest or minimum load is selected by the virtual connection rebalancing module at operation 1609.

The server Fibre Channel adapter at operation 1611 then migrates the virtual connection to the selected alternate path. The virtual connection can be updated with the path identifier or path information. At operation 1613, this path identifier or path information is sent to the client via a SCSI message to direct the client to utilize the selected alternate path over the Fibre Channel network for the specified virtual connection. This process can continue intermittently or at the defined interval to continuously check and rebalance the distribution of the virtual channels over the paths between a set of clients and the server and thereby optimize the use of resources and throughput for the server.

Figure 17:
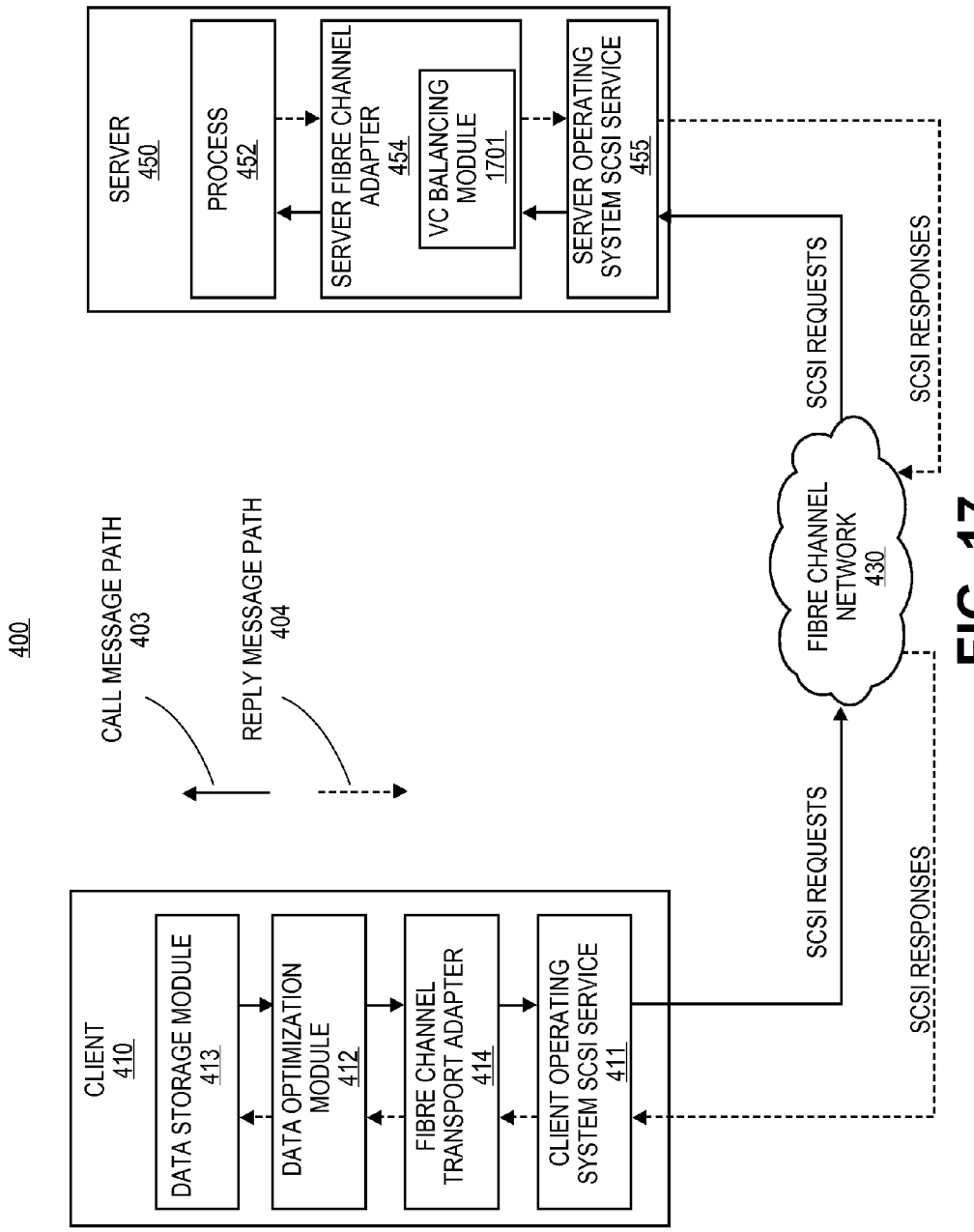
FIG. 17 is a block diagram of one embodiment of a client-server system for reliable communication over a Fibre Channel network.

FIG. 17 is a block diagram of one embodiment of a client-server system for reliable communication over a Fibre Channel network. The client-server system is described in further detail herein above in regard to FIG. 4A. The virtual connection balancing module 1701 is shown here as being a component of the server Fibre Channel adapter where it monitors the load of the virtual connections and dynamically reassigns them to less loaded endpoints or paths between the server and the client communicating with the server via the virtual connection. In this manner, the virtual connection balancing module improves the throughput and reliability of the SCSI over Fibre Channel communication system.

Figure 18:
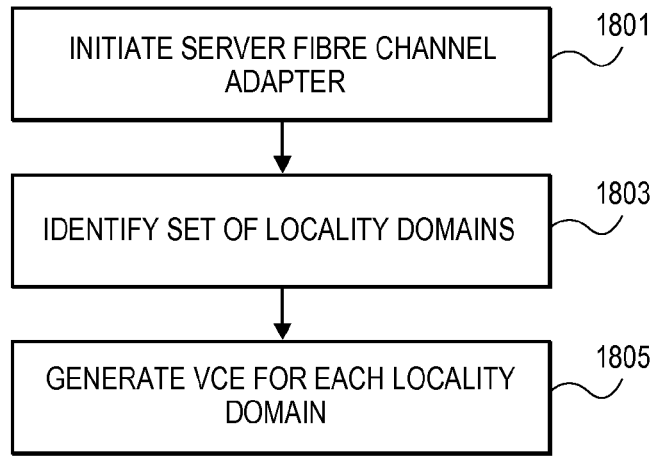
FIG. 18 is a flowchart illustrating one embodiment of virtual connection engine instantiation.

FIG. 18 is a flowchart illustrating one embodiment of virtual connection engine instantiation. The method is executed by the server at time that the server is started up or the start of the services provided by the various server processes are initiated such that the ability to communicate with the client processes over the Fibre Channel network using SCSI may be required. At operation 1801 an operating system or similar component of the server starts the execution of the server Fibre Channel adapter. The server Fibre Channel adapter then determines the resources available at the server or a set of servers over which it operates and facilitates communication between the server and a set of clients and the processes or applications executing on the set of clients.

At operation 1803, the server Fibre Channel adapter identifies a set of locality domains. Locality domains are sets of processing units, such as central processing units, and the resources, such as memory, caches and network bandwidth, that are associated and available to each of the processing units. These locality domains can be contained within a discrete server machine or can be distributed over multiple machines or similarly arranged. In one embodiment, resources and processors allocated to one locality domain cannot be allocated or shared to any other locality domain. These locality domains can remain fixed during the operation of the server or in other embodiments can be dynamically rearranged as resources change or in response to failures within the server system. The locality domains are conceptual units of operation that are maintained by the server Fibre Channel adapter to manage the resources that are available to the server Fibre Channel adapter.

At operation 1805 at least one virtual connection engine is generated and assigned to each of the locality domains. A virtual connection engine is a collection of processing threads that handle the functions of a set of virtual connections. In one example embodiment, these threads handle processing of incoming SCSI request including DATA_SEND and DATA_RECEIVE operations (referred to as an Engine Control Thread), the writing of buffered data to the backend local host sockets tied to the processes of the server (referred to as a Data Send Poll Thread) and the reading of data from the backend local host sockets into buffers to be provided to client systems via SCSI response messages (referred to as a Data Receive Poll Thread). The virtual connection engine (VCE) can guarantee a single producer/consumer model for handling a set of virtual connections. Production (i.e., adding data to the stream) is fully controlled by one thread and consumption (i.e., removing data from the stream) is fully controlled by one thread. The producer and consumer threads are separate and independent. A VCE can handle any number of virtual connections, however, an uneven distribution of the virtual connections can diminish performance. This performance can, for example, impact data cache utilization by the virtual connections. With a VCE sharing data cache resources amongst the virtual connections assigned to the VCE, the data cache can become a bottleneck for the operations of the virtual connections assigned to a VCE with a heavy load.

Figure 19:
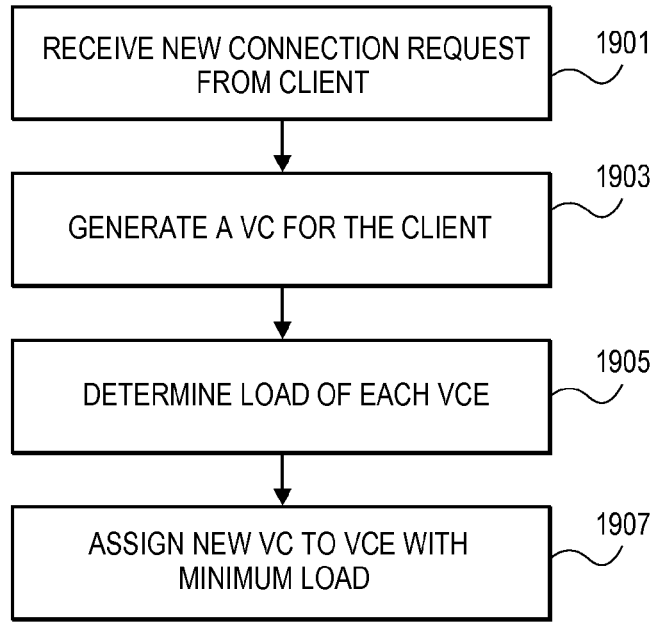
FIG. 19 is a flowchart illustrating one embodiment of virtual connection generation and load distribution.

FIG. 19 is a flowchart illustrating one embodiment of virtual connection generation and load distribution. As described herein above, after being established the server Fibre Channel adapter can establish virtual connections in response to requests from clients over the Fibre Channel network using SCSI messaging. This process can be executed by a VCE management module of the server Fibre Channel network, which performs the operations that generates and assigns virtual connections to VCEs. At operation 1901, the VCE management module receives a new connection request from a client in the form of a SCSI message.

At operation 1903, the VCE management module generates a virtual connection for the client to service the communication request between the client and the server. At operation 1905, the VCE management module determines a load for each of the VCEs in the server Fibre Channel adapter. The load can be determined by metrics such as throughput, queue length, processing time, or similar metrics. The VCE management module selects the VCE with a minimum load at operation 1907. This provides an initial load distribution upon creation of each virtual connection. However, this load balance can change over the operation of a set of virtual connections as some virtual connections generate a heavier load over time.

Figure 20:
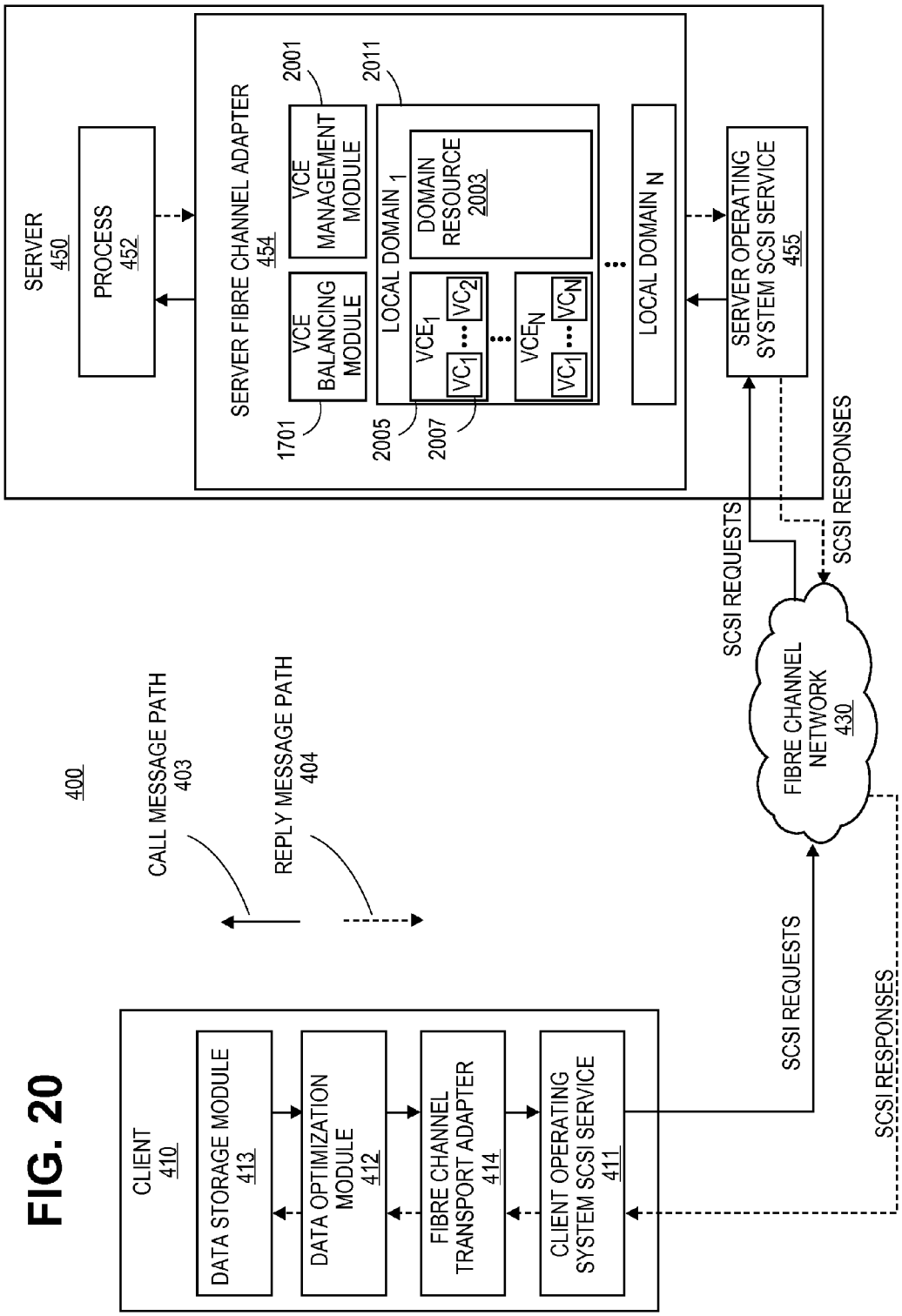
FIG. 20 is a block diagram of one embodiment of a client-server system for reliable communication over a Fibre Channel network.

FIG. 20 is a block diagram of one embodiment of a client-server system for reliable communication over a Fibre Channel network. The example client-server system is introduced herein above in regard to FIG. 4A and the additional components of a virtual connection balancing module 1701, VCE management module 2001 and local domains 2011. The example embodiment includes a single server and client by way of example. One skilled in the art would understand that any number of servers and clients can interact using the SCSI over Fibre Channel network and that the components described herein can be distributed over any number of servers or clients.

The VCE managing module 2001 can generate virtual connections or take responsibility for assigning virtual connections 2007 to particular VCEs 2005. New virtual connections 2007 can be assigned to any VCE 2005. In one embodiment, the VCE managing module 2001 assigns new virtual connections to a VCE with a minimum load to create an initial load balance amongst the VCEs. Each VCE can have access to a set of domain resources specific to the local domain 2011.

The VCE balancing module 1701 analyzes the load on each of the VCEs 2005 to determine whether any VCE has an excessive load or a load that exceeds a particular threshold. If such a VCE is found, then the VCE balancing module 1701 reassigns a set of virtual connections from the VCE with the high load to another VCE such as a VCE with a minimum or low load. The VCE balancing module 1701 can check the load balance at any interval or with any frequency and can check each VCE or a subset of the VCEs. The VCE balancing module 1701 can obtain the metrics from monitoring modules or similar sources for determining the VCE and virtual connection loads.

Figure 21:
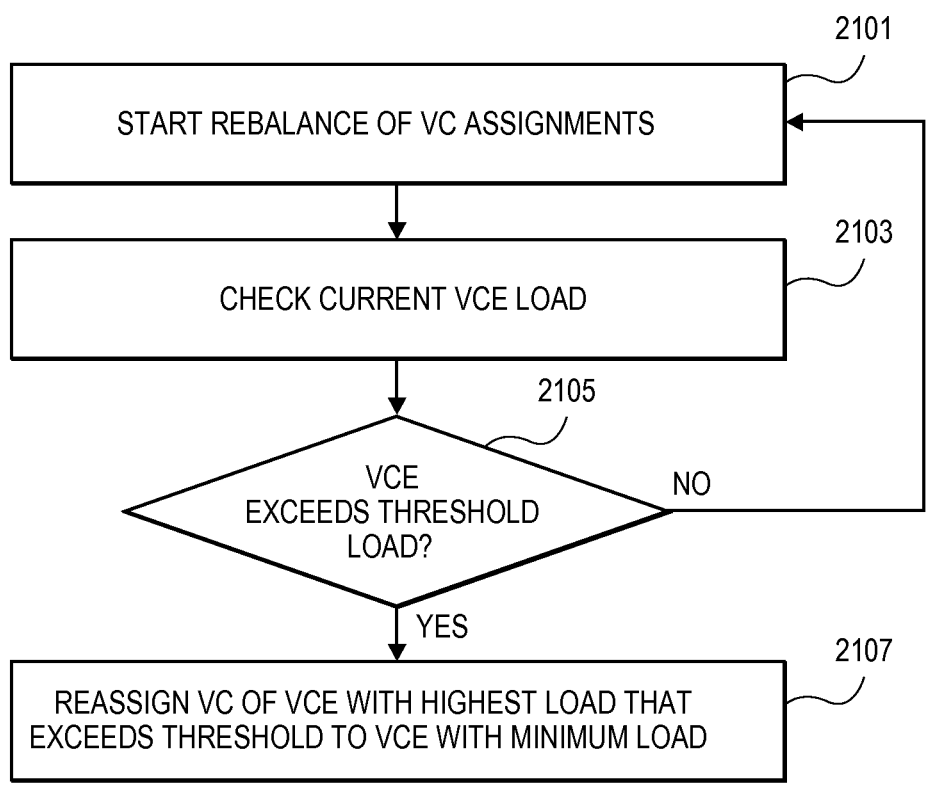
FIG. 21 is a flowchart illustrating one embodiment of a virtual connection rebalancing process.

FIG. 21 is a flowchart illustrating one embodiment of a virtual connection rebalancing process. This process is carried out by the VCE balancing module. At operation 2101, the VCE balancing module starts the rebalance of virtual connection (VC) assignments to each of the VCEs. This rebalancing method can take place with any frequency or with any interval. The VCE balancing module obtains the current VCE load for each VCE as well as the load contributed to each VCE by each virtual connection at operation 2103. The load data can be obtained from a monitoring module or similar source.

At operation 2105, the VCE rebalancing module checks whether the load on each VCE exceeds a defined threshold load. The threshold can be set by an administrator, dynamically determined or pre-programmed. A check can be made for each VCE or can be made just until at least one VCE is found to exceed the threshold. If no VCEs have a load that exceeds the threshold, then the method continues by waiting until the next rebalancing iteration at operation 2101.

However, if at least one VCE is found to exceed the threshold, then at operation 2107 the VCE rebalancing module reassigns at least one virtual connection of the VCE with the highest load or the load that exceeded the threshold. The virtual connections that are reassigned can be reassigned to the VCE that has a minimum load or at least a VCE with a load below the threshold. In one embodiment, the virtual connection contributing the largest load to the VCE is the virtual connection that is reassigned. In another embodiment, any set of virtual connections that reduce the load of the VCE below the threshold, to an average load or similar standard can be reassigned to another VCE such that it does not as a result of the reassignment exceed the threshold.

Figure 22:
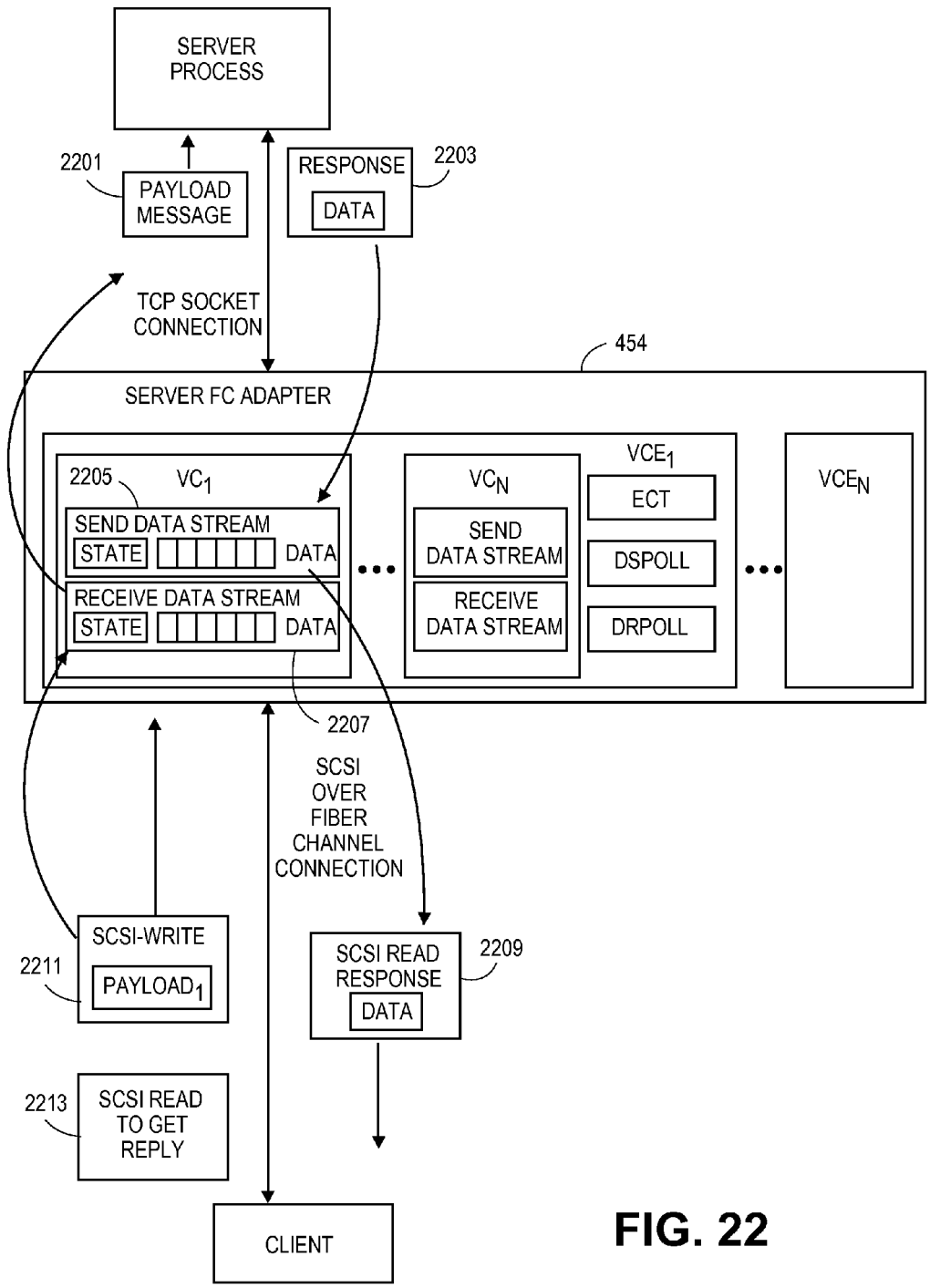
FIG. 22 is a block diagram of one embodiment of shared access system for managing data streams in virtual connections.

FIG. 22 is a block diagram of one embodiment of shared access system for managing data streams in virtual connections. This method and system optimize the utilization of the data resources utilized by each virtual connection. Specifically, the latency that is caused by the buffering of data by the virtual connection to be read from or written to the local host sockets of the local server process. The method minimizes the time required to lock data structures to ensure coherency, thereby reducing latency because the producer thread and consumer thread can nearly continuously access the data streams to process the data streams. A data stream consists of a singly-linked list, where each item in the list is a buffer that can hold any amount of data, (e.g., 64 kb of data).

As discussed above, each VCE can have three threads that process the data for all virtual connections that are serviced by the VCE. The three threads are the Engine Control Thread, Data Send Poll Thread and the Data Receive Poll Thread. With this method, the VCE can guarantee a single producer and single consumer model of operation. The production method of adding data to the data stream can be fully controlled by one thread and the consumption method of removing data from the data stream can be controlled by one thread. The producer and consumer threads are different for the two data streams associated with each virtual connection. There is a send data stream for the data to be forwarded to the local host socket for the server process. There is also a receive data stream for the data received from the local host socket from the server process.

For the send data stream the producer thread is the Engine Control Thread for most incoming data where the Send Data operation can be satisfied quickly, because the send data stream is not full. In other situations, the Data Send Poll Thread can be a producer for this data stream when handling a pending Send Data operation after some data has been removed from the send data stream and written to the local host socket. The consumer for the send data stream is always the Data Send Poll Thread. For this data stream, the producer thread seeks to be able to add data to the data stream (e.g., implemented as a queue) while the Data Send Poll Thread is seeking to remove data items from the send data stream and write them to the backend local host socket. Avoiding blocking the Engine Control Thread while the Data Send Poll is writing minimizes any latency associated with the send data stream.

For the receive data stream the producer is always the Data Receive Poll Thread. The consumer is typically the Engine Control Thread in the case where the Receive Data operation can be satisfied quickly out of data already present in the receive data stream. In other cases, the Data Receive Poll Thread may be a consumer, when handling a pending Receive Data operation, after some data has been read out of the backend local host socket into the receive data stream. The consumer thread seeks to be able to remove data from the receive data stream (e.g., implemented as a queue) while the Data Receive Poll Thread filling the receive data stream via a read operation from the backend local host socket. It is desirable to avoid blocking the Engine Control Thread while the Data Receive Poll Thread is performing a read.

Based on a single producer/single consumer model of operation as defined herein above the time locking each data stream is minimized thereby maximizing throughput. These structures are shown for an example set of messages being processed between the client and the server process by the server Fibre Channel adapter. The structures shown are isolated for sake of clarity from the general structures shown for example in FIG. 4A and discussed herein above.

The server Fibre Channel adapter 454 enables communication between a server process and a client. In the example, the client sends a SCSI Write message 2211 with a payload of data to be provided to the server process. The virtual connection places this data in the send data stream 2205, which includes a queue and state data to track the current conditions of the queue including in one embodiment a lock. The data from the payload and the SCSI Write can be handled by the Engine Control Thread, or by the Data Send Poll Thread itself for pending operations, which stores the data in the tail of the send data stream queue. The Data Send Poll Thread then reads this data from the data stream when it reaches the head of the queue and writes it to the backend local host socket as a message 2201 for the server process.

The server process may generate a response message 2203 with data to be returned to the client. This message and data are handled by the Data Receive Poll Thread, which stores the data in the receive data stream at the tail of the queue. The Engine Control Thread retrieves this data in response to receiving the SCSI Read message 2213 from the client, which generates a SCSI Read Response message 2209 with the data from the head of the receive data stream. The Data Send Poll Thread can also retrieve the data for pending operations. The processes of the producer and consumer threads are further described in regard to FIG. 23 and FIG. 24.

Implementing this system and process, the producer and consumer can simultaneously access an individual buffer in the linked list of the data stream, without the need for locking or only a very brief and limited use of a lock. This is because the producer is the only process that adds a buffer to the linked list, and only adds a buffer when it already holds some data. Also, the consumer is the only process that removes a buffer from the linked list of the data stream and only after it has consumed all data from every byte position within the buffer. A lock is held only when buffers are being added to or removed from the list.

This simultaneous access of a buffer without locking provides a performance advantage, because a producer and consumer can access the same buffer without having to wait to obtain a lock, which reduces idle time where one or the other must wait for the lock.

Figure 23:
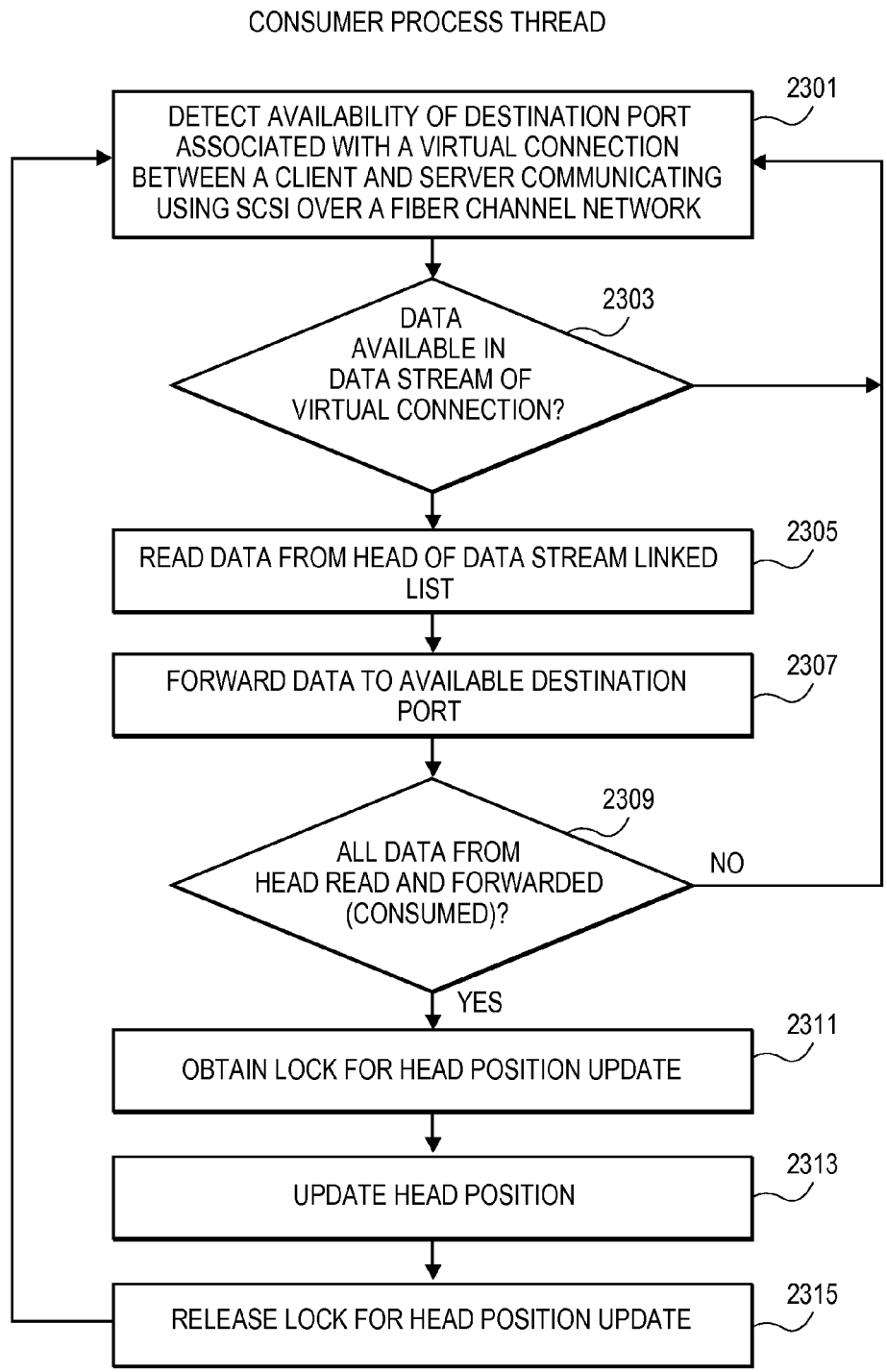
FIG. 23 is a flowchart illustrating one embodiment of a consumer method for shared data stream management in a virtual connection.

FIG. 23 is a flowchart illustrating one embodiment of a consumer method for shared data stream management in a virtual connection. The consumer process is described in regard to the management of the data from the send data stream. However, one skilled in the art would understand that the principles and operations of this process are applicable and adaptable to the management of the receive data stream as well. For sake of clarity the example of the management of the consumer method as it is applied to the send data stream is provided. The consumer thread can be instantiated at the time that the VCE is created and allotted a schedule to service the virtual connection containing the data streams.

The operation 2301 detects availability of the destination port (i.e., the backend local host socket) association with the virtual connection, which is a mechanism for communication between a server process and a client that utilizes the SCSI over a Fibre Channel network. In response to detecting the availability of the port, the consumer thread check whether there is data available in the data stream (i.e., the queue of the send data stream in this example) of the virtual connection at operation 2303. If there is no data in the data stream, then the method continues and checks again in subsequent iterations whenever the thread is available to the virtual connection at operation 2301.

If there is data available in the data stream then the consumer thread reads the available data from the head of the queue, which in one example is implemented as a singly linked list at operation 2305. The data read from the head of the queue is written or forwarded to the available destination port or backend local host socket in route to the server process at operation 2307. A check is then made whether all the data from the head of the queue has been read and forwarded or similarly consumed by the consumer thread. If all of the data has not been read or consumed, then the method continues allowing the consumer thread to continue to read and transfer data to the server process.

If however, the reading of the data has exhausted the available data in the head of the data queue, which may hold any amount of data or sufficient data for an entire message payload or response data to be easily held in one location in the queue, then a lock is obtained by the consumer thread to exclude other processes or threads (e.g., the producer thread) from accessing the queue of the send data stream at operation 2311. The lock is briefly held at operation 2313, this operation updates the head position of the queue effectively discarding the contents of the queue at the head position and releasing the position in the queue or the memory associated with the data stream. This data can be part of the header or management data stored in the state data of the data stream. At operation 2315, the lock can be released and the consumer process can continue to check for the available port and data to be written to the port at operation 2301.

Figure 24:
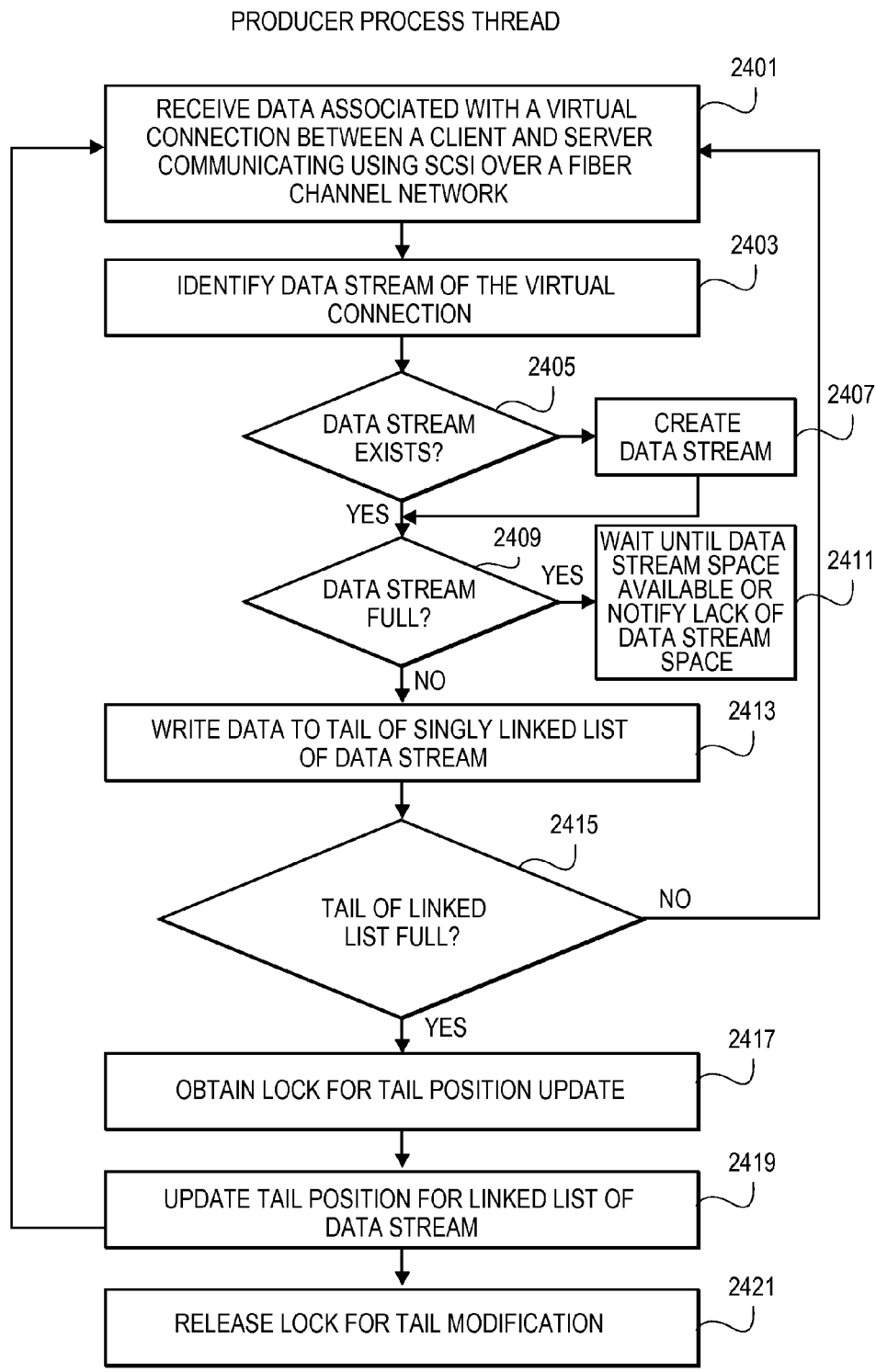
FIG. 24 is a flowchart illustrating one embodiment of a producer method for shared data stream management in a virtual connection.

FIG. 24 is a flowchart illustrating one embodiment of a producer method for shared data stream management in a virtual connection. The producer process is described in regard to the management of the data from the receive data stream. However, one skilled in the art would understand that the principles and operations of this process are applicable and adaptable to the management of the send data stream as well. For sake of clarity the example of the management of a producer method as it is applied to the send data stream is provided. The producer thread can be instantiated at the time that the VCE is created and allotted a schedule to service the virtual connection containing the data streams.

The operation 2401, the producer thread detects reception of data associated with a virtual connection between the client and the server process that are communicating over a Fibre Channel network using SCSI. The incoming SCSI requests are analyzed to determine a virtual connection that services the client messages at operation 2403. At operation 2405, a check is made whether the virtual connection exists. If the virtual connection does not exist then the virtual connection is instantiated along with its data stream at operation 2407. If the virtual connection and associated data stream already exists or if the virtual connection has been instantiated, then a check is made whether the send data stream is full at operation 2409. If the data stream is full, then the process at operation 2411 may have to wait until data stream space becomes available or provide notification of a lack of data stream space. If the data stream is full, then the SCSI request can be recorded as the pending operation for this virtual connection and held in that state for a period of time indicated in the request. If the request indicates a zero-valued timeout, or if the timeout expires before any data becomes available, the SCSI request is completed with a completion code indicating that no data was transferred. Data is not retrieved from an upstream source (e.g., a SCSI write/DATA_SEND operation) until space is available in the data stream. For a DATA_SEND case, the DATA_SEND operation includes a timeout value (e.g., one second). If the timeout expires and there is still no room in the data stream, then the DATA_SEND operation is completed with a NO_DATA_TRANSFERRED response. The client recognizes this response and arranges to retry transferring the data. More generally if a notification is returned to the client of the lack of space in the data stream, the client can function to throttle the data being sent by the client, which slows down the rate of traffic to a manageable level.

At operation 2413, if the data stream is not full, then the received data is written to the tail of the singly linked list (or similar queue structure) of the data stream. The singly linked list is utilized for this complex consumer/producer model to help ensure that the threads are minimally blocked by one another. A check is made after the write, to determine whether the tail of the linked list is full at operation 2415. If the queue at the tail position is not full, then the process continues to receive data and write it to the tail of the queue without requiring a lock.

However, if the tail of the queue is full, then the lock for the send data stream is obtained at operation 2417. The position of the tail of the queue can then be updated at operation 2419 in the state of the data stream. After the update of the tail position has completed, then the lock is released allowing continued reading and writing to the send data stream by the consumer thread and producer thread of these data streams for the virtual connections in a given VCE.

Figure 25:
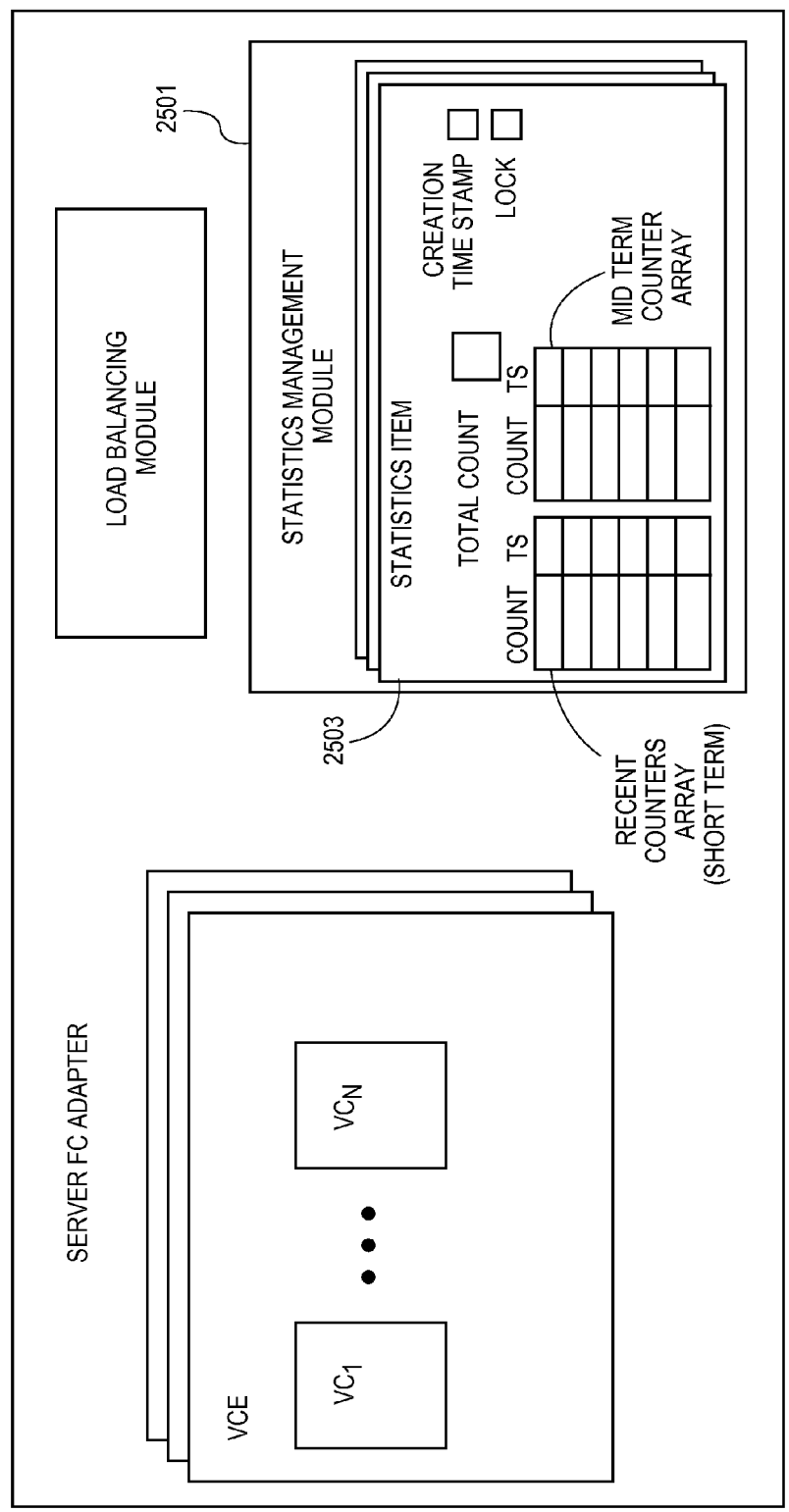
FIG. 25 is a block diagram of one embodiment of a statistics management module of a server Fibre Channel adapter.

FIG. 25 is a block diagram of one embodiment of a statistics management module of a server Fibre Channel adapter. While the embodiments are described in relation to statistics management for a server Fibre Channel adapter, one skilled in the art would understand that the principle, processes and structures described herein below are provided by way of example and not limitations. The statistics management processes and structures can be applied to other networks or computing devices and combination thereof where monitoring is performed and metrics collected. The diagram shows the components of a server Fibre Channel adapter include a statistics management module 2501. The other components of the server Fibre Channel adapter are described in further detail herein above such as with regard to the example of FIG. 4A. The statistics management module 2501 generates and manages a set of statistics items 2503. Each statistics item tracks at least one metric related to the system such as the load on a VCE, load on a virtual connection, endpoint throughput and similar metrics. The statistics management module 2501 and statistics items are designed to operate without requiring a locking mechanism. However, in alternate embodiments such a lock can be provided for each statistics item 2503. Operations on the statistics items can be atomic, i.e., able to be completed without interruption by other threads or events.

To manage the resource demand in terms of space and processing power, the statistics items 2503 can be structured to maintain a set of counter arrays or similar data structures that track the associated metric over differing time ranges. For example, the statistics items 2503 can include a creation timestamp when the statistic item was created and a current count showing a current value for the monitored metric representing the total value over the time between creation and the current time. For example, if the statistics item 2503 tracks throughput the total count can be the total number of packets or bytes that have been transferred over the time of the statistic item 2503 existence or up to the last measurement. The statistics items 2503 can be updated with new measurements at regular intervals. To conserve space arrays of these regular intervals are maintained at varying levels of granularity. For example a first array, which could be referred to as a short term or recent counter array, can contain measurements over a short time period such as every 10 seconds. Other counter arrays can track measurements over a larger time periods such as on a minute by minute basis, which can be referred to as a medium or long term counter array. Any number of such arrays over any variation in granularity can be tracked. The arrays can be structured to include timestamps (TS) indicating the timing of the recorded value paired with a recorded value for the given metric.

The statistics management module 2501 can service requests for data for a particular point in time or over a particular time interval. Typically this time interval is bounded at one end with a current time stamp and the other end is bounded by a specific value of the request. For example, the request can be to get a metric from a statistics item 2503 over the last 5 minutes. However, the statistics item 2503 may not have measured data that directly corresponds with this time period with one end of the time period falling between measured data points. The boundary metrics can be derived from the available data using interpolation to cure this defect of the counter arrays and measured data set.

Figure 26:
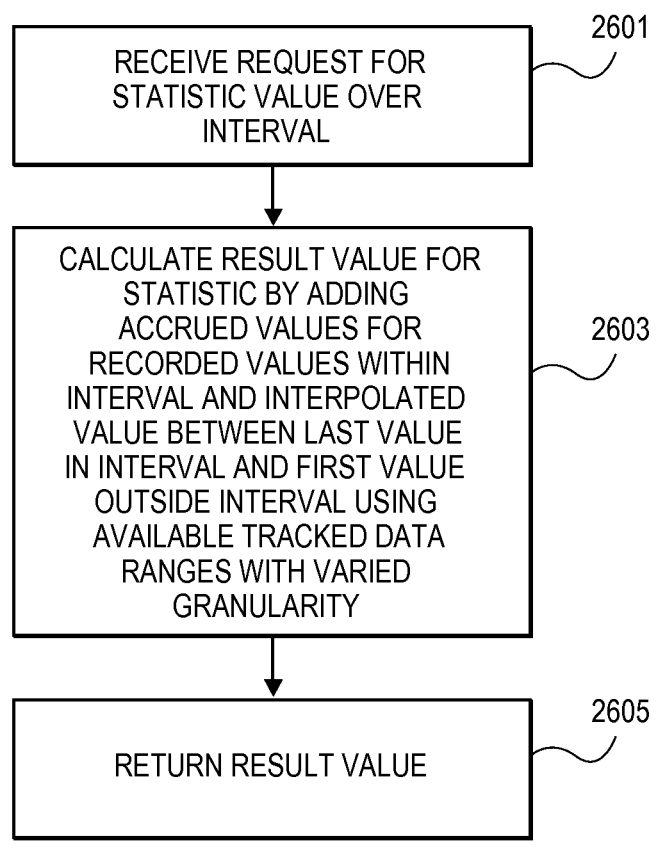
FIG. 26 is a flowchart illustrating one embodiment of a statistical monitoring process.

FIG. 26 is a flowchart illustrating one embodiment of a statistical monitoring process. The method shows a general process for determining a response to a request by a statistic management module. At operation 2601, the process receives a request for a statistic value over a defined interval. The request can come from a load balancing process, VCE balancing process, or similar components of the server Fibre Channel adapter that make use of metrics that can be tracked by the statistical management module.

In response to the request, at operation the statistic management module accesses the relevant statistics item and calculates a result value for the requested statistic by adding together accrued values that are already stored in the statistics item as measurements recorded in the data arrays at the varying levels of granularity where these values fall within the received interval. These accrued values are added with interpolated values that fall outside the defined interval along with values inside the interval using the available data arrays at the varying levels of granularity. This provides greater accuracy where the older bound of the received interval does not fall at the time of a recorded value including when it falls between the ranges of the different data arrays of the statistical item. This can be accomplished by using the last (oldest) recorded value in the interval and the first (newest) recorded value outside the interval, regardless of the data array each of these recorded values may be found in and interpolating a result that matches the interval boundary.

Figure 27:
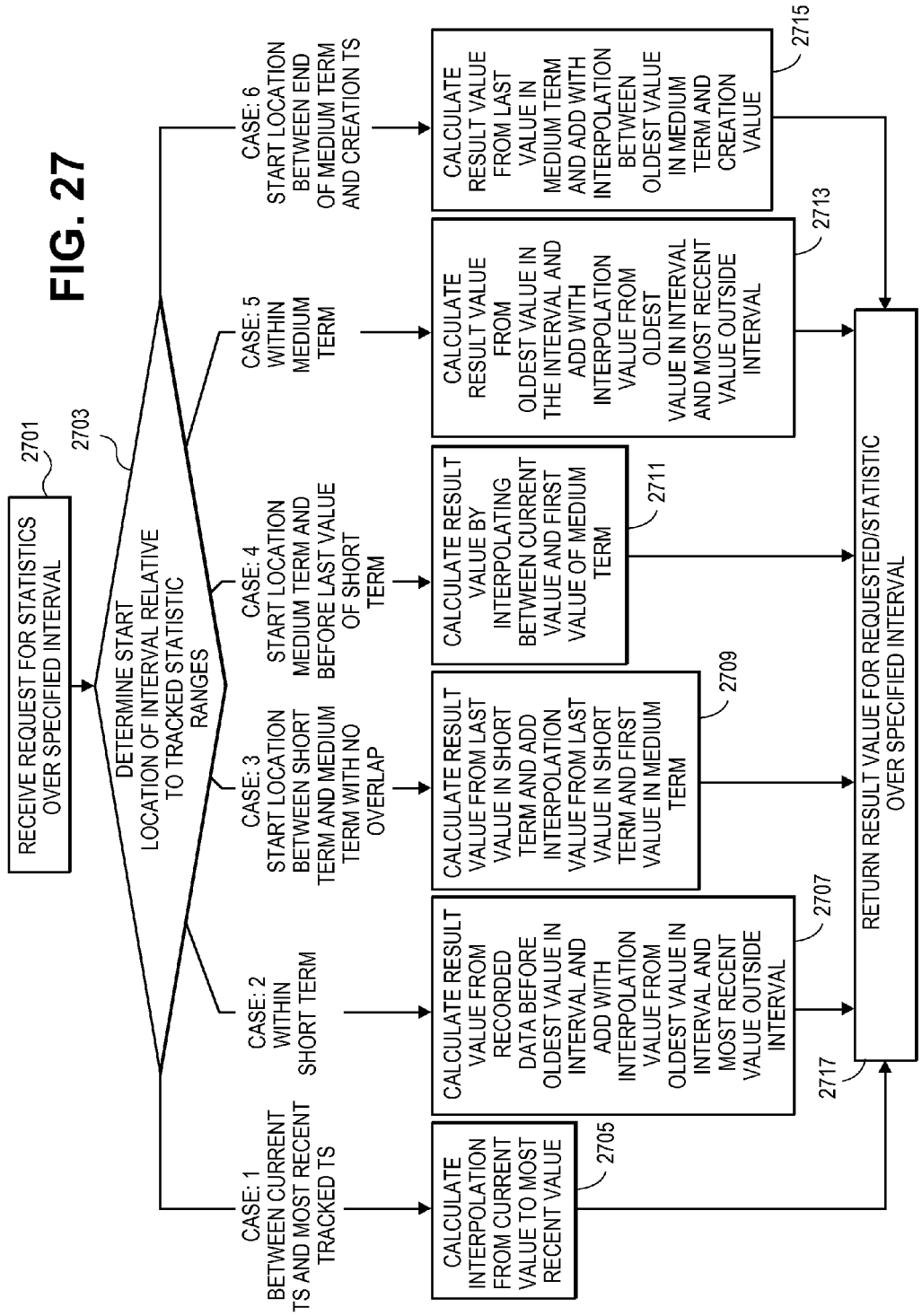
FIG. 27 is a flowchart illustrating one embodiment of a statistical monitoring process having a set of specified cases for generating monitoring data for a given interval.

FIG. 27 is a flowchart illustrating one embodiment of a statistical monitoring process having a set of specified cases for generating monitoring data for a given interval. In this example, the statistics item has two discrete arrays of recorded values from which to draw results for statistics requests. The first data array is of values with a shorter interval (e.g., 10 seconds) or higher frequency, referred to in the illustration as a 'short term' data structure (e.g., an array). The second data array is of values with a medium interval (e.g., 1 minute) or lower frequency, referred to in the illustration as a 'medium term' data structure (e.g., an array). The method is organized to handle various cases of where the start location for an interval of a statistical request falls relative to the short term and medium term data structures. One skilled in the art would understand that the two array structure is provided by way of example and that the principles and structures described herein can apply to any number of arrays having any relative relationship in terms of ranges of coverage.

At operation 2701, the request for statistics over a specified interval of time is received by the statistics management module. The request is analyzed at operation 2703 to determine whether the start location of the specified interval falls in one of a set of defined cases. The start location as used herein indicates the earliest chronological boundary of the specified interval with the latest or most recent boundary corresponding to the current timestamp.

In a first case, the start location falls between the current time stamp and the most recent time stamp tracked in the short term data structure. At operation 2705, the result value in this case is calculated by interpolation using the most recent value in the short term data structure and a current value corresponding with the current time stamp, which is also tracked by the statistical item. The interpolated value can then be returned to the requestor at operation 2717.

In a second case, the start location falls within the time stamp range of the short term data structure. The request is analyzed at operation 2707 by calculating the result value from recorded data in the short term data structure that falls before the start location (determined by time stamp comparison) of the interval, that is the oldest value in the short term data structure that falls within the specified interval. This value or all of the preceding values are added with an interpolated value that is derived from the oldest value in the interval and the most recent value that is outside the interval. The resulting sum can then be returned to the requestor at operation 2717.

In a third case, the start location falls between the short term and medium term data structures, where there is no overlap between the time stamp ranges of these data structures. At operation 2709, the request is analyzed by calculating the result value from the last value in the short term data structure being added to an interpolated value derived from the last (oldest) value in the short term data structure and the most recent value in the medium term data structure. The resulting sum can then be returned to the requestor at operation 2717.

In a fourth case, the start location falls within the medium term data structure and the short term data structure (specifically before the last (oldest) value of the short term data structure), where there is overlap between the two data structures. At operation 2711, the request is analyzed by calculating the result value by interpolating a value derived from a current value and a most recent (first) value of the medium term data structure. The resulting interpolated value can then be returned to the requestor at operation 2717.

In a fifth case, the start location falls within the time stamp range of the medium term data structure. The request is analyzed at operation 2713 by calculating the result value from recorded data in the medium term data structure that falls before the start location (determined by time stamp comparison) of the interval, that is the oldest value in the medium term data structure that falls within the specified interval. This value or all of the preceding values are added with an interpolated value that is derived from the oldest value in the interval and the most recent value that is outside the interval. The resulting sum can then be returned to the requestor at operation 2717.

In a sixth case, the start location falls between the medium term data structure and the creation time stamp. At operation 2715, the request is analyzed by calculating the result value adding a last value or the oldest value in the medium term data structure with a result obtained by interpolating a value derived from the value associated with the creation time stamp and an oldest value of the medium term data structure. The resulting sum can then be returned to the requestor at operation 2717.

Figure 28:
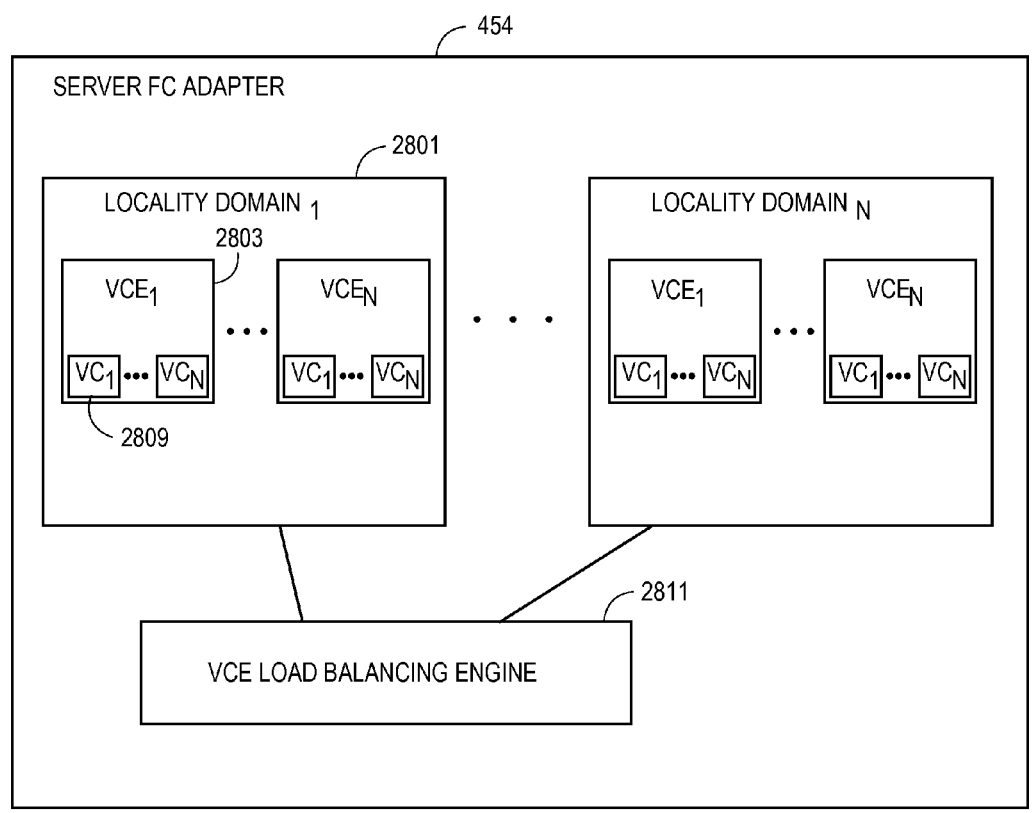
FIG. 28 is a block diagram of one embodiment of a VCE load balancing engine.

FIG. 28 is a block diagram of one embodiment of a VCE load balancing engine. In one embodiment, the resource pool is multi-tiered being simultaneously managed by a locality domain, a virtual connection engine, and virtual connections. The same pool of resources can be assigned to a particular locality domain that in turn encompasses multiple VCEs and each VCE can manage multiple virtual connections. Processes described herein above describe methods of distributing virtual connections across VCEs. The present method spans rebalancing virtual connections across VCEs and locality domains. The illustration shows the relationship within the server Fibre Channel adapter 454 of the components of the locality domain 2801. Each locality domain 2801 is tied to a discrete set of resources or a 'resource pool.' This resource pool is then shared amongst the VCEs and virtual connections that are assigned to the locality domain 2801. During the operation of the server Fibre Channel adapter, the balance of the load or the distribution of the load across the set of locality domains can vary leading to a high load on one locality domain while other locality domains have low loads. A VCE load balancing engine 2811 can monitor the load distribution and rebalance the load across locality domains by reassigning virtual connections to different VCEs or locality domains.

Figure 29:
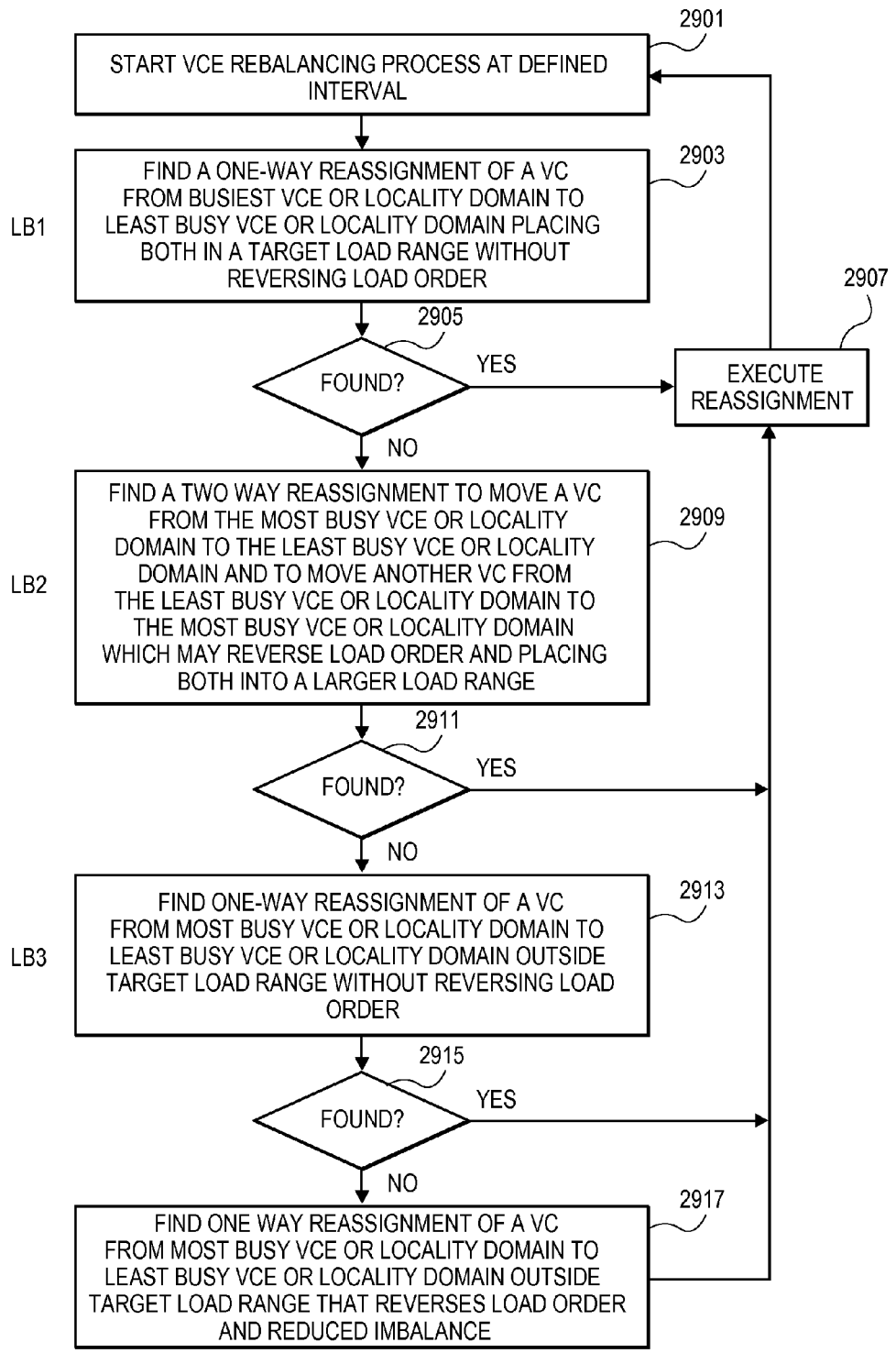
FIG. 29 is a flowchart illustrating one embodiment of a method of VCE rebalancing.

FIG. 29 is a flowchart illustrating one embodiment of a method of VCE rebalancing. While the embodiments may be described in relation to a data backup system, this is provided by way of example and not limitation. One skilled in the art would understand that the principles, structures and processes described in relation to this embodiment are also applicable to other systems and functions. This method can be implemented by a VCE load balancing engine 2811 or similar component executed as part of a server Fibre Channel adapter on a server. In other embodiments, the method is distributed across multiple products and components. At operation 2901, the VCE load balancing engine can start the VCE rebalancing process at a defined interval. The defined interval can have any length such that rebalancing is done on a regular basis at any reasonable frequency. The interval can be pre-programmed by a programmer or dynamically determined or locally inserted by a local user. The method progresses through a set of possible rebalancing actions starting with a most preferred rebalancing option and progressing to a least preferred rebalancing option.

At operation 2903, the VCE rebalancing module searches for a one-way reassignment of a virtual connection from a busiest VCE and/or locality domain to a least busy VCE and/or locality domain such that the reassignment places both the busiest VCE or locality domain and the least busy VCE or locality domain into a target load range (i.e., a range of load values that are defined as acceptable load levels) without reversing the relative load order of the VCE or locality domains involved in the reassignment. In one embodiment, when deciding whether to move a virtual connection from one VCE or locality domain to another, the process can proceed in two stages first to prefer to move a virtual connection from a busiest locality domain to a least busy locality domain. More precisely, a virtual connection can be moved from a most busy VCE in the most busy locality domain to a least busy VCE in a least busy locality domain. Once, the locality domains are relatively balanced, then the process can seek to move a virtual connection from a most busy VCE to a least busy VCE within a locality domain. This two-level approach to rebalancing applies to each stage of the process.

The load order is the order from high to low or low to high of the load of each VCE or locality domain. If a relative load order is maintained after an assignment, then the load of the busiest VCE or locality domain will remain higher than the load of the least busy VCE or locality domain after the reassignment. A one-way reassignment is a movement of a set of virtual connections from a respective VCE or locality domain to another VCE or locality domain. In the one-way reassignment the receiving VCE or locality domain keeps all other virtual connections or VCEs respectively.

If a one-way reassignment meeting this criteria is found at operation 2905, then the one-way reassignment is schedule for execution at operation 2907. The method then continues by waiting for the next interval or similarly proceeding to a subsequent iteration of the analysis for rebalancing. In some embodiments, a single set of reassignments are carried out with each iteration or at each interval. In other embodiments, multiple reassignments or iterations are carried out at each interval. Relative load order can then be considered over all reassignments during a given interval or set of iterations. The virtual connection or VCE that is reassigned can have any load associated with it or the individual load of the virtual connection can be unknown or inferred. In one example embodiment, the virtual connection that is reassigned has a heavy load or the heaviest load. In another example embodiment, the virtual connection that is selected has a load that, if reassigned, would place the VCE or locality domain of its current assignment into an acceptable load range.

If a reassignment was not found, then at operation 2909 a search for a two-way reassignment is carried out to find reassignments that move a virtual connection from the most busy VCE and/or locality domain to the least busy VCE and/or locality domain and to move another virtual connection from the least busy VCE and/or locality domain to the most busy VCE and/or locality domain. Thus, the VCEs or locality domains swap a set of virtual connections. The net effect of the swap is to reduce the load on the most busy VCE and/or locality domain and increase the load on the least busy VCE and/or locality domain. The two-way reassignment provides a greater range of possible solutions, but comes at a higher expense in terms of computation and resources to identify the reassignments and carry out the assignments. In one embodiment, the range of acceptable loads on each VCE or locality domain can be expanded and it can be allowed to reverse the relative load order of the VCEs and locality domains. In other embodiments, any one or both of these requirements may be waived to find a solution.

At operation 2911, if a search found a two-way reassignment, then the reassignment can be schedule for execution at operation 2907. If multiple solutions are found at any stage, then tie-breakers can be utilized to select from the solutions, such as solutions that are closest to a middle of the target load range or similar tie-breaking metrics. The method then continues by waiting for the next interval or similarly proceeding to a subsequent iteration of the analysis for rebalancing. As discussed above, in other embodiments multiple iterations can be carried out at each interval.

At operation 2913, a search for a one-way reassignment of a virtual connection is carried out to find a reassignment of a virtual connection from a most busy VCE and/or locality domain to a least busy VCE and/or locality domain. However, contrary to operation 2903, this one-way reassignment is not required to result in the VCEs or locality domains involved in the reassignment falling within a target load range, but that still avoids reversing load order between the VCEs or locality domains. If such a one-way reassignment is found at operation 2915, the method proceeds to schedule the execution of the reassignment at operation 2907.

Finally, if the previous searches do not reveal a reassignment that meets the established criteria, the method performs a search for a one-way reassignment of a virtual connection to find a reassignment of a virtual connection from a most busy VCE and/or locality domain to a least busy VCE or locality domain. However, contrary to operations 2903 and 2913, this one-way reassignment is not required to result in the VCEs or locality domains involved in the reassignment falling within a target load range or to avoid reversing load order between the VCEs or locality domains. However, the reassignment is required to reduce the imbalance between the VCEs or locality domains. That is, the difference in load of the source and target VCEs or locality domains must decrease after reassignment when compared to current assignment. If such a one-way reassignment is found, then the method proceeds to schedule the execution of the reassignment at operation 2907.

One skilled in the art would understand that this method of rebalancing is provided by way of example, rather than limitation. The method can search for or alter the criteria with logical permutations while remaining consistent with the principles and structures described herein above. Such permutations can include greater use of two-way reassignments or even reassignments involving one or more virtual connections or more than two VCEs or locality domains.

Figure 30:
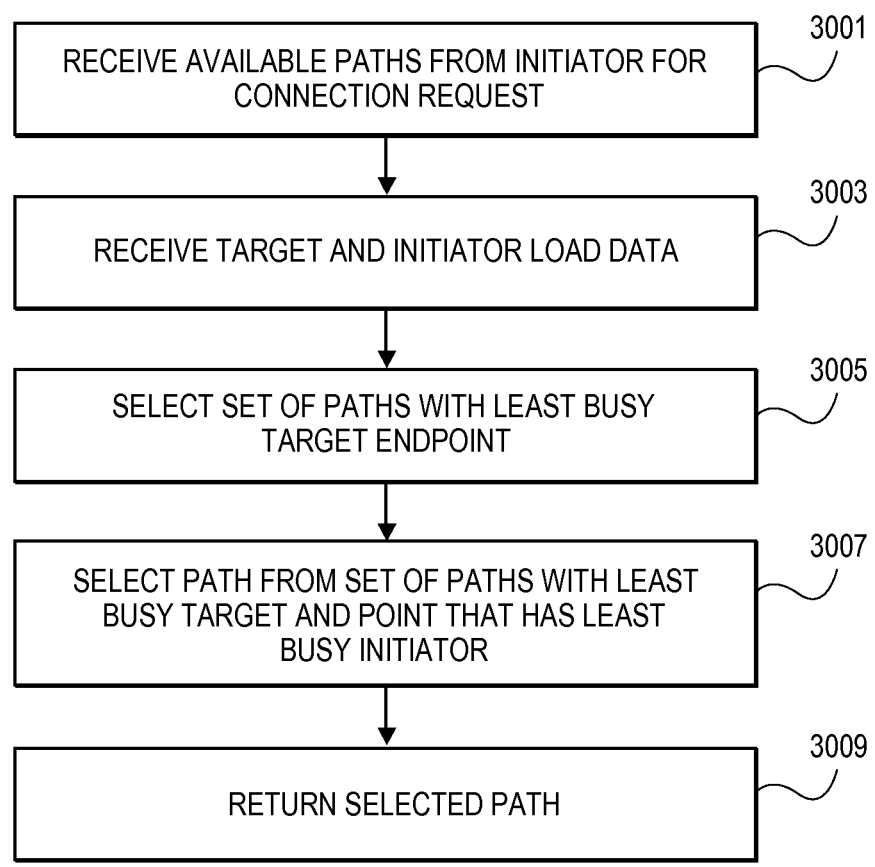
FIG. 30 is a flowchart illustrating one embodiment of a method of endpoint assignment.

FIG. 30 is a flowchart illustrating one embodiment of a method of endpoint assignment. During the establishment of a virtual connection as described herein above, a path between the client and the server Fibre Channel adapter is chosen from a set of available paths along which the client is able to detect the resource (e.g., a LUN) that it seeks to access. The server Fibre Channel adapter selects from amongst these available paths and returns the selection to the client when establishing the virtual connection. Establishing this virtual connection thus creates a load on the selected path including the endpoints of the path referred to as the initiator endpoint and target endpoint where the target endpoint is tied to the resource at the server and the initiator endpoint is tied to the process on the client accessing the resource. The initial path selection method attempts to distribute the load across the available paths and endpoints.

In the initial path selection method, at operation 3001, the server Fibre Channel adapter receives a set of available paths from the client for a connection request in the process of establishing the virtual connection. The server Fibre Channel adapter can request or be provided with load metrics for the target endpoints and the initiator endpoints for each available path at operation 3003. The metrics can be requested by the server Fibre Channel adapter from the statistics management module or similar component of the server. The client can also provide metrics when requested or along with the connection request.

Using the load data, the server Fibre Channel adapter selects paths from the set of available paths that have the least busy target endpoints at operation 3005. If there are multiple target endpoints having the same low level of busyness, then a secondary consideration of the busyness of the initiator endpoint can be utilized to tie-break. In other embodiment, the relative busyness of the target endpoint and the initiator endpoint can be differently weighted. The busyness of an endpoint can be determined through any set of metrics. In one example embodiment, the metrics can include virtual connection count for each endpoint, throughput, operations executed. These metrics can be collected at any interval such as at 10 second intervals or one minute intervals. The collection of the metrics over time can also be analyzed to determine trends with the metric that can indicate whether the endpoint is becoming more or less busy. After selection using this method, the result is returned to the client to establish the connection with the server.

Figure 31:
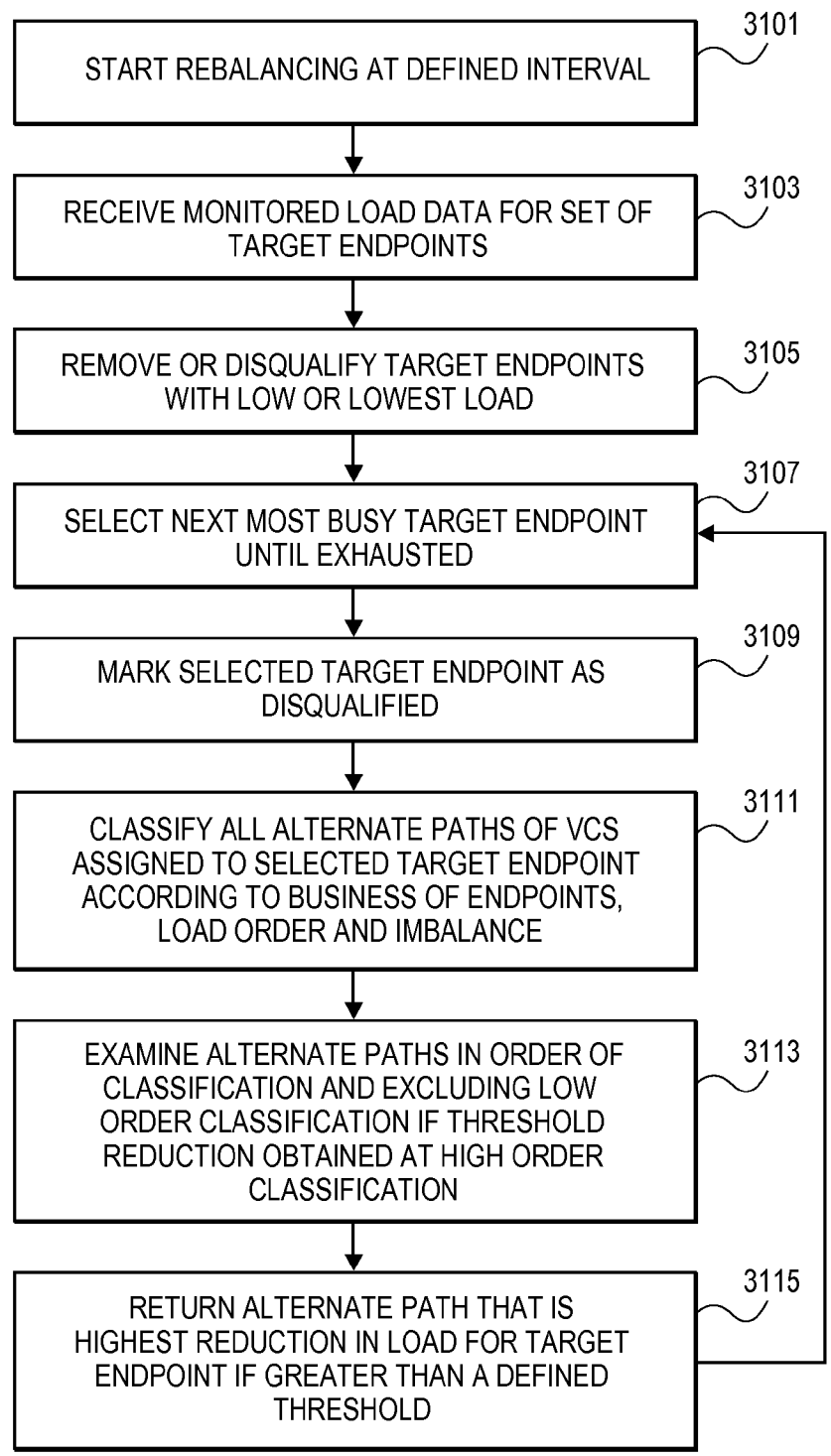
FIG. 31 is a flowchart illustrating one embodiment of a method of endpoint rebalancing.

FIG. 31 is a flowchart illustrating one embodiment of a method of endpoint rebalancing. The endpoint rebalancing is described in terms of target endpoint rebalancing. However, one skilled in the art would understand that the principles and operations described in regard to target endpoint rebalancing can also be applied or adapted to initiator endpoint rebalancing. The server Fibre Channel adapter is capable of requesting and managing the migration of a virtual connection from a current active path to an alternative path from the set of available paths. Overall load reduction can be achieved by identifying virtual connections that are using more busy endpoints and requesting or managing the migration of these endpoints to alternative paths that are less busy.

An example method of virtual connection path migration and rebalancing is illustrated by way of example and not limitation. At operation 3101, the rebalancing process can be started at a defined interval. The rebalancing can be reanalyzed at any frequency using any interval between iterations. At operation 3103, the method proceeds by receiving or retrieving monitored load data for the set of target endpoints. This data can be obtained from the statistics management module or similar sources. The load can be calculated using any metric such as bytes transmitted using SCSI or similar metrics. If the metrics measuring the load on any endpoint show that the endpoint is below a defined threshold, then the endpoint is disqualified at operation 3105. This disqualification removes the endpoint as a candidate for load reductions since the load is already sufficiently low on the endpoint.

The method continues at operation 3107, where the method loops over the set of remaining endpoints associated with available paths by selecting a next endpoint that is the most busy target endpoint. The iteration over the set of endpoints continues until the set of endpoints is exhausted. The selected target endpoint is marked as disqualified, removing it from consideration for further processing in later iterations. The goal of each iteration is to attempt to identify a set of virtual connections that are currently using paths to the selected target endpoint and that can be migrated to other alternative paths to thereby reduce the load on the target endpoint. In selecting which virtual connections to migrate, the method seeks to consider the characteristics of both the target endpoint and the initiator endpoint of each alternative path. Amongst the set of possible solutions, it can be preferred to migrate virtual connections to a path whose destination target endpoint is not busy at all as compared to being less busy overall. The method also prefers migrating virtual connections such that the imbalance between a source and destination of the migration of the endpoint is reduced, but the high/low relationship is still retained (i.e., the relative load order is not reversed.)

The method also prefers to migrate virtual connections to paths with the same initiator endpoint, then second to a less-busy initiator, and finally to a more busy initiator endpoint. To implement these preferences as well as other endpoint migration rules or suggestions, the method loops over a set of all virtual connections to identify virtual connections where the overall load is improved by the movement of the virtual connection to a new path. The preferences are applied by the use of a set of categories that cover the preferences as well as permutations of each preference. There can be any number of separate categories defined and associated with each of the endpoints and paths. The names or identifiers of the categories can be descriptive, have any number and can be utilized divide the set of endpoints into groups tied to the busyness of each endpoint, whether the use of the path could cause a reversal of relative load order or similar criteria. In one example embodiment the categories can have an inherent order tied to their preference as a category. For example, a category where there is an unbusy target endpoint, an unchanged load order, and the same initiator is utilized. Any number of different criteria can be used with each additional criteria increasing the amount of possible categories. The classification of all alternate paths of all VCs assigned to a selected target endpoint according to the busyness of the paths and their endpoints along with load order and imbalance is performed at operation 3111.

The set of categorized alternate paths can then be examined to identify the path with the highest ordered categorization at operation 3113. This method can continue to look for other alternate paths for other target endpoints or virtual connections until the lower ordered categories are reached. These lower ordered categories can be skipped or bypassed if a target level of load reduction is reached overall, saving the computational resources for carrying out these now unnecessary comparisons. If the target level of load reduction is not reached, then the lower order classification can be examined and utilized. For each discovered path the virtual connection and path index or similar identifying information can be recorded at operation 3115. This set of alternative paths can then be returned for implementation of the migration by the respective VCE or similar entity. As mentioned above, the process is generally applicable to both target and initiator endpoint analysis.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein.

In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. A computer-implemented method executed by a server for reliably communicating between the server and a client over a Fibre Channel (FC) network, the method comprising:
    establishing a virtual connection, having a virtual connection identifier, between a client FC adapter and a process associated with a FC adapter of the server over the FC network;
    receiving, by the server FC adapter, from the client over the FC network, a first Small Computer System Interface (SCSI) request packaged within one or more FC frames;
    extracting, by the server FC adapter, the virtual connection identifier and a sequence number from a logical block address (LBA) field of a command descriptor block of the first SCSI request and, wherein the sequence number represents an order of one or more requests from the client and one or more replies from the server;
    validating, by the server FC adapter, the first SCSI request by:
        comparing the virtual connection identifier included in the first SCSI request against an expected virtual connection identifier, and
        comparing the sequence number included in the first request to an expected sequence number of the virtual connection; and
        determining that the first SCSI request is valid in response to determining that the virtual connection identifier in the first SCSI request matches the expected virtual connection identifier and the sequence number in the first SCSI request matches the expected sequence number;
    responding to the first SCSI request by sending a first SCSI response, based on the validity of the first SCSI request, to the client over the FC network.

2. The method of claim 1, wherein validating the first SCSI request further comprises:
    determining, by the server FC adapter, one or more transport paths between the client and the server;
    determining that the first SCSI request is invalid where the virtual connection identifier in the first SCSI request does not match the expected virtual connection identifier, wherein the expected virtual connection comprises a virtual connection identifier associated with a transport path between the client and the server.

3. The method of claim 1, wherein where the first SCSI request is invalid, the first SCSI response is to indicate to the client that the first SCSI request is invalid.

4. The method of claim 1, wherein validating the first SCSI request further comprises:
    extracting, by the server FC adapter, a generation number from the first SCSI request, indicating a generation of the virtual connection identifier;
    comparing, by the server FC adapter, the generation number included in the first SCSI request to a respective expected generation number of the virtual connection at the server FC adapter; and
    determining that the first SCSI request is invalid in response to determining that the generation number in the first SCSI request does not match the respective expected generation number.

5. The method of claim 4, wherein the sequence number is included in one of the logical block address field of the first SCSI request or a payload of the first SCSI request.

6. The method of claim 1, wherein where the first SCSI request is valid, responding to the first SCSI request by sending a first SCSI response based on the validity of the first SCSI request comprises:
    communicating a message with the server process associated with the virtual connection identifier;
    determining a message status of the message; and
    responding to the first SCSI request by sending the first SCSI response, including the message status.

7. The method of claim 6, wherein the message is a reply message, and further wherein communicating the message comprises:
    receiving the message from the server process.

8. The method of claim 4, wherein validating, by the server FC adapter, the first SCSI request further comprises:
    extracting, by the server FC adapter, a verifier value from the first SCSI request, the verifier value having been previously generated by the server;
    comparing, by the server FC adapter, the verifier value included in the first SCSI request to a respective expected verifier value of the virtual connection at the server FC adapter; and
    determining that the first SCSI request is invalid in response to determining that the verifier value in the first SCSI request does not match the respective expected verifier value.

9. The method of claim 6, wherein the message status is determined to be incomplete where a timeout is expired and the message is not completely communicated with the server process, and wherein the method further comprises:
    beginning a countdown of the timeout.

10. The method of claim 1, further comprising:
    determining that the first SCSI request is a retried SCSI request; and
    responding to the first SCSI request by resending a prior SCSI response to the retried SCSI request.

11. The method of claim 10, wherein determining that the first SCSI request is retried comprises:
    comparing a sequence number included in the first SCSI request to a last expected sequence number; and
    determining that the first SCSI request is the retried SCSI request where the sequence number included in the first SCSI matches the last expected sequence number.

12. A non-transitory computer-readable storage medium having instructions stored therein, which when executed by a server computer acting as a server, cause the server computer to perform operations comprising:
    establishing a virtual connection, having a virtual connection identifier, between a client Fibre Channel (FC) adapter and a process associated with a FC adapter of the server over the FC network;
    receiving, by the server FC adapter, from a client over a FC network, a first Small Computer System Interface (SCSI) request packaged within one or more FC frames;
    extracting, by the server FC adapter, the virtual connection identifier and a sequence number from a logical block address (LBA) field of a command descriptor block of the first SCSI request and, wherein the sequence number represents an order of one or more requests from the client and one or more replies from the server;
    validating, by the server FC adapter, the first SCSI request by:

comparing the virtual connection identifier included in the first SCSI request against an expected virtual connection identifier, and comparing the sequence number included in the first request to an expected sequence number of the virtual connection; and determining that the first SCSI request is valid in response to determining that the virtual connection identifier in the first SCSI request matches the expected virtual connection identifier and the sequence number in the first SCSI request matches the expected sequence number;

responding to the first SCSI request by sending a first SCSI response, based on the validity of the first SCSI request, to the client over the FC network.

13. The non-transitory computer-readable storage medium of claim 12, wherein validating the first SCSI request further comprises:

determining, by the server FC adapter, one or more transport paths between the client and the server;

determining that the first SCSI request is invalid where the virtual connection identifier in the first SCSI request does not match the expected virtual connection identifier, wherein the expected virtual connection comprises a virtual connection identifier associated with a transport path between the client and the server.

14. The non-transitory computer-readable storage medium of claim 12, wherein where the first SCSI request is invalid, the first SCSI response is to indicate to the client that the first SCSI request is invalid.

15. The non-transitory computer-readable storage medium of claim 12, wherein validating the first SCSI request further comprises:

extracting, by the server FC adapter, a generation number from the first SCSI request, indicating a generation of the virtual connection identifier;

comparing, by the server FC adapter, the generation number included in the first SCSI request to a respective expected generation number of the virtual connection at the server FC adapter; and determining that the first SCSI request is invalid in response to determining that the generation number in the first SCSI request does not match the expected generation number.

16. The non-transitory computer-readable storage medium of claim 12, wherein the sequence number is included in one of the logical block address field of the first SCSI request or a payload of the first SCSI request.

17. The non-transitory computer-readable storage medium of claim 12, wherein where the first SCSI request is valid, responding to the first SCSI request by sending a first SCSI response based on the validity of the first SCSI request comprises:

communicating a message with the server process associated with the virtual connection identifier;

determining a message status of the message; and responding to the first SCSI request by sending the first SCSI response, including the message status.

18. The non-transitory computer-readable storage medium of claim 17, wherein the message is a reply message, and further wherein communicating the message comprises:

receiving the message from the server process.

19. The non-transitory computer-readable storage medium of claim 15, wherein validating, by the server FC adapter, the first SCSI request further comprises:

extracting, by the server FC adapter, a verifier value from the first SCSI request, the verifier value having been previously generated by the server;

comparing, by the server FC adapter, the verifier value included in the first SCSI request to a respective expected verifier value of the virtual connection at the server FC adapter; and determining that the first SCSI request is invalid in response to determining that the verifier value in the first SCSI request does not match the expected verifier value.

20. The non-transitory computer-readable storage medium of claim 17, wherein the message status is determined to be incomplete where a timeout is expired and the message is not completely communicated with the server process, and wherein the instructions when executed by the server computer, cause the server computer to perform a further set of operations comprising:

beginning a countdown of the timeout.

21. The non-transitory computer-readable storage medium of claim 12, wherein the instructions when executed by the server computer, cause the server computer to perform a further set of operations comprising:

determining that the first SCSI request is a retried SCSI request; and responding to the first SCSI request by resending a prior SCSI response to the retried SCSI request.

22. The non-transitory computer-readable storage medium of claim 21, wherein determining that the first SCSI request is retried comprises:

comparing a sequence number included in the first SCSI request to a last expected sequence number; and determining that the first SCSI request is the retried SCSI request where the sequence number included in the first SCSI matches the last expected sequence number.

23. A server system, comprising:

a server host bus adapter to communicate Small Computer System Interface (SCSI) requests and responses over a Fibre Channel (FC) network with a client;

a processor communicatively coupled with the server host bus adapter, the processor to execute a server Fibre Channel adapter, the server Fibre Channel adapter configured to:

establish a virtual connection, having a virtual connection identifier, between a client FC adapter and a process associated with a FC adapter of the server over the FC network;

receive, from the client, a first SCSI request packaged within one or more FC frames;

extract the virtual connection identifier and a sequence number from a logical block address (LBA) field of a command descriptor block of the first SCSI request and, wherein the sequence number represents an order of one or more requests from the client and one or more replies from the server;

validate the first SCSI request by:

comparing the virtual connection identifier included in the first SCSI request against an expected virtual connection identifier; and comparing the sequence number included in the first request to an expected sequence number of the virtual connection; and determine that the first SCSI request is valid in response to determining that the virtual connection identifier in the first SCSI request matches the expected virtual connection identifier and the sequence number in the first SCSI request matches the respective expected sequence number;

respond to the first SCSI request by sending a first SCSI response, based on the validity of the first SCSI request, to the client over the FC network.

24. The server system of claim 23, wherein to validate the first SCSI request comprises:
to determine, by the server FC adapter, one or more transport paths between the client and the server;
to determine that the first SCSI request is invalid where the virtual connection identifier in the first SCSI request does not match the expected virtual connection identifier, wherein the expected virtual connection comprises a virtual connection identifier associated with a transport path between the client and the server.

25. The server system of claim 23, wherein where the first SCSI request is invalid, the first SCSI response is to indicate to the client that the first SCSI request is invalid.

26. The server system of claim 23, wherein to validate the first SCSI request further comprises:
to extract, by the server FC adapter, a generation number from the first SCSI request, indicating a generation of the virtual connection identifier;
to compare, by the server FC adapter, the generation number included in the first SCSI request to a respective expected generation number for the virtual connection at the server FC adapter; and
to determine that the first SCSI request is invalid in response to determining that the generation number in the first SCSI request does not match the respective expected generation number.

27. The server system of claim 23, wherein the sequence number is included in one of the logical block address field of the first SCSI request or a payload of the first SCSI request.

28. The server system of claim 23, wherein where the first SCSI request is valid, to respond to the first SCSI request by sending a first SCSI response based on the validity of the first SCSI request comprises:
to communicate a message with the server process associated with the virtual connection identifier;
to determine a message status of the message; and
to respond to the first SCSI request by sending the first SCSI response, including the message status.

29. The server system of claim 28, wherein the message is a reply message, and further wherein to communicate the message comprises:
to receive the message from the server process.

30. The server system of claim 26, wherein validating, by the server FC adapter, the first SCSI request further comprises:
extract, by the server FC adapter, a verifier value from the first SCSI request, the verifier value having been previously generated by the server;
compare, by the server FC adapter, the verifier value included in the first SCSI request to a respective expected verifier value of the virtual connection at the server FC adapter; and
determine that the first SCSI request is invalid in response to determining that the verifier value in the first SCSI request does not match the respective expected verifier value.

31. The server system of claim 28, wherein the message status is determined to be incomplete where a timeout is expired and the message is not completely communicated with the server process, and wherein the server Fibre Channel adapter is further configured to begin a countdown of the timeout.

32. The server system of claim 23, wherein the server Fibre Channel adapter is further configured to determine that the first SCSI request is a retried SCSI request; and to respond to the first SCSI request by resending a prior SCSI response to the retried SCSI request.

33. The server system of claim 32, wherein to determine that the first SCSI request is retried comprises:
to compare a sequence number included in the first SCSI request to a last expected sequence number; and
to determine that the first SCSI request is the retried SCSI request where the sequence number included in the first SCSI matches the last expected sequence number.

* * * * *